United States Patent [19]

Sheafor et al.

[11] Patent Number: 6,088,753
[45] Date of Patent: Jul. 11, 2000

[54] BUS ARRANGEMENTS FOR INTERCONNECTION OF DISCRETE AND/OR INTEGRATED MODULES IN A DIGITAL SYSTEM AND ASSOCIATED METHOD

[75] Inventors: Stephen James Sheafor, Boulder; James Yuan Wei, Longmont, both of Colo.

[73] Assignee: Fusion Micromedia Corporation, Longmont, Colo.

[21] Appl. No.: 09/365,441

[22] Filed: Aug. 2, 1999

Related U.S. Application Data

[62] Division of application No. 08/863,875, May 27, 1997, Pat. No. 5,983,303.

[51] Int. Cl.[7] .................................................. G06F 13/00
[52] U.S. Cl. ......................... 710/128; 710/126; 710/100; 711/150
[58] Field of Search ................................. 710/126, 100, 710/124, 129, 128, 7, 260, 1; 711/100, 150; 370/438; 709/213, 100

[56] References Cited

U.S. PATENT DOCUMENTS

| | | | |
|---|---|---|---|
| 4,845,663 | 7/1989 | Brown et al. | 382/303 |
| 5,289,585 | 2/1994 | Kock et al. | 395/293 |
| 5,481,677 | 1/1996 | Kai et al. | 395/280 |
| 5,483,642 | 1/1996 | Okazawa et al. | 395/306 |
| 5,490,253 | 2/1996 | Laha et al. | 395/304 |
| 5,500,949 | 3/1996 | Saito | 711/100 |
| 5,590,124 | 12/1996 | Robins | 370/258 |
| 5,666,551 | 9/1997 | Fenwick et al. | 395/200.37 |
| 5,751,999 | 5/1998 | Suzuki | 395/494 |
| 5,768,550 | 6/1998 | Dean et al. | 395/309 |
| 5,850,521 | 12/1998 | Morganti et al. | 395/200.38 |

FOREIGN PATENT DOCUMENTS

| | | |
|---|---|---|
| 0458516 | 11/1991 | European Pat. Off. . |
| 0460853 | 12/1991 | European Pat. Off. . |

*Primary Examiner*—Gopal C. Ray
*Attorney, Agent, or Firm*—Stephen C. Shear; Michael Pritzkau

[57] ABSTRACT

Bus arrangements for interconnecting a number of discrete and/or integrated modules in a digital system are described herein. Implementations of the bus arrangements are contemplated at chip level, forming part of an overall integrated circuit, and are also contemplated as interconnecting discrete modules within an overall processing system. These bus arrangements and associated method provide for high speed, efficient digital data transfer between the modules through optimizing bus utilization by eliminating the need for maintaining a fixed time relationship between the address and data portions of transactions which are executed by the system. In this manner, the bus arrangement is capable of supporting more active transactions than the number of individual buses which make up the bus arrangement. Systems described may include any number of individual buses within their bus arrangements. In one implementation, a system includes a single address bus and two or more data buses such that different data transfers may be executed simultaneously on each data bus.

8 Claims, 16 Drawing Sheets

BUS ARRANGEMENTS FOR INTERCONNECTION OF DISCRETE AND/OR INTEGRATED MODULES IN A DIGITAL SYSTEM AND ASSOCIATED METHOD

This is a Divisional application of prior application Ser. No. 08/863,875, which was filed May 27, 1997, U.S. Pat. No. 5,983,303 designated the United States, the disclosures of which are incorporated herein by reference.

BACKGROUND OF THE INVENTION

The present invention relates generally to a bus arrangement which interconnects a number of modules or components in a digital system and more particularly to bus arrangements and associated methods for providing high speed, efficient digital data transfer between the modules. Implementations of the bus arrangements are contemplated at chip level, forming part of an overall integrated circuit, and are also contemplated as interconnecting discrete modules within an overall processing system.

Many bus structures and associated operating methods typically employ an address bus and a data bus wherein transactions executed on the bus structure include an address operation and an associated data operation. Normally, the address operations are transacted on the address bus and the associated data operations are transacted on the data bus in such a way that a fixed time relationship is maintained between the address and data operation of a particular transaction. In most instances, the bus structure operates in such a way that the data operation places data on the data bus during the associated address operation. As will be seen hereinafter, this fixed relationship requirement introduces inherent limitations with regard to system performance. Some prior art bus structures use a single bus for both address and data operations, in which case the data operation immediately follows the address operation i.e., another fixed time relationship.

The above described requirement for maintaining a fixed time relationship between the address and data operation of a particular transaction, in and by itself, reduces the efficiency of bus utilization, particularly with regard to the data bus. As one example of a read transaction, a CPU addresses a particular peripheral device on the address bus thereby requesting data. In this instance, the CPU typically holds the data bus while the peripheral fetches the requested data for delivery via the data bus. During this "bus hold time" the data bus is not utilized in an efficient manner since no data is transmitted. Moreover, the addressing operation is itself extended in duration by the length of the bus hold time in waiting for data to appear on the data bus. Significant bus hold times may be encountered, for example, in the case of read transactions involving peripheral devices accessing dynamic random access memory (hereinafter DRAM). As one example of a bus hold delay involving DRAM, it is well known that DRAM must be refreshed periodically in order to maintain the data stored therein. In the instance where a peripheral such as, for example, a CPU attempts to perform a read (or, for that matter, a write) during the refresh cycle, a bus hold delay is produced until such time that the refresh cycle ends. As another example of a bus hold delay involving DRAM, the CPU may attempt to access the DRAM while another peripheral is actually using the DRAM. Thus, the CPU must wait so as to introduce a bus hold delay. Read transactions, in general, introduce bus hold delays since essentially no device is capable of instantaneous response to a read request. One of skill in the art will appreciate that system performance is directly dependent upon the efficiency of bus utilization. Other types of transactions introduce bus hold delays with consequent adverse effects on system performance, as will be described.

Write transactions performed by a CPU may also introduce bus hold delays which are similar in nature to those which are introduced by read transactions. As a specific example, the head of a fixed disk must be moved to the appropriate location at which data is to be written. This write access time constitutes a bus hold delay.

"Slaving" operations serve as still another example of non-optimum bus utilization by causing bus hold delays. In particular, a master module which requests data from a slave module typically holds the address bus and the data bus at least until the slave transmits the requested data. Unfortunately, the slave module may not have the requested data immediately at hand for any number of different reasons such as, for example, its need to prepare the requested data by performing certain processing steps. For purposes herein, the term "master module" refers to the module making a request (i.e., read or write) and the term "slave module" refers to the module that is the recipient of that request.

It should be appreciated that the discussion above is not intended to cover every instance in which system performance is adversely affected by non-optimum bus utilization, but rather to give a few examples so as to clearly point out the mechanism by which the problem occurs.

In the past, digital system designers have tolerated non-optimum bus utilization by simply accepting its reduced efficiency and consequent lower data throughput. More recently, certain arrangements have emerged which provide improvement in some aspects of bus utilization. One such arrangement is the Peripheral Component Interconnect (hereinafter PCI) Bus. One of skill in the art, however, will recognize that the PCI bus does not offer a sweeping solution to the bus utilization problem. More specifically, the PCI Bus maintains the aforedescribed fixed relationship between a transaction's address and data portions such that bus hold delays continue to be encountered.

Another arrangement which is referred to as "pipelining" offers bus utilization improvement in certain situations. These certain situations necessitate that data is transferred in a system from a particular source module to a particular destination module by way of a fixed number of physical elements which make up the "pipe". The data passing through the "pipe" is processed in precisely the same manner between the two modules so as to perform a particular operation. Unfortunately, pipelining has limited value in improving bus utilization and efficiency since improvements are only realized for that particular operation which is performed by the pipeline. Improving bus utilization and efficiency in the remainder of the system therefore remains a concern.

As processing applications continue to increase in complexity and required levels of data throughput continue to increase, future digital systems in the form of individual integrated circuits and bus interconnected discrete components will be pushed to correspondingly higher levels of performance. As will be seen hereinafter, the present invention provides bus arrangements and associated methods which contemplate heretofore unattainable performance levels through improved bus utilization efficiency within individual integrated circuits and within bus interconnected discrete module digital systems.

SUMMARY OF THE INVENTION

As will be described in more detail hereinafter, there are disclosed herein digital systems and an associated method.

In accordance with one aspect of the method of the present invention, a series of address transactions may be performed between modules which are interconnected on a bus arrangement such that each address transaction defines an associated data transaction. The data transactions are thereafter performed on the bus arrangement such that the data transactions are completed in a sequence which is different than the order in which the series of address transactions were performed.

In accordance with another aspect of the method of the present invention, disclosed systems may include a bus arrangement having a number of separate buses which interconnect at least three modules such that one of the buses serves at least as an address bus and any remaining buses serve as data buses. In executing a plurality of transactions involving the modules on the bus arrangement wherein each transaction includes an address period which defines an associated data transfer between said modules, the systems operate by initiating the address periods of the transactions on the address bus such that each transaction is active in the system until such time that its associated data transfer is completed. Subsequent to completion of each address period, the associated data transfer of each transaction is executed on the bus arrangement such that all of the initiated data transactions are active at one point in time and so that the number of active transactions is greater than the number of separate buses.

In accordance with still another aspect of the method of the present invention, disclosed systems may include a bus arrangement having one or more buses which interconnect at least three modules. During operation, at least two transactions are executed involving all of the modules on the bus arrangement wherein each transaction includes an address period which defines an associated data transfer between the modules. The address periods for the transactions are performed on one of the buses. Subsequent to completion of each address period, the associated data transfers are executed in corresponding data intervals on a particular one of the buses such that a first data interval associated with a first data transfer includes at least one idle period during which no data associated with the first data transaction is transferred. The first data interval further includes at least one data period, following its idle period, during which data is transferred over that particular bus. Furthermore, a second data interval associated with a second data transfer includes at least one data period during which data is transferred over that particular bus. In accordance with the present invention, the first and second data transfers are executed in timed relation so that the idle period of the first data interval occurs for the duration of the data period of the second data interval so as to perform the first and second data transfers in an interleaved manner on that particular bus.

In accordance with yet another aspect of the method of the present invention, its use is equally applicable in a system which uses a single address bus and a single data bus.

In accordance with a further aspect of the method of the present invention, disclosed systems may include a bus arrangement which interconnects at least two modules. During operation of the system, a transaction involving the modules is executed on the bus arrangement wherein the transaction includes an address period which defines an associated data transfer between the two modules. The address period is performed on the bus arrangement such that a first module addresses a second module. Following the performance of the address period, the data transfer is controlled using the second module so as to execute the data transfer on the bus arrangement such that data is transferred from the second module to the first module. Within the context of the present invention, the first module is considered as the destination module of the data transfer while the second module is considered as the source module of the data transfer. Accordingly, the data transfer of a transaction is controlled on the bus arrangement using the source module of the data transfer irrespective of which module initiated that transaction's address period.

The bus arrangements of the systems disclosed herein may be implemented in a number of highly advantageous ways. In a first implementation, the bus arrangement may include a single, multiplexed bus which serves for the transfer of address and data information.

In accordance with a second implementation, a digital system includes at least one processing module, memory means for storing digital information and a bus arrangement. The bus arrangement includes an address bus interconnecting the processing module with the memory means and at least two, separate data busses which are arranged so as to interconnect the processing module and the memory means in a predetermined way.

In accordance with one aspect of this multi-data bus implementation, the system performs transactions each of which includes an address portion that defines a data transfer. In one feature, the system is configured for selecting one of the data buses on which to perform each data transfer. Data bus selection may be based on certain criteria relating to the operation of the system and may be dynamic such that bus selection is based on current operational status of the system so as to optimize bus utilization. In another feature, the system may be configured for permitting simultaneous execution of different data transfers on the respective data busses. Systems having more than two data buses may simultaneously execute different data transfers on each data bus.

In accordance with a third implementation of the present invention, a digital system includes at least one processing module and memory means. The memory means includes first and second separate, independently controllable memory storage arrangements for storing digital information. The system further includes a bus arrangement interconnecting the processing module and the memory storage arrangements in a predetermined way.

In one aspect of this multi-memory implementation of the invention, the memory means includes memory control means for automatically and retrievably storing a stream of data received from the bus arrangement into at least two of the memory storage arrangements such that portions of the stream are stored in different ones of the memory storage arrangements in an interleaved manner. In implementations which include more than two memory storage arrangements, a particular data stream may be stored in this interleaved manner amongst all of the memory storage arrangements.

BRIEF DESCRIPTION OF THE DRAWINGS

The present invention may be understood by reference to the following detailed description taken in conjunction with the drawings briefly described below.

DETAILED DESCRIPTION OF THE INVENTION

Figure 1:
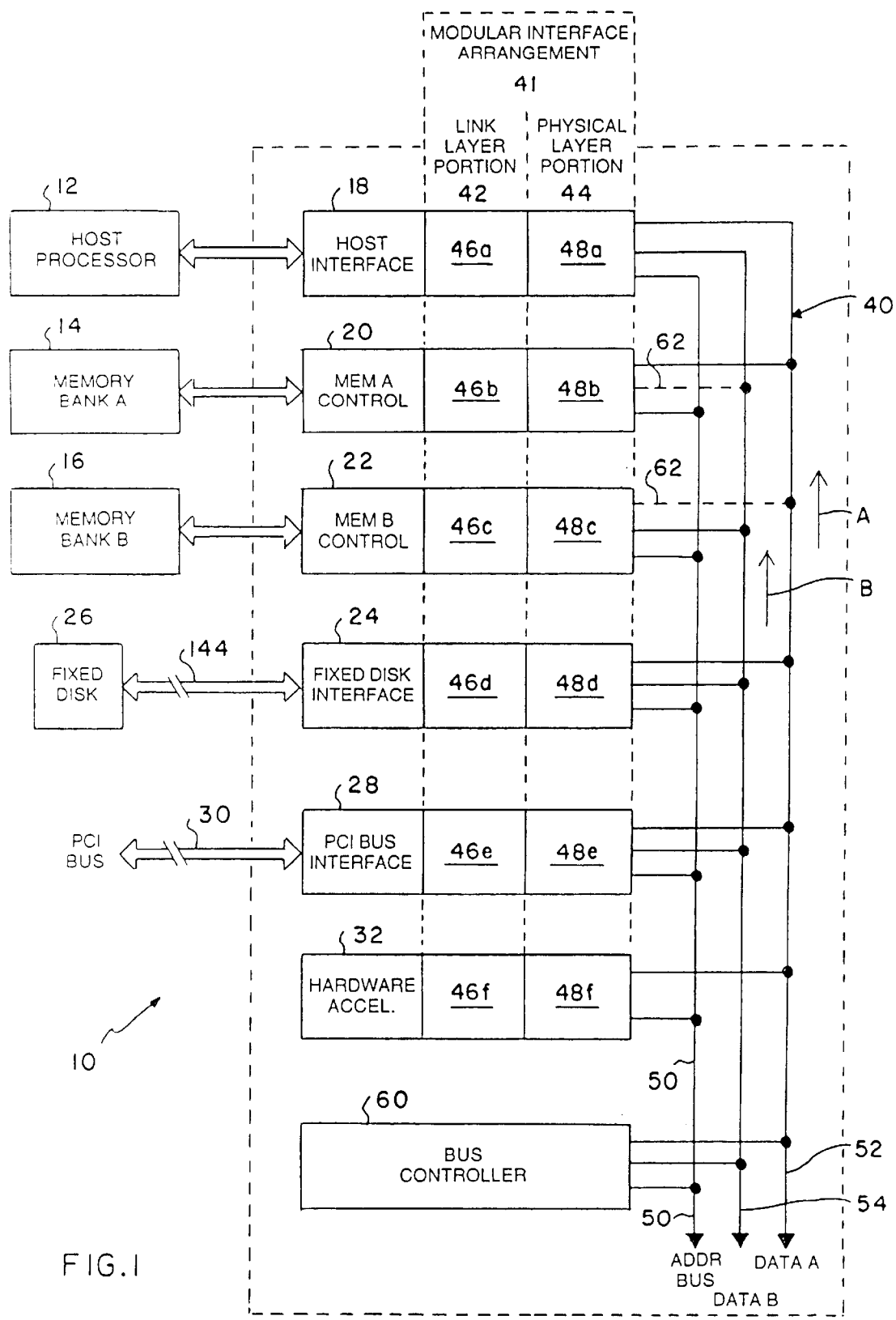
FIG. 1 is a block diagram illustrating a digital system including a bus arrangement which is implemented in accordance with the present invention.

Attention is immediately directed to FIG. 1 which illustrates one embodiment of a digital system manufactured in accordance with the present invention and generally indicated by the reference numeral 10. System 10 includes a host processor 12, a memory bank A indicated by the reference number 14 and a memory bank B indicated by the reference number 16. Host processor 12 is connected with a host interface module 18. Memory bank A is connected with a memory A control module 20 while memory bank B is connected with a memory B control module 22. It should be appreciated that host interface modules, memory control modules and other modules which are used herein should be designed in view of interface considerations which will be described once the reader has been made aware of relevant details. Memory banks A and B may comprise standard RAM banks having a combined capacity which is suited to the intended system application(s). It is to be understood that substantially any CPU either currently available or to be developed may serve as host processor 12 based upon considerations to be described below and in view of overall performance requirements. Moreover, system 10 accommodates the use of multiple host processors with relative ease, as will be discussed later. System 10 further includes a plurality of additional modules to be described below which are selected so as to fulfill specific functional needs based upon processing requirements of the intended application. For illustrative purposes, these modules will be chosen in a way which serves to best illustrate the advantages which are achieved through the teachings of the present invention.

Continuing to refer to FIG. 1, selected modules which form part of system 10 include a fixed disk interface module 24 which is connected with an external fixed disk 26, a PCI bus interface module 28 connected with a PCI bus 30 and a hardware accelerator module 32. PCI bus 30 may extend to any number of PCI bus configured peripherals such as, for example, a network interface (not shown). Hardware accelerator 32 may be configured so as to serve any one of a number of functions within the context of the present invention. For example, hardware accelerator module 32 may comprise an inverse discrete cosine transform module (hereinafter IDCT module) which is useful in multimedia image processing. Since a hardware accelerator module is dedicated to a particular task, its design may be optimized so as achieve a very high processing speed in performing that particular task. Hardware accelerator modules will be described in further detail at appropriate points below.

System 10 further includes a bus arrangement implemented in accordance with the present invention and generally indicated by the reference number 40. Bus arrangement 40 includes a module interface arrangement 41 which is comprised of a link layer portion 42 which interfaces directly with a physical layer portion 44. Link layer portion 42 provides the individual modules in the system with an interface to the overall bus arrangement in the form of individual link layers 46a–f. Physical layer portion 44 includes a plurality of individual physical layers 48a–f which are associated with respective link layers 46a–f. Physical layers 48a–f, in turn, are each connected with an address bus 50 and are selectively connected with a data bus A indicated by reference number 52 and a data bus B indicated by the reference number 54. Selective connection of individual module physical layers with data buses A and B will be discussed at appropriate points below. Bus arrangement 40 is completed by a bus controller module 60 which is designed in accordance with the present invention and which is connected with address bus 50 and both data buses. Bus controller 60 serves in all bus arbitration and allocation needs, as will be further described below. At this point, it is worthy of mention that such a multiple data bus arrangement, which shares one address bus, has not been seen before by applicants and that its attendant advantages are significant, as will be described in detail hereinafter.

Having generally described the structure of system 10 including bus arrangement 40 and appreciating that this system represents a relatively complex digital system, a discussion will now be provided which serves to bring into view relatively broad considerations and concepts with regard to the design, operation and many advantages of system 10. Specific operational details, designs and clock cycle diagrams will be provided within the context of a later discussion.

In system 10, typical modules such as, for example, fixed disk 24, PCI bus interface 28 and hardware accelerator 32 are capable of operating as both "masters" and "slaves" with respect to one another and with respect to the host processor and connect to both of the data buses. The terms "master" and "slave" are used in their generally known senses wherein a master requests a data read or write and the slave presents or receives the requested data, as stated previously. The primary exception in module dual master/slave capability in this system are memory controller modules 20 and 22, which possess only slave functionality. That is, the memory modules are subject to read or write requests which are always initiated by another module. In another aspect which is different from most other modules, memory controllers 20 and 22 are each connected to only one data bus by module interface arrangement 41. Specifically, memory A controller module 20 is connected with data bus A via link layer module 46b and physical layer module 48b while memory B controller module 22 is connected with data bus B via link layer module 46c and physical layer module 48c. This data bus/memory arrangement achieves certain advantages in conjunction with the specific way in which address space is allocated between the respective memories in accordance with an overall address allocation scheme which will be described below. It should be noted that memory controller modules 20 and 22 may each be connected (not shown) with both data buses A and B by their respective physical layers, as indicated by dashed lines 62. As will be appreciated at an appropriate point below, connection of each memory controller with both data busses is highly advantageous in facilitating data bus selection in a dynamic way based, for example, on current availability of a particular data bus or on overall data bus utilization monitoring 1statistics.

As noted, bus controller module 60 performs all bus arbitration and allocation functions within the system so as to function as a sort of "traffic controller." For this reason, it represents another exception in module dual master/slave capability. Further details regarding the role and capabilities of bus controller module 60 will be mentioned at appropriate points in the remaining discussions. For the moment, it is sufficient to note that many of the control tasks performed by bus controller 60 are relegated to the CPU of prior art systems. Therefore, the bus controller of the present invention provides a significant advantage in relieving host processor 12 of such burdensome control tasks.

Host interface module 18 represents somewhat of an exception in module dual master/slave capability in that it possesses few, if any, slave functions. However, the host interface module varies in other respects from typical modules. For example, it is assigned a higher priority than other modules whereby to allow for fast, low latency accesses to the bus system. These accesses are typically performed as bursts to memory banks A and/or B. Specific priority schemes and bus access by the host processor and remaining modules will be discussed below. It should be noted that the host interface module logic may contain a level 2 cache controller (not shown) in which case it possesses a greater number of slave capabilities. As another example of the way in which the host interface varies from typical modules, the host interface also possesses logic which implements a configuration mode. The configuration mode employs a special high speed access technique which allows direct host processor access to individual modules without using standard module to module protocol, as will be described below. For purposes of the present discussion, it is noted that the configuration mode is used to initialize the system, to read module identifications in determining the system configuration, to set up the address space for each module and to implement error recovery from hardware or software hang conditions. These and other aspects of the configuration mode will be covered further in the course of the following discussions.

With regard to addressing, it is noted that address bus 50 of bus arrangement 40 may be configured with any suitable number of address lines. For example, if address bus 50 is made up of 32 address lines, system 10 includes an addressable space of 4 gigabytes. The slave logic, if any, within each module (including the memory banks) responds to a portion of this address space. Master logic within respective modules, of course, does not respond to address space, since all operations are initiated by the master logic. The size of the address space that is associated with a particular module is determined by the needs of the module while the address range is itself programmable. The present invention provides a highly advantageous feature in that the master logic of any module can initiate a transfer with the slave logic of any other module, allowing peer to peer transfers between modules without intervention by host processor 12. This feature and associated features will be further described hereinafter in conjunction with a discussion of the specific way in which transactions are configured and executed by system 10. It is noted that that PCI bus 30 and associated bus bridge hardware (i.e., interface 28) represent one portion of system 10 which may be addressed using a non-response subtractive decoding technique which is implemented in accordance with the present invention, for reasons will be described. Other types of buses such as, for example, the ISA bus may be operated in system 10 or in other systems to be disclosed below using appropriately configured bus bridges.

Figure 2:
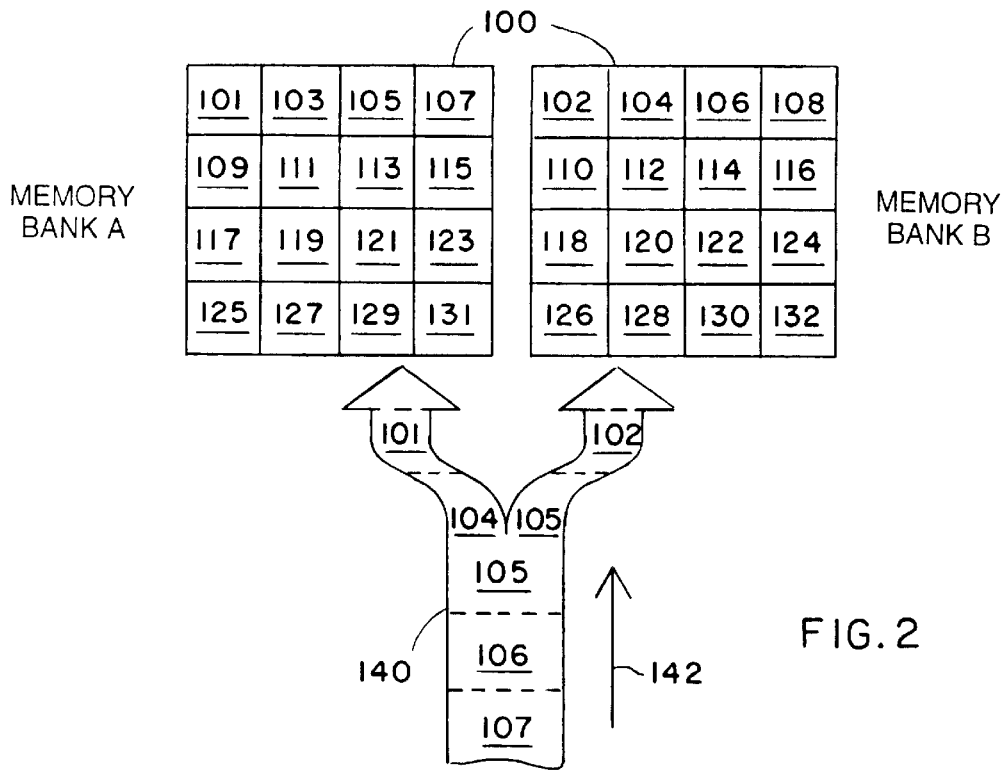
FIG. 2 is a diagrammatic illustration which shows two, separate memories which are interleaved with a predetermined segment size and the way in which a data stream is distributed between the memories in accordance with the present invention.

Continuing with a discussion of memory allocation considerations and referring to FIGS. 1 and 2, memory A and B controllers can be configured in several different ways. In one highly advantageous configuration, memories A and B are interleaved with a predetermined segment size 100. FIG. 2 graphically illustrates memories A and B gridded with memory segments so as to show this interleaving scheme in a very simplified way for purposes of understanding. Segment addresses alternate in a consecutive fashion between the memories with each segment 100 itself including contiguous addresses (not shown) over its own range. Odd numbered segments from 101 to 131 are located in memory A while even numbered segments from 102 to 132 are located in memory B. It should be understood that the interleaved addressing is accomplished at the hardware level by physical layers 48b and 48c of memory controllers 14 and 16, respectively. In this manner, memory interleaving is very fast and is essentially invisible to the other modules in system 10. That is, other modules in the system need have no specific knowledge of the interleaved addresses when reading from or writing to memory since all associated functions are performed at the hardware level by physical layer portion 44 of module interface arrangement 41, as will be seen in the example immediately hereinafter.

Still referring to FIGS. 1 and 2, an incoming data stream 140, which is moving in the direction indicated by an arrow 142 is illustrated as being stored in the respective odd and even segments of the two memories upon passing through memory controllers 14 and 16. For exemplary purposes, stream 140 is considered as a relatively large stream (i.e., larger than one segment 100) which flows from fixed disk 26 along a bus 144 to fixed disk interface 24. As best seen in FIG. 1, stream 140 passes from fixed disk interface 24 to link layer 46*d* and then is handed to physical layer 48*d*. The stream is segmented by physical layer 48*d* and travels along paths A and B wherein path A (indicated by an arrow) follows data bus A to physical layer 48*b* of memory bank A and path B (indicated by another arrow) follows data bus B to physical layer 48*c* of memory bank B, as best seen in FIG. 1. The memory controllers then store the data in the corresponding memory locations, as best seen in FIG. 2. It should be appreciated that the hardware interleaved memory capability of the present invention is achieved by the cooperation of the memory controllers, physical layer portions 48*b*–*d* and the bus controller since any operation which utilizes the bus arrangement is given access thereto by the bus controller in its bus arbitration role.

While the foregoing discussion represents a somewhat simplified description of the hardware interleaved memory configuration of the present invention, it serves to illustrate the specific way in which a data transfer which is larger than segment size 100 moves through system 10. Further details with regard to this operation will be made evident below, particularly with regard to the bus controller and module interactions which cause the stream to be segmented in the illustrated manner. While data stream 140 represents a write operation, it should be appreciated that read operations simply flow in a direction which is opposite that shown by arrow 142 such that a stream of outgoing data (not shown) is assembled by the cooperation of the memory controllers. Stream reassembly is a relatively simple task since the location of the stream's data may be specified with an initial address and a stream length. As an example, if the stream is 1000 bytes long and each segment holds 200 bytes, the stream could be stored in the five consecutive segments 101, 102, 103, 104 and 105. The location of this exemplary stream may be specified simply using the address of segment 101. Where more than two memory banks and associated controllers are provided, interleaving can be provided amongst all of the memory banks.

The segment interleaved memories of the present invention are highly advantageous for at least one particular reason. Specifically, segment interleaving allows memory access over the range of addresses which are specified in the interleaved address space to be distributed between two or more memory controllers. In so doing, accesses in this space, which might be used heavily by different modules, exercise both memory controllers evenly and take advantage of the full memory bandwidth available to the system. This is done automatically in hardware so as to require no software scheduling of memory in order to get the full memory bandwidth utilization (which in some operating systems would not be possible to do in software). Stated in another way, a long stream (such as stream 140) involving both memory controllers does not tie up the entire system memory. That is, since a particular stream, either outgoing or incoming, utilizes each memory only approximately fifty percent of the time, other data operations have significant access opportunities during the remaining approximate fifty percent of the time. This advantage is enhanced by the use of two or more data buses such that the memories may be involved in two simultaneously occurring data operations which may even alternate in a non-interfering manner between the two or more memories.

In a practical system, the interleaving segment size which is used may be based on a number of factors which vary depending on particular applications and implementations such as, for example, the expected average length of data transfers and the overhead required by the access to an interleaved segment. For the readers benefit, it is mentioned that the memory interleaving segment size is not to be confused with the data packet/period size to be described below. It should be noted that the present invention contemplates the use of more than two memories, as stated above. In fact, any number of memories greater than two may be used with the aforedescribed advantages being further enhanced so long as each memory is independently controllable. It is further noted that the separate memory controllers of FIG. 1 may be configured as a single unit having equivalent functionality.

Figure 3:
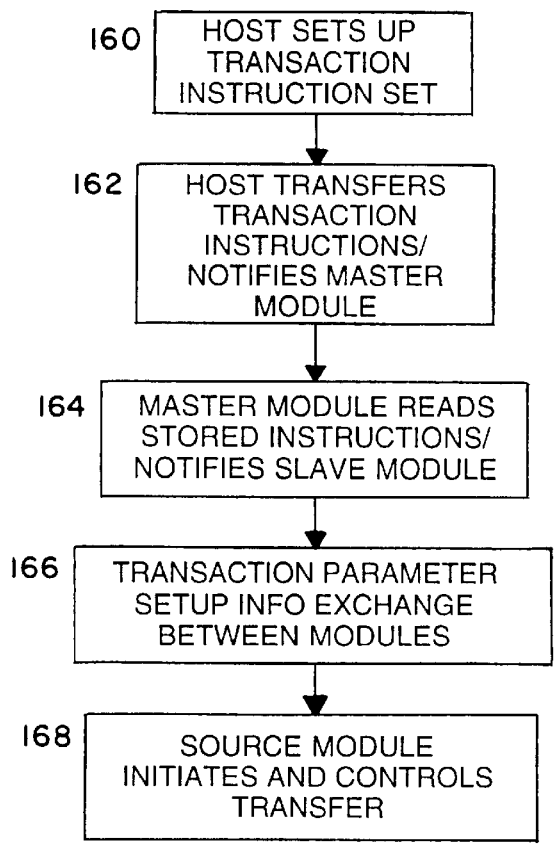
FIG. 3 is a flow diagram which illustrates the steps of the transaction execution technique of the present invention.

Having provided a basic understanding of the structure of system 10 and certain operational concepts embodied therein, a discussion of the specific way in which transactions are performed by the system will now be provided with initial reference to FIGS. 1–3. As in prior art systems, transactions in system 10 are typically requested by application software which is running on the system and are performed between modules. The process of performing a requested transaction begins with step 160 in which host processor 12 builds or sets up a transaction instruction set, for example, in its cache. Once the transaction instruction set has been completed, step 162 is performed in which the host processor may transfer the transaction instruction set in the manner of a typical transfer performed in accordance with the method of the present invention directly to locations within the system memory i.e., memory banks A and/or B over the bus arrangement. For example, the transaction instruction set might be stored in memory segment 107. Following movement of the transaction instruction set to memory, the host processor notifies whichever module serves as the master for the transaction as to the location of the transaction instruction set. At this point, responsibility of host processor 12 for execution of the transaction terminates until all or at least a portion of the transaction is executed between the modules. It is noted that certain commands, which will be described in context below, may be embedded within the transaction instruction set which re-involve the host processor.

Step 164 is next performed wherein the master module reads the stored instructions directly from memory and then addresses the slave module over address bus 50. In step 166, the slave sends data on the address bus to the master which includes all of the necessary parameters for executing the data transaction so as to appropriately configure the transfer to the two modules. The specific format used will be described below. Data which is sent to the master includes items such as, for example, which data bus(es) the slave is connected with, the time at which the data transfer can begin (which will prevent the master from requesting the data bus too early) a throttle control (i.e., the speed of the transfer) such that modules having different data transfer rate capabilities can be interconnected within the same system and the width control, which allows modules with different data widths (for example, 16 bits vs. 32 bits) to be interconnected in the same system. As an example of a particular transaction, if one module includes a data width of 16 bits and is capable of transferring at normal bus speed and if the other involved module includes a data width of 32 bits and is capable of transferring at one-half of normal bus speed, the transaction parameters will be selected to use a 16 bit bus width and data will be transferred no more frequently than on every other data cycle for this particular data transfer.

In addition to those parameters described immediately above, the source and destination modules of the transfer are identified. On a write transaction, the master module serves as the source while the slave module serves as the destination. Conversely, on a read transaction, the master module serves as the destination while the slave module serves as the source. It should be appreciated that this sort of highly advantageous transaction parameter setup technique has not been seen heretofore and serves to completely set up the data transfer using the typically under utilized address bus. In this manner, the efficiency of data bus utilization is further improved. Further attention will be devoted to the subject of the transaction parameter setup technique at appropriate points below.

Still referring to FIGS. 1–3 and in accordance with the present invention, the source module of any transaction initiates and controls the data transfer portion of any transaction in step 168. In this way, the source module need not initiate the data transfer until such time that the data is available. The subject data may not be immediately available to the source module for reasons including, but not limited to, the need to perform further processing, access delays causing wait states such as hard disk "spin up", refresh cycles in DRAM or contention for the data resource. Therefore, wait states which are commonly encountered by system 10 do not tie up the bus arrangement with inefficient bus hold delays. In other words, the bus arrangement remains available to the modules of the system irrespective of wait states. This implementation is highly advantageous as compared with the prior art convention wherein the master controls the entire transaction (whether the master represents the source or destination of the transaction data) so as to impose a bus hold delay for each wait state delay such that all buses associated with the transfer (typically the address and one data bus) are unavailable.

While the method illustrated by FIG. 3 represents a simplification of the overall transaction execution process employed by system 10, one of skill in the art will recognize that a highly advantageous and powerful technique has been disclosed in which a fixed time relationship is not required between the addressing and data portions of a transaction, as in the prior art. It is in this spirit that all transactions are performed by system 10. More specifically, a transaction instruction set is setup by the host processor such that its address and data portions can be performed independent of the host processor and separate in time from one another. Physical layer portion 44 then facilitates performing the address portion and the data portion at different times. Gaining the ability to allow the source module to initiate and control the data portion of any transaction is only one of the advantages which are realized by this technique. Another advantage resides in relieving the host processor of duties in supervising the execution of either the addressing or data transfer portions of the transaction. Still further advantages of the transaction processing approach of the present invention will be seen immediately hereinafter.

Figure 4A:
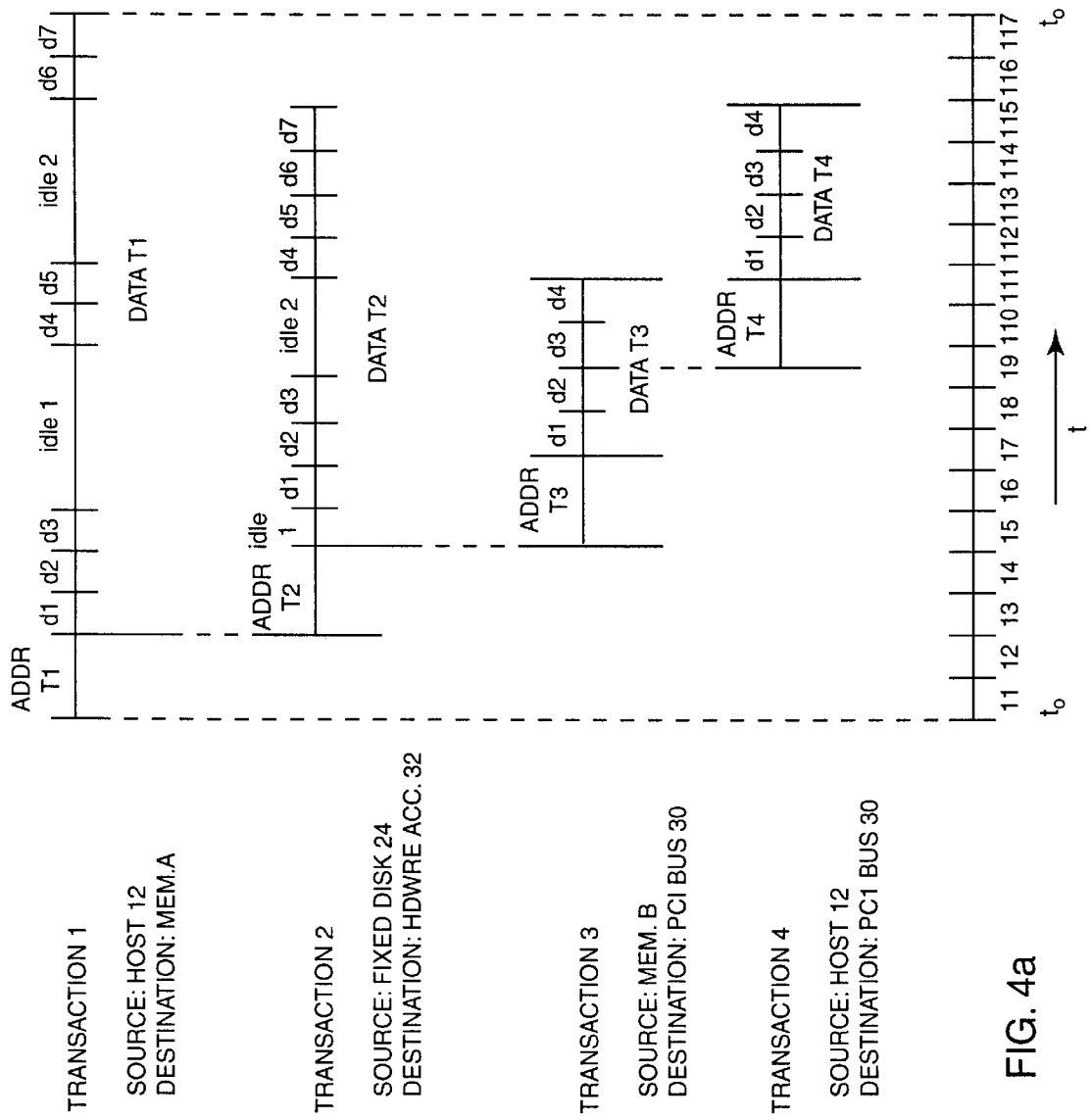
FIG. 4a is a graphic representation illustrating the execution of four transactions by the system of FIG. 1 and in accordance with the method of the present invention.

Referring now to FIG. 4*a* in conjunction with FIG. 1, a series of transactions to be performed on system are graphically represented as transactions 1, 2, 3 and 4 (hereinafter $T_1$, $T_2$, $T_3$ and $T_4$). The transactions include address portions which are individually labeled as ADDR $T_1$–$T_4$ (hereinafter $AT_x$, where x is the transaction number) and data portions which are individually labeled as DATA $T_1$–$T_4$ (hereinafter $DT_x$, where x is the transaction number). For descriptive purposes, a time line 180 is shown below the transactions. Time line 180 begins at time to, concludes at time tc and is divided into a series of intervals $I_1$–$I_{17}$. It is to be understood that the specific configurations of $T_1$–$T_4$, in combination, are chosen in a way which serves to illustrate a number of highly advantageous features of the present invention. Transaction address portions $AT_1$ through $AT_3$ are sequentially initiated on address bus 50 such that the address bus is completely utilized from the beginning of $I_1$ to the conclusion of $I_6$. It should be appreciated that the ability of system 10 to utilize the entire bandwidth of its address bus is a highly advantageous feature of the present invention. In initial implementations, it is contemplated that address bus utilization will be relatively low when only a few data buses are provided since data portions of transactions are typically much longer than corresponding address portions. For this reason, it is submitted that, in subsequent implementations, a single address bus operating at full utilization may service as many as 64 data buses. It is in these subsequent implementations that efficient address bus utilization is of the utmost importance in accordance with the teachings herein.

Still referring to FIGS. 1 and 4*a*, $T_1$ represents a first data transfer from host processor 12 (source) to memory bank A (destination), $T_2$ represents a second data transfer from fixed disk 24 (source) to hardware accelerator 32 (destination), $T_3$ represents a third data transfer from memory bank B (source) to PCI bus 30 (destination) and $T_4$ represents a fourth data transfer from host processor 12 (source) to PCI bus 30 (destination). Note that there is no need to describe these transactions in terms of read or write operations since the source module is identified in each case.

In accordance with the present invention, the data portion of each transaction is made up of idle periods and data periods. During idle periods for a particular transaction no data is present on bus arrangement 40 while during its data periods a corresponding "packet" of data is transferred over data buses A or B. For example, $DT_1$ includes two idle periods and data periods d1–d7 such that $T_1$ concludes at the end of d7 ($I_{17}$). Each transaction is considered as being active from the initiation or inception of its address portion to the end of its last data period. Therefore, $T_1$ is active over $I_1$ through $I_{17}$, $T_2$ is active over $I_3$ through $I_{15}$ (the beginning of its address portion to the end of portion), $T_3$ is active over $I_5$ through $I_{10}$ and $T_4$ is active over $I_9$ through $I_{15}$. As described above, bus select function of the transaction parameter setup technique of the present invention. A number of factors may contribute to the data bus selection process. These factors include certain criteria such as, for example, duty cycle statistics maintained by the bus controller, current or predicted traffic levels on the buses, the speed with which a transaction can be completed or other considerations including, but not limited to minimum bandwidth requirements. Evaluation of these conditions may be dynamic. That is, bus selection is based on the immediate values of the aforementioned criteria which values change over time as system operations progress.

It is noted that the objective of slaves such as memory controllers is to complete their transactions as soon as possible so that subsequent transactions can be accepted whereby to avoid retries, as will be described. Another criteria relates to the actual bus interconnections made within system 10. For example, memory bank A is not connected to data bus B while memory bank B is not connected to data bus A. Therefore, bus controller 60 must select data bus A for $T_1$ since memory A is the destination module of the transaction. For transaction 3, bus controller 60 must select data bus B since memory B is the source module of the transaction. Selection of a data bus on which to transact $T_2$ may be performed based upon the aforementioned criteria since the source and destination modules of transaction 2 are each connected with both data buses. In the present example, $DT_2$ is performed on data bus A.

In comparing $T_1$ and $T_2$, it is apparent that the data periods of one transaction occur during the idle period or periods of the other transaction since DT1 and DT2 are both transacted on data bus A. In this regard, it should be appreciated that data bus A is used in a highly advantageous way. That is, from the beginning of DT1 at $I_3$ to the conclusion of transaction $T_1$ at the end of $I_{17}$, data bus A experiences 100 percent utilization. The way in which data periods of two transactions, such as transactions $T_1$ and $T_2$, are interleaved on one data bus is determined by bus controller 60 based, for example, on a readily providable fairness algorithm which optimizes access to the data buses for the various modules within the system. In this manner, short data transfers may be given higher priority on the bus arrangement than long data transfers such that access to the data buses for any particular module is not denied for an extended period of time. $T_3$ and $T_4$ are representative of such short transfers. It is also important to note that system 10 is configured such that handshaking on bus arrangement 40 is minimized. Specifically, consecutive data periods which constitute at least a portion of one data transfer on one of the data buses may be executed with no intervening handshaking operations. System recovery, in the event that an error occurs during such handshake free transfers, will be discussed at an appropriate point below. In and by itself, this feature is highly advantageous in optimizing the use of the available bus bandwidth.

As another advantage of bus arrangement 40, it should be appreciated that data buses A and B provide the capability of simultaneous execution of unrelated data transfers. A number of examples of this advantage are illustrated in FIG. 4. Specifically, d2–d3 of $T_2$ are executed on data bus A simultaneous with the execution of d1–d2 of $T_3$ on data bus B. As another example, d4–d5 of $T_1$ are executed on data bus A simultaneous with the execution of d3–d4 of $T_3$ on data bus B. As still another example, d4–d7 of $T_2$ are executed on data bus A simultaneous execution of d1–d4 of $T_4$ on data bus B.

Continuing to refer to FIGS. 1 and 4a, transaction $T_2$ represents a transfer which would produce a bus hold delay in a typical prior art system. More specifically, transaction $T_2$ is a read operation wherein the master is hardware accelerator 32 and the slave is fixed disk 24. In accordance with the present invention, fixed disk 24 is the source module for data transfer DT2 and, therefore, its physical layer 48d initiates and controls DT2 in cooperation with physical layer 48f of hardware accelerator 32. It should be noted that DT2 begins with an idle 1 period during interval $I_5$ immediately following AT2. This idle 1 period represents the access time of fixed disk 24 in the read operation. In a typical prior art system, data bus A would itself be idle during $I_5$ thereby reducing the utilization of available bus bandwidth. In contrast, the present invention utilizes the available bus bandwidth in an effective manner by executing data period d3 of transaction 1 on bus A during the idle 1 period of transaction $T_1$. Stated in another way, $T_1$ and $T_2$ are simultaneously active on data bus A over intervals $I_5$ through $I_{15}$. As will be further described immediately hereinafter, this latter feature has not been seen heretofore by applicants.

It has been seen above that system 10 permits more than one transaction to be active on a single data bus, keeping in mind that a transaction is active beginning with the start of its address portion and ends with end of its data transfer, as defined above. FIG. 4a serves to more fully illustrate the importance of this feature. In particular, all four transactions ($T_{1-4}$) are simultaneously active in system 10 over intervals $I_9$ and $I_{10}$. While, at first, this may not seem significant, it should be appreciated that more transactions are simultaneously active than the number of individual address and data buses within the system. Such capability is not present in the prior art. That is, a prior art system with one address bus and one data bus (for a total of two buses) is typically capable of sustaining, at most, only two active transactions simultaneously. In accordance with the present invention, system 10 is capable of supporting many more active transactions on its bus arrangement than the number of individual buses.

Continuing to refer to FIG. 4a, it should be appreciated that system 10 provides still another highly advantageous feature relating to transactions. This feature concerns the initiation times of different transactions in relation to the times at which they are completed. As an example, $T_1$ is initiated at $t_0$. Subsequently, transactions $T_2$, $T_3$ and $T_4$ are initiated at the beginnings of intervals $I_3$, $I_5$ and $I_9$, respectively, such that the transactions in numerical order. However, it can clearly be seen that the transactions are completed in the order $T_3$ first, then $T_2$ and $T_4$ (simultaneously on different data buses) and, lastly, $T_1$. Thus, the completion order is different than the initiation order. This feature has not been seen in the prior art and is highly advantageous in a number of different ways. As one example, this capability at least in part provides for the implementation of complex priority schemes using bus controller 60. In this regard, it is noted that idle periods may either be the result of bus allocation (i.e., the one bus with which a particular module is connected is currently in use) or, as in the example of $T_2$, the result of a source module initiating a data transfer only after the requested data is ready for transfer. Further details regarding both bus allocation and priority scheme implementations will be provided at appropriate points below.

Figure 4B:
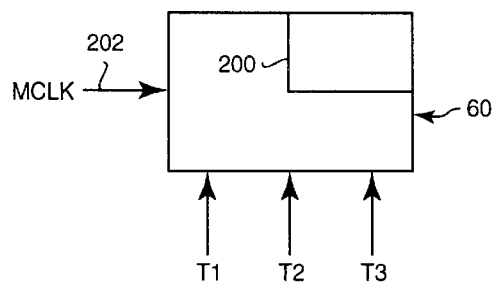
FIG. 4b is a diagrammatic representation illustrating the operation of a bus controller configured in accordance with the present invention.

Turning now to FIGS. 1, 4a and 4b while still considering the bus selection approach of the present invention, bus controller 60 includes a priority criteria segment 200 which includes information relating to each module which makes up system 10. Priority criteria segment 200 may, for example, be loaded into bus controller 60 at system startup and may be updated periodically based upon the needs of individual modules or upon any other relevant system parameter. It should be appreciated that each and every cycle on each data bus within a bus arrangement operating in accordance with the method of the present invention is arbitrated for through bus controller 60. That is, each cycle on each bus is proactively granted to one module out of the group of modules which are each requesting the use of the bus arrangement. In other words, for a particular cycle, the bus controller considers the request of each module based on, for example, each module's individual data rate and priority to determine which module is granted the use of the bus for that cycle. FIG. 4b graphically illustrates transactions $T_1$–$T_3$ each requesting the use of a data bus at the inception of $I_7$ such that these three transactions are active and in contention for the use of data buses A and B. It should be mentioned that $T_4$ is not shown in contention with the remaining transactions since DT4 begins later at $I_{11}$. Another input to bus controller 60 comprises a master clock signal 202 which defines the data cycles (and, for that matter, the address cycles) throughout bus arrangement 40. Master clock signal (MCLK) 202 will be described in detail at appropriate points to follow. It should be understood that FIG. 4a represents one way in which data periods are allocated to transactions 1–3 by the bus controller based upon criteria 200 using a particular fairness algorithm. As will be seen, the data periods may be allocated in other ways dependent upon either the criteria themselves or a different fairness algorithm.

Figure 4C:
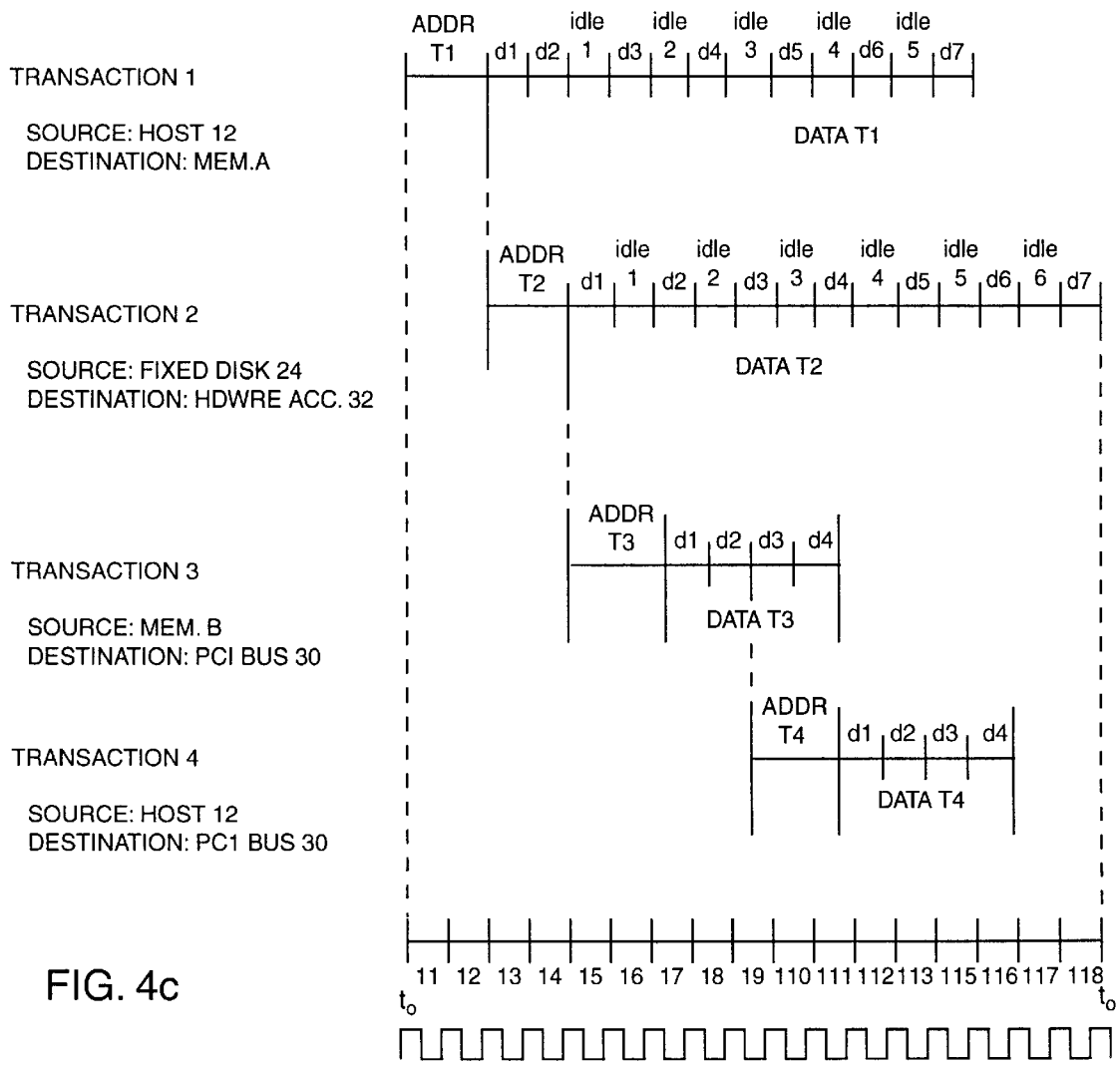
FIG. 4c is a graphic representation of the four transactions shown originally in FIG. 4a illustrating alternate way of executing the transactions in accordance with the method of the present invention.

Referring to FIG. 4c in conjunction with FIG. 4a, MCLK 202 is shown in one particular form wherein a leading edge of the MCLK signal initiates each of intervals $I_1$–$I_{18}$. Transactions 1–4 are shown once again, however, another allocation of the data periods for transactions 1 and 2 is illustrated, as based upon criteria 200 using, for example, a modified fairness algorithm as compared with that which produced the allocation shown in FIG. 4a. It should be noted that the data portions of $T_3$ and $T_4$ have not changed since both of these transactions utilize data bus B and there is no contention between the two transactions for this data bus. However, comparison of FIG. 4c with FIG. 4a reveals that the allocation of data periods for transactions $T_1$ and $T_2$ is quite different. Specifically, data periods for these two transactions now alternate on data bus A such that handshaking, for example, using the address bus is not required. In this manner, $T_1$ is completed at the end of $I_{13}$ while $T_2$ is completed at the end of $I_{18}$. Such an allocation of the data periods of $T_1$ and $T_2$ clearly demonstrates that each and every cycle on data bus A is arbitrated for through bus controller 60. It should be appreciated that this feature, in and by itself, is highly advantageous and has not been seen heretofore. Moreover, data bus A experiences 100% utilization over the duration of $T_1$ and $T_2$.

At this juncture, it should be appreciated that many of the aforedescribed advantages (as well as those yet to be described) are achieved, at least in part, by the heretofore unseen way in which the present invention carries out transactions. Specifically, addressing and data portions of each transaction are performed autonomously from one another. Of course, the address portion must be performed prior to the data portion. However, there are very few, if any, other restrictions introduced by this extremely flexible, adaptive technique. For example, there can be a delay between the end of a transaction's address portion and the beginning of its data portion. As another example, data periods for particular transactions can be intermingled with idle periods such that a large number of different transactions may be active simultaneously in the system.

Figure 5:
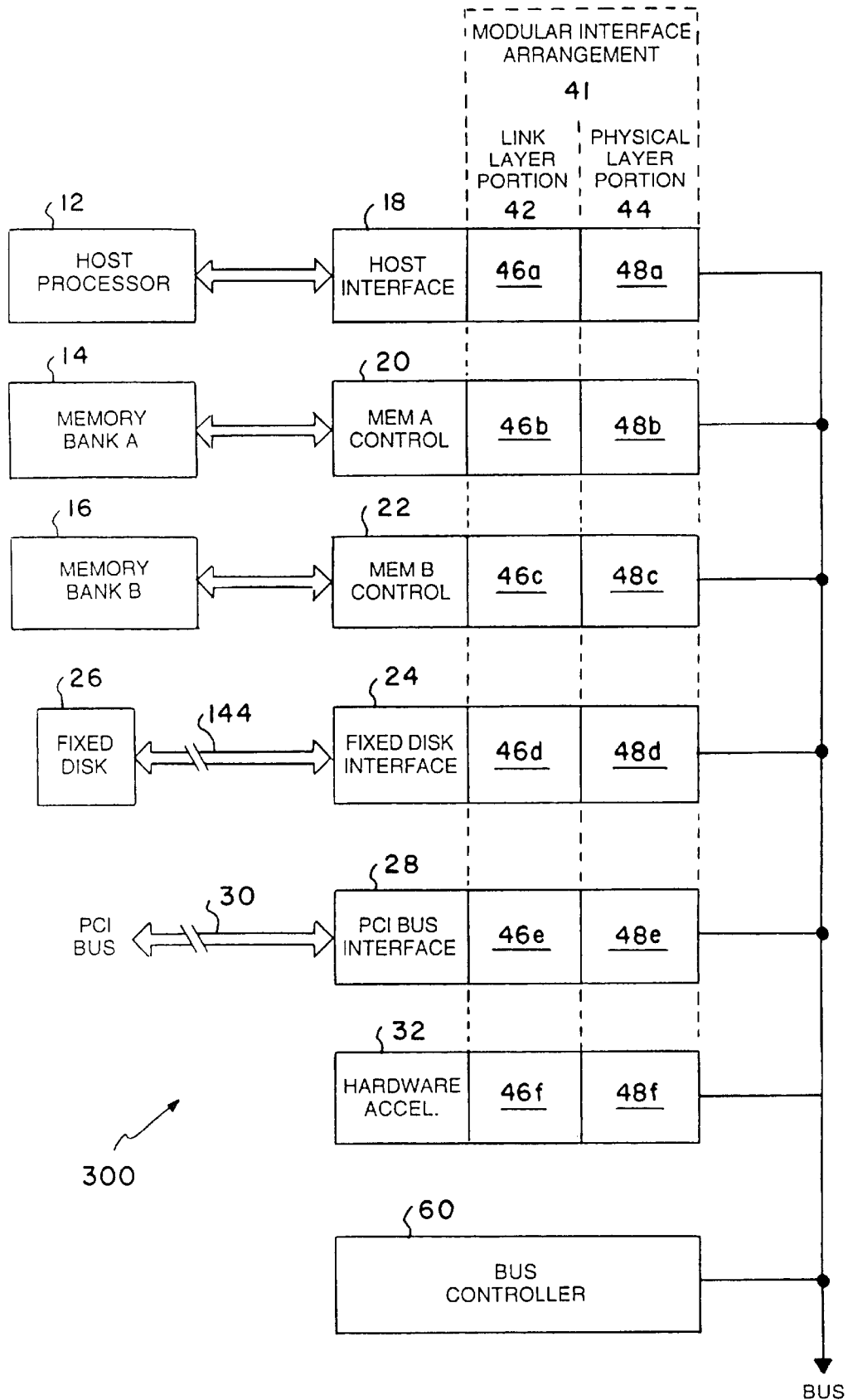
FIG. 5 is a block diagram illustrating another digital system including another bus arrangement which is implemented in accordance with the present invention.

Attention is now directed to FIG. 5 which illustrates another embodiment of a digital system manufactured in accordance with the present invention and generally indicated by the reference numeral 300. Because system 300 includes many of the same modules as previously described system 10, descriptions of these modules and their bus interfaces will not be repeated for purposes of brevity and like reference numbers are applied. Further, system 300 is implemented with a bus arrangement 306 having a multiplexed bus which interfaces with the physical layer of each module. Bus 308 is similar to prior art multiplexed buses to the extent that it carries all of the address and data information between the modules within the system. However, as will be seen below, system 300 provides many of the advantages described above with regard to system 10. It should be noted that the use of a multiplexed bus is considered to be a practical arrangement for interconnecting discrete modules, for example, on a printed circuit board since the number of electrical interconnections between the modules is decreased such that the overall cost of the printed circuit board is reduced. However, the present invention also contemplates a multiplexed bus arrangement at the chip level. Generally, the present invention is well suited to a multiplexed bus arrangement since significant performance improvements are gained through optimized bus utilization. In fact, multiplexed bus arrangements may enjoy an increase in popularity due to performance enhancements which are attributable to the teachings disclosed herein.

Figure 6:
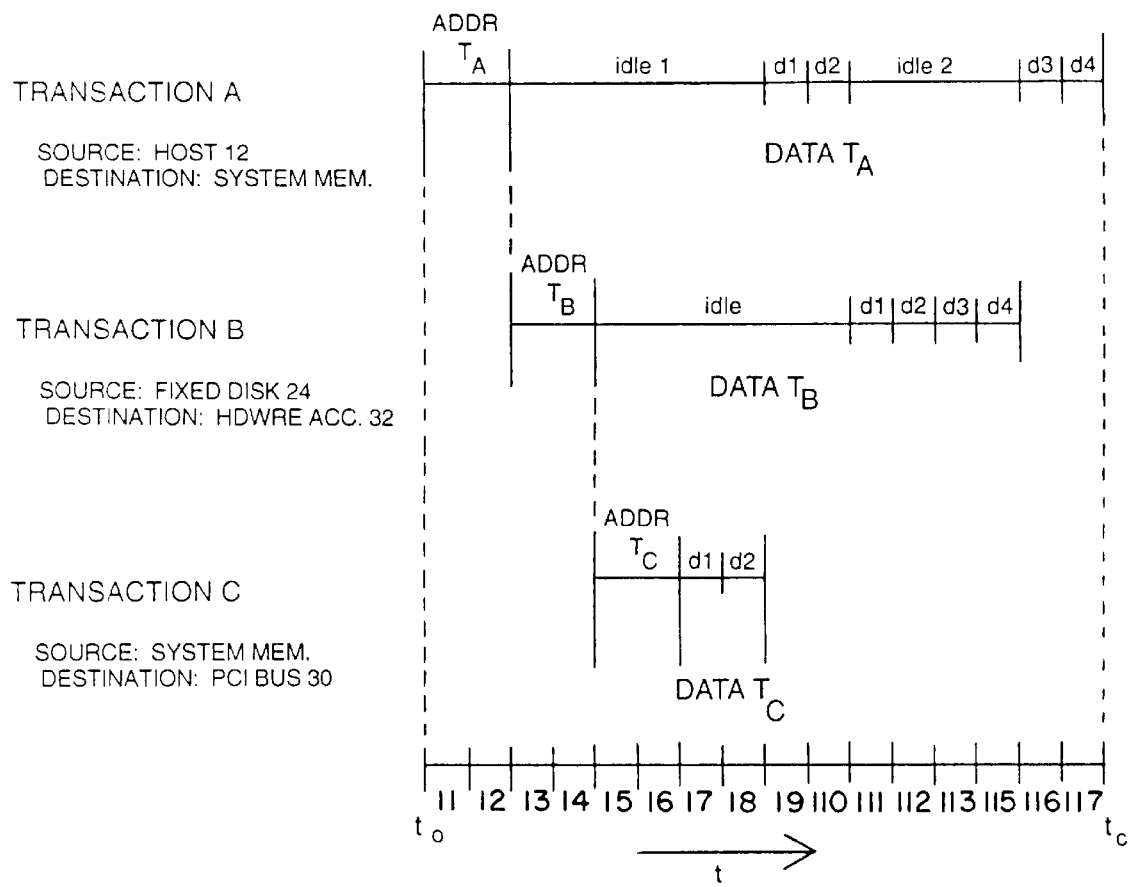
FIG. 6 is a graphic representation illustrating the execution of four transactions by the system of FIG. 5 in accordance with the method of the present invention.

Referring to FIG. 6 in conjunction with FIG. 5, a series of transactions to be performed on system 300 are graphically represented as transactions A, B and C (hereinafter $T_A$, $T_B$ and $T_C$). Like previously described transactions $T_1$–$T_4$, transactions $T_A$, $T_B$ and $T_C$ include address portions and data portions. The address portions are individually labeled as ADDR $T_A$–$T_C$ (hereinafter $AT_{A-C}$) while the data portions are individually labeled as DATA $T_A$–$T_C$ (hereinafter $DT_{A-C}$). Time line 180 is repeated below the transactions. For illustrative purposes, transaction address portions $AT_A$ through $AT_B$ are sequentially initiated on bus 304 from interval $I_1$ through interval $I_6$.

Continuing to refer to FIGS. 5 and 6, $T_A$ represents a first data transfer from host processor 12 (source) to system memory (destination), $T_B$ represents a second data transfer from fixed disk 24 (source) to hardware accelerator 32 (destination) and $T_C$ represents a third data transfer from system memory (source) to PCI bus 30 (destination). As in system 10, the address portion of each transaction is performed on bus 304 without interruption. Further like system 10, the data portion of each transaction is made up of idle periods in which no data is transferred for that transaction and data periods in which data packets are transferred over bus 304. For example, $DT_A$ includes two idle periods and data periods d1–d4 such that $T_A$ is active over $I_1$ through $I_{17}$. Transactions $T_B$ and $T_C$ are active over $I_3$ through $I_{15}$ and over $I_5$ through $I_8$, respectively. Since bus arrangement 306 includes a single bus, bus controller 60 is configured for performing all arbitration and allocation functions with regard to the use of this bus. Interleaving of the three transactions on bus 304 may be based, for example, on the aforementioned fairness algorithm by considering both addressing and data portions of transactions. The objective of the fairness algorithm is optimize bus access in a way which completes all transactions as soon as possible while still providing bus access to each module, irrespective of long data transfers. For example, short data transfers such as $T_C$ may be given higher priority on the bus arrangement than long data transfers.

In accordance with the use of a single bus, comparison of $T_A$, $T_B$ and $T_C$ reveals that address and data periods of one transaction occur during the idle period or periods of the other transactions when transactions are simultaneously active. In this regard, it should be appreciated that bus 304 experiences 100 percent utilization from the beginning of $I_1$ through the end of $I_{17}$. For this reason alone, system 300 may achieve data throughput levels exceeding that of prior art systems having separate address and data buses. Like system 10, system 300 is configured such that handshaking on bus arrangement 306 is not used between consecutive data periods/packets so as to further enhance data throughput.

At first appearance, it may seem that separately controllable memory banks A and B represent redundant resources within system 300 since only one memory may be accessed at a time by bus arrangement 308. However, the use of these separate memories is highly advantageous for reasons beyond provisions for simultaneous memory accesses to two or more separate memories. For example, memory banks A and B may be different types of memory such as RAM and ROM. As another example, bank A may comprise static RAM while bank B may comprise dynamic RAM in which case different interface types are required. As still another example, if memory banks A and B both comprise dynamic RAM which require a refresh cycle, the refresh cycles may occur alternately between the two memory banks such that access may be gained to one or the other of the memory banks in spite of the refresh cycle. Thus, it should be apparent that the use of separately controllable memories is advantageous for these reasons irrespective of the of the bus arrangement configuration (i.e., the number of separate address and data buses) which is employed.

Still describing the features of system 300, transaction $T_B$ (like previously described transaction $T_2$ of FIG. 4) illustrates a read operation from fixed disk 24 which entails an access delay that is represented as an initial idle time. In this regard, system 300 shares the advantages of system 10 since bus 304 may be utilized by a different transaction during the idle time of $T_B$. In the present example, $T_C$ is completed in its entirety during the idle time of $T_B$ and, thereafter, a portion of data transfer $DT_A$ is completed. As still another advantage which is shared with system 10, system 300 permits more than one transaction to be active on a data bus 304. Specifically, all three transactions ($T_{A-C}$) are simultaneously active in system 300 over intervals $I_5$ through $I_8$. Thus, two or more transactions can simultaneously be active even though the system possesses only one bus. Yet another similar advantage resides in the ability of system 300 to complete transactions in an order which is different than the order in which they were initiated. For example, the transactions are initiated in the order $T_A$, $T_B$, $T_C$ but are completed in the reverse order $T_C$, $T_B$, $T_A$. As in system 10, the advantages of system 300 are in many cases associated directly with the transaction processing technique of the present invention which provides for performing the address and data portions of a transaction without the need to maintain a fixed time relationship therebetween.

Figure 7:
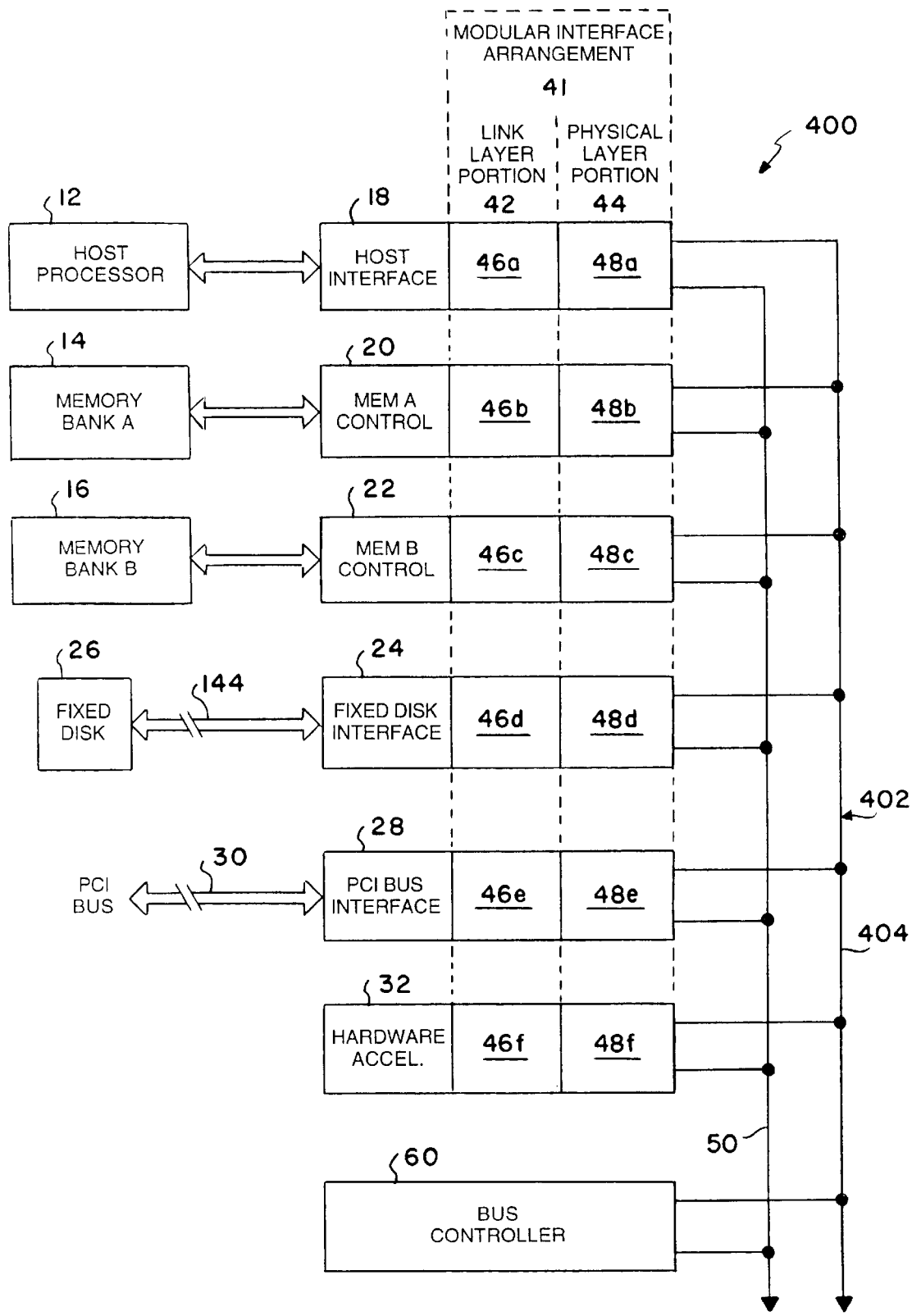
FIG. 7 is a block diagram illustrating a digital system including another embodiment of a bus arrangement which is implemented in accordance with the present invention.

Turning now to FIG. 7, still another embodiment of a digital system is illustrated as manufactured in accordance with the present invention and generally indicated by the reference numeral 400. Because system 400 includes many of the same modules as previously described systems 10 and 300, descriptions of these modules and their bus interfaces will not be repeated for purposes of brevity and like reference numbers are applied. In this example, the memory A and B arrangement of system 10 has been retained with appropriate changes made within physical layers 48b and 48c of the memory A and memory B controllers, respectively, such that simultaneous access to the memories is facilitated, as will become evident below. In addition, system 400 is implemented with a bus arrangement 402 including previously described address bus 50 and a single data bus 404 such that each bus interfaces with the physical layer of each module. As will be seen, system 300 provides many of the advantages described above with regard to system 10 and all of the advantages associated with system 300.

Figure 8:
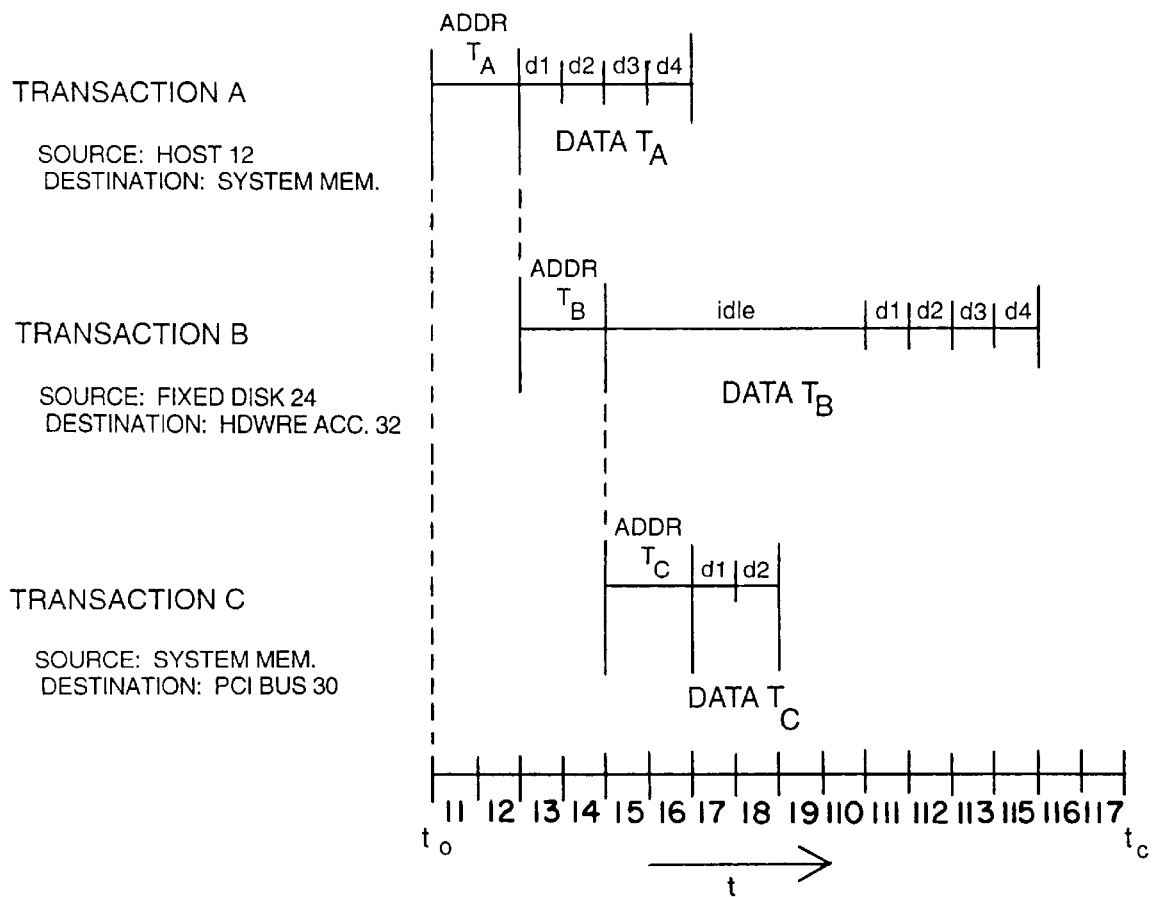
FIG. 8 is a graphic representation illustrating the execution of three transactions by the system of FIG. 7 in accordance with the method of the present invention.

Referring to FIGS. 6–8, it should be noted that FIG. 8 is similar to previously described FIG. 6 and illustrates its transactions $T_A$, $T_B$ and $T_C$ as performed in one possible way by system 400. For this reason, the reader's understanding may be further enhanced by direct comparison of FIGS. 6 and 8. It is also noted that these transactions may be performed in a number of different ways by system 400 and that the present example has been selected as effectively illustrating the advantages of system 400 in light of the advantages of previously described systems. Because the transaction execution technique of the present invention remains unchanged as embodied by system 400 and has been described in detail above, the present discussion will be focused upon on the advantages of system 400 over system 300. To that end, it is evident that the presence of data bus 404 in system 400 allows the system to advantageously execute a data transfer on data bus 404 while simultaneously executing the address portion of another transaction on address bus 50. Two examples of this advantage are evident, as will be seen.

In a first example, the address portion of $T_B$ is performed on address bus 50 as d1 and d2 of $DT_A$ are performed on data bus 404. In a second example, the address portion of $T_C$ is performed on address bus 50 as d3 and d4 of $DT_A$ are performed on data bus 404. Thus, $T_A$ is completed with interval $I_6$ by system 400 as compared with being completed with $I_{17}$ by system 300 such that $T_A$ is the first transaction which is completed by system 400. It should be noted that the appearance of $T_B$ and $T_C$ are unchanged in FIG. 8 as compared with FIG. 8. At first, it may seem as though d1 of $DT_B$ should proceed on data bus 404 immediately following the completion of d2 of $DT_C$ on the data bus. This could be possible depending upon the nature of $T_B$, however, it will be recalled that the initial idle period in $DT_B$ is imposed by the access time of fixed disk 24.

Continuing with the discussion of system 400, it is to be understood that all of the inventive features that have been described in conjunction with previous embodiments, that is, the multiple data bus arrangement of system 10 and the multiplexed bus arrangement of system 300, are equally applicable as features of system 400 except, of course, those features which specifically require two or more data buses. Once again, it is emphasized that system 400, like previously described systems, utilizes the transaction processing technique of the present invention so as to achieve its attendant advantages.

Referring again to FIG. 1, it is to be understood that the present invention is intended to provide a very high performance synchronous module interconnection system at either the chip level or between discrete modules. At the chip level, independently designed and verified integrated circuit modules may easily be assembled into a single IC so as to permit reliable, modular design of complex chips. For example, a dashed line 420 surrounds components of system 10 which may readily be implemented as a single IC in accordance with the concepts of the present invention. Therefore, large IC designs can be created by simply assembling pre-designed and pre-tested modules, without lengthy system debug and test cycles as required in the prior art. Since integrated circuit fabrication capabilities are advancing faster than the corresponding design capability, this plug-in methodology will become more and more important over time. As will be seen, the design protocols disclosed herein provide an interconnection mechanism which differs from standard processor and system busses in several areas which are critical to integrated circuit implementations. In particular, the bus arrangement of the present invention is scaleable, to allow for flexibility in chip implementations; synchronous, to allow for reliable operation in a variety of large circuits; and specifically optimized for the high burst bandwidths required by sophisticated multimedia applications. As a result, the bus arrangement of the present invention is not only useful as a standard interconnection platform for current digital products, but for a wide variety of future digital products, as well.

With regard to the modular approach taken by the present invention, it should be noted that standardized access to the bus is provided for each module through module interface arrangement 41. Thus, link layer portion 42 and physical layer portion 44 of the module interface arrangement isolate the complexity of interface design considerations of the present invention from the design of the modules themselves. In this way, module design is simplified and the possibility of inadvertent inferior design of new modules, which may be designed by third party vendors, is dramatically reduced. Moreover, module designers need only be concerned with verifying proper module response in a relatively straight forward module interface environment, as provided by the present invention. Such considerations are important in that the bus arrangement of the present invention represents a high performance resource which may not provide all of the advantages disclosed herein if it is not accessed in an optimized manner.

Using the specification to this point and FIGS. 1–8, it is considered that one of ordinary skill in the art may readily practice the present invention in view of the teachings therein. However, for further explanatory purposes, the bus arrangements and method disclosed thus far will be described in more detail in conjunction with FIGS. 9–18. It is noted that the term FusionBus, as seen hereinafter, is intended to be a bus arrangement manufactured in accordance with the present invention and is a trademark of Fusion MicroMedia Corporation, Longmont, Colo.

1. Introduction

FusionBus™ is the standard integrated circuit interconnection platform developed by Fusion MicroMedia to facilitate the creation of a broad variety of complex products. With FusionBus, large IC designs can be created by simply assembling independently pre-designed and pre-tested modules, without the typical lengthy system debug and test cycles required today. Since integrated circuit fabrication capabilities are advancing faster than the corresponding design capability, this plug-in methodology will become more and more important over time. FusionBus has been architected specifically to adapt to the future design requirements of ever increasing bandwidth, complexity, and integration. It is also designed to allow easy adaptation of existing functions, and straightforward creation of FusionBus compatible modules in the future.

FusionBus is a very high performance synchronous module interconnection system designed to allow independently designed and verified integrated circuit modules to be easily assembled into a complex IC. This provides a unique interconnection mechanism which differs from standard processor and system busses in several areas which are critical to integrated circuit implementations. In particular, FusionBus is scaleable, to allow for flexibility in chip implementations; synchronous, to allow for reliable operation in a variety of large circuits; and specifically optimized for the high burst bandwidths required by sophisticated multimedia applications. As a result, FusionBus can and will be used as a standard interconnection platform for a wide variety of future products.

This describes the detailed specification of the FusionBus, and also provides details of the implementation of the Physical Layer, which is the hardware realization of the FusionBus.

2. Bus Structure

Figure 9:
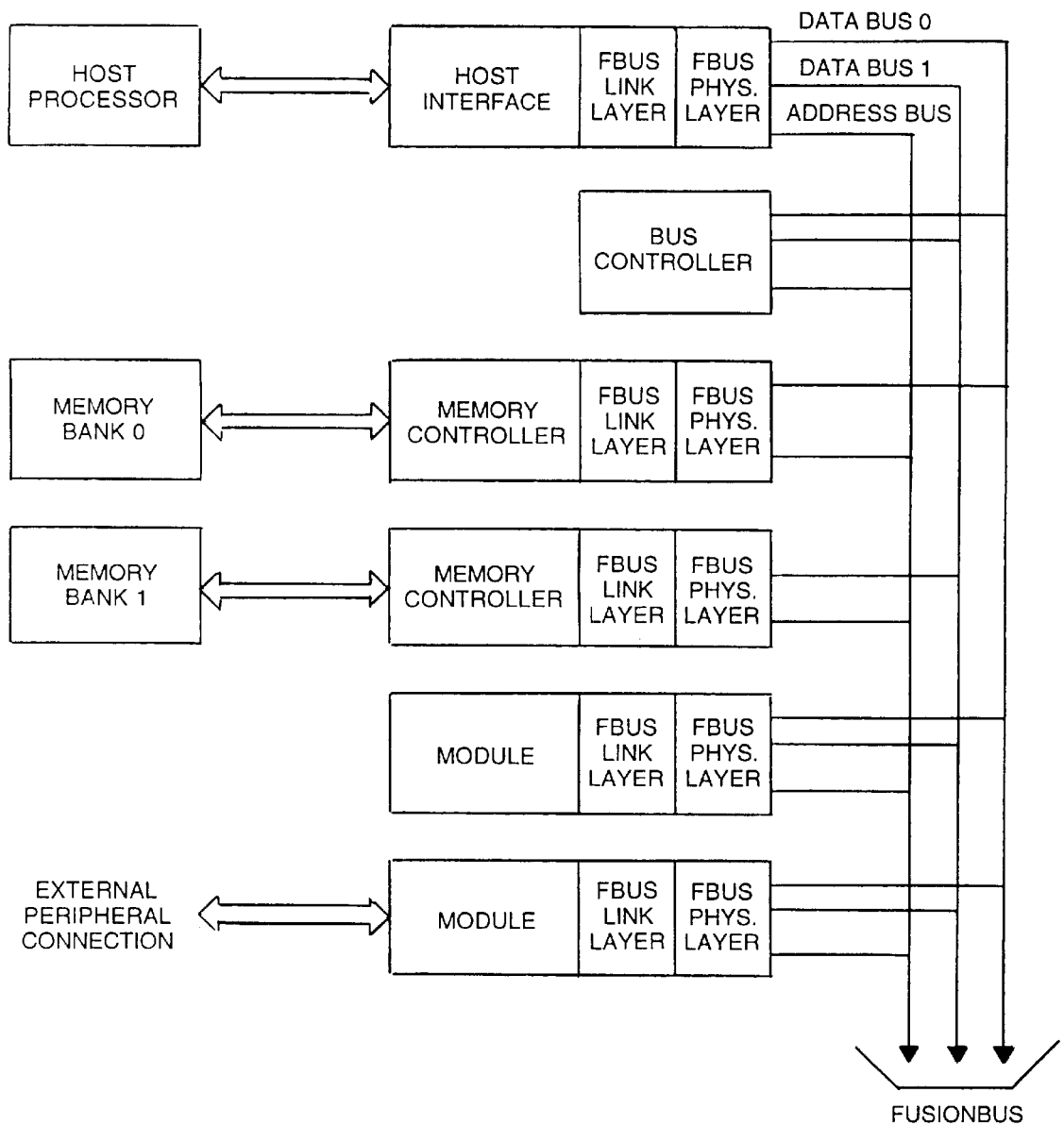
FIG. 9 is a block diagram illustrating a system manufactured in accordance with the teachings herein which is referred to as a "FusionBus" system.

FIG. 9 shows the various elements of a FusionBus system. The FusionBus itself consists of an Address Bus and one or more Data Busses. Each bus includes not only the Data or Address signals, but all of the arbitration and handshaking signals. Each of the elements of the system performs a particular set of functions, and are designed so as to maintain as much commonality as possible between modules within a system and in different systems.

In general, all modules on the FusionBus are similar except for the Bus Controller, which performs all of the global arbitration and bus allocation functions. Typical modules contain the capability of being both Masters and Slaves on the Bus, and connect to all of the Data Busses. The primary exception to this structure are the Memory Controllers, which contain only Slave functionality and connect to only one of the Data Busses.

The FusionBus in its first implementation has a 32 bit Address Bus, so there is a 4 GB address space. Each slave responds to a portion of this address space, whose size is determined by the module but whose address is programmable. Any Master can initiate a transfer with any slave, allowing peer to peer transfers between modules.

Each module consists of three components: the FusionBus Physical Layer, the FusionBus Link Layer, and the module logic. The Physical Layer implements the FusionBus handshaking, address decoding, and transfer counting for both Master and Slave functions. The Link Layer implements the MultiStream protocol processing and the linking of multiple transfers into the MultiStream operation. The module logic implements the actual module function. Modules may be completely self contained, such as the 3D accelerator or the MPEG-2 decoder, or they may contain connections external to the chip such as the PCI Interface or the Display Controller.

The Host Interface is somewhat different in that it has few, if any, Slave functions. It also has a higher priority than other modules to allow for fast, low latency accesses which are bursts. The Host Interface module logic may contain a Level 2 Cache Controller, in which case it does have more Slave capabilities. The Host Interface also contains the logic which implements Configuration Mode, which is a special access method allowing direct processor access to individual modules without using the FusionBus protocol. Configuration Mode is used to initialize the system, to read module IDs to determine the system configuration, to set up the FusionBus address space on each module, and to implement error recovery from hardware or software hang conditions. Other than these differences, a Host Interface will include the Physical and Link Layers just as in other modules.

3. Physical Bus Connection

Figure 10:
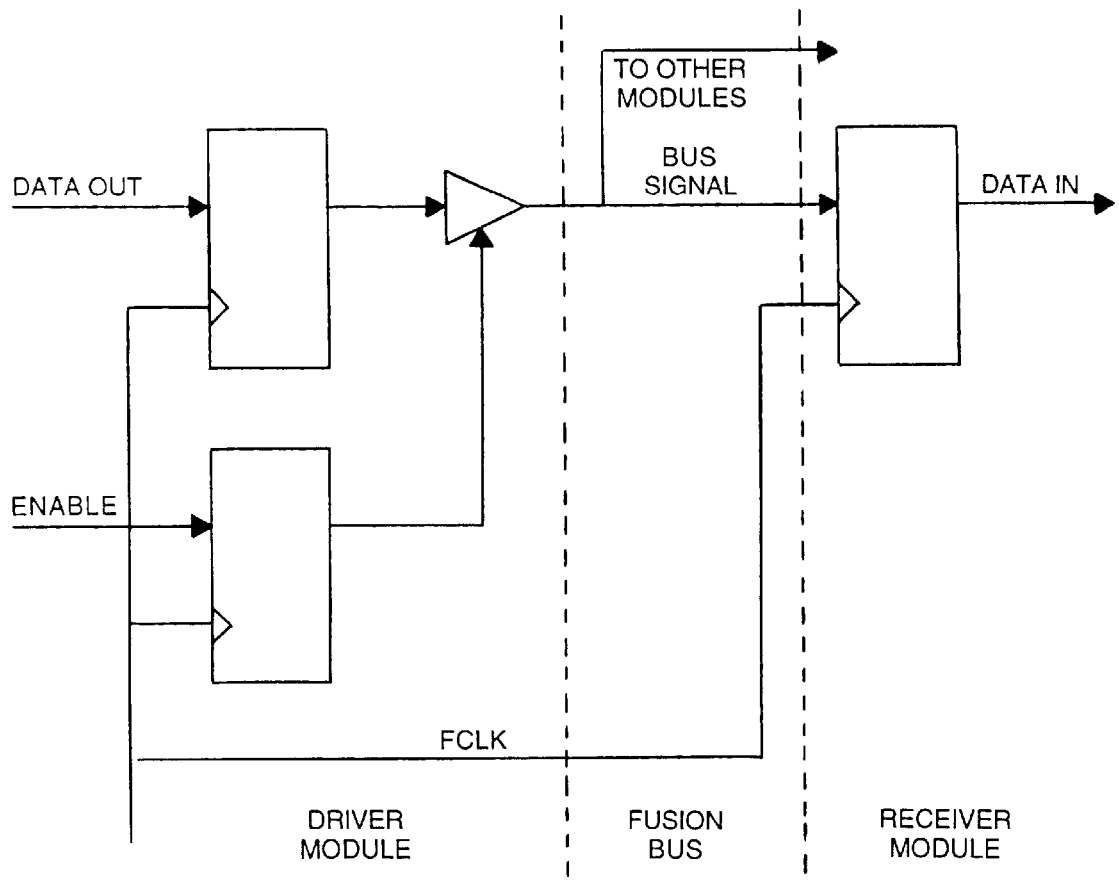
FIG. 10 is a block diagram illustrating a flip flop module interconnection interface designed in accordance with the present invention.

Since modules connecting to the Fusion Bus can be on any part of a large integrated circuit, there can be significant wiring delays on the bus signals themselves. To minimize the effects of these delays on overall performance (i.e. the frequency of bus transactions), every signal on the FusionBus is registered at both ends. In addition, there must be a master chip clock FCLK, which is distributed so as to minimize clock skew, which clocks all of the register flip flops. A typical signal circuit is shown in FIG. 10.

This implementation optimizes performance (in terms of the frequency of FCLK) for the Fusion Bus, and significantly simplifies the integration of large and complex integrated circuits.

4. FusionBus Signals

The FusionBus is made up of two sets of physical signals. The single Address Bus makes up one of the sets, and the second set consists of one or more Data Busses, all of which are identical.

4.1 Address Bus

Table 1 lists all of the signals in the FusionBus Address Bus. Type Indicates the signal's connection, with All meaning that the signal connects to all modules, Ind. meaning that each signal in the group connects one module to a central module such as the Bus Controller or Host Interface, and Sgl meaning that the signal connects from a single module to all other modules. Connections describes the modules to which the signal connects, and the direction of the signal. Level indicates the physical signal type, with T/S meaning a tristate signal, Std. Being a standard CMOS driver, WOR meaning a signal driven low by the source and pulled high otherwise, and CBuf indicating a clock buffer driver.

TABLE 1

| Signal | Type | Connections | Level | Description |
|---|---|---|---|---|
| FB_ADDR[31:00] | All | Master -> Slave | T/S | Address Bus |
| FB_CFGREQ | Ind. | Host -> Ctrl. | Std | Configuration Request |
| FB_AREQ[31:00] | Ind. | Master -> Ctrl. | Std | Address Request |
| FB_AGNT[4:0] | Sgl | Ctrl. -> Master | Std | Address Grant |
| FB_ARDY | All | Master -> Slave | WOR | Address Ready Strobe |
| FB_AACK | All | Slave -> Master | WOR | Address Acknowledge |
| FB_ARETRY | All | Slave -> Master | WOR | Address Retry |
| FB_SRETRY | All | Snoop -> Master | Std | Snoop Address Retry |
| FB_SSPEED[4:0] | All | Slave -> Master | T/S | Slave Mode Speed |
| FB_MSPEED[4:0] | All | Master -> Slave | T/S | Master Mode Speed |
| FB_ADATA[2:0] | All | Slave -> Master | T/S | Data Bus Selector |
| FB_READ | All | Master -> Slave | T/S | Read/not Write |
| FB_MEMIO | All | Master -> Slave | T/S | Memory/not I/O |
| FB_COUNT[9:0] | All | Master -> Slave | T/S | Byte Count |
| FB_IRQ[31:00] | Ind. | Module -> Host | Std | Interrupt Request |
| FB_MSTRID[4:0] | All | Master -> Slave | T/S | Master ID |
| FB_AWAIT[2:0] | All | Slave -> Master | T/S | Address Wait Value |
| FB_LOCK | All | Master -> Slave | T/S | Resource Lock Request |
| FB_CONFIG | Sgl | Host -> All | Std | Initialization Selection |
| FB_INTACK | Sgl | Host -> PCI | Std | Interrupt Acknowledge Cycle |
| FB_NOBE | All | Master -> Cache | WOR | Not all byte enables asserted |
| FB_TESTMODE | Sgl | Host -> All | Std | FusionBus Test Mode |
| FRST | Sgl | Host -> All | Std | Module RESET |
| FCLK | Sgl | Host -> All | CBuf | Main System Clock |

4.1.1 Signal Definitions

FB_ADDR[31:00]—the Address Bus, which carries the starting address of a burst from the Master to the Slave. Note that this is a Byte Address even though the Data Bus will transfer Word64 values (64 bits). The byte addressing is necessary to allow a Cache Controller to correctly snoop the address range of a data transfer.

FB_AREQ[31:00]—the Address Request lines, one from each module to the Bus Controller. These lines are used to request use of the Address Bus by a Master.

FB_CFGREQ—Configuration Request, from the Host Interface to the Bus Controller. This indicates that the Host Interface is requesting a Configuration operation, and the Bus Controller will immediately grant the Address Bus and all Data Busses to the Host Interface and continue to do so until FB_CFGREQ is removed.

FB_AGNT[4:0]—the Address Grant bus, which indicates in an encoded form the Master which has been granted the Address Bus by the Bus Controller.

FB_ARDY—Address Ready, which is driven by the Master to indicate to slaves that the Address Bus contains an address to be decoded, and that the FB_COUNT, FB_MSTRID, FB_MSPEED, FB_MEMIO and FB_READ signals are also valid.

FB_AACK—Address Acknowledge, driven by the addressed Slave to indicate that the address request has been accepted. This indicates that the FB_SSPEED, FB_ARETRY, FB_SRETRY, FB_AWAIT and FB_ADATA signals are valid.

FB_ARETRY—Address Retry, driven by an addressed Slave (along with FB_AACK) to indicate that the address was decoded but not accepted by the Slave.

FB_SRETRY—Snoop Address Retry, driven by the Snooping Cache Controller to indicate that the address was decoded as being cacheable and a cache snoop operation must occur. If there is not a Snoop Controller in the system, this signal need not be implemented by any Modules.

FB_SSPEED[4:0]—The Slave speed indicator. This is a five bit value which informs the Bus Controller of the minimum number of cycles to be inserted between grants in a transfer.

FB_MSPEED[4:0]—The Master speed indicator. This is a four bit value which informs the Bus Controller of the minimum number of cycles to be inserted between grants in a transfer.

FB_ADATA[2:0]—The Data Bus indicator, which the addressed Slave drives with the ID of the Data Bus to which it is connected. For systems with a single Data Bus, these signals are not used.

FB_READ—The Read/Write signal, which indicates whether the burst is a read (if 1) or a write (if 0).

FB_MEMIO—The Memory I/O signal, which indicates whether the reference is to memory (if 1) or I/O (if 0) space.

FB_COUNT[10:0]—Byte Count, indicating the length of the requested burst in bytes.

FB_IRQ[31:00]—the Interrupt Request lines, one from each module to the Bus Controller. These lines are asserted by a module when its internal interrupt function is activated.

FB_MSTRID[4:0]—Master ID, which indicates which Master has initiated the address transfer. The addressed Slave captures this data for comparison with the DGNT Bus during a write data transfer cycle.

FB_AWAIT[2:0]—The wait period suggested when an address retry is signaled, with the time defined in the following table.

| FB_AWAIT[2:0] | FCLK cycles to wait |
|---|---|
| 000 | 8 |
| 001 | 16 |
| 010 | 32 |
| 011 | 64 |
| 100 | 128 |
| 101 | 256 |
| 110 | 512 |
| 111 | No suggestion |

FB_LOCK—Lock, which is driven by a Master along with ARDY to indicate that the Slave should not accept accesses from any other Master.

FB_CONFIG—Configuration Selection, which indicates that Modules must decode the Configuration Address during Plug and Play system initialization. Configuration references are used for reading the Module's System ID, loading its address space registers, and loading other static parameters.

FB_INTACK—Interrupt Acknowledge Cycle, which indicates to the FusionBus to PCI Bridge that the Host Interface is requesting an Interrupt Acknowledge Cycle to be performed on the PCI Bus.

FB_NOBE—Not all Byte Enables, which is asserted if the Master cannot guarantee that all byte enable signals will be asserted for all words in the current transfer. Modules which always drive all byte enables do not need to connect to this signal.

FB_TESTMODE—Test Mode, which indicates that the Host Interface is executing a special test access. Test Mode is only used for chip testing and this signal should never be asserted during normal operation.

FRST—Initialize the module. This signal forces all modules into a known state.

FCLK—Main Clock, the system clock for all modules.

4.2 Data Bus (0 through 7)—Example of Data Bus x

Table 2 lists all of the signals in a FusionBus Data Bus. Type Indicates the signal's connection, with All meaning that the signal connects to all modules. Connections describes the modules to which the signal connects, and the direction of the signal. Level indicates the physical signal type, with T/S meaning a tristate signal, Std. Being a standard CMOS driver, and Wire-OR meaning a signal driven low by the source and pulled high otherwise. If there are multiple Data Busses, there is one such signal group for each of them, and each group is proceeded by Dx, where x is the bus number. If there is only a single Data Bus, the Dx prefix is not used.

TABLE 2

| Signal | Type | Connections | Level | Description |
|---|---|---|---|---|
| FB_DxDATA[63:00] | All | Source <-> Dest. | T/S | Data Bus |
| FB_DxDREQ[31:00] | All | Source -> Ctrl. | WOR | Data Request |
| FB_DxDGNT[4:0] | All | Ctrl. -> Source | Std | Data Grant |
| FB_DxDRDY | All | Source -> Dest. | WOR | Data Ready Strobe |
| FB_DxBE[7:0] | All | Source -> Dest. | T/S | Byte Enables |
| FB_DxDACK | All | Dest. -> Source | WOR | Data Acknowledge |
| FB_DxDISC | All | Any -> Any | WOR | Disconnect |
| FB_DxABORT | All | Any -> Any | WOR | Transfer Abort |

4.2.1 Signal Definitions

FB_DxDATA[63:00]—the Data Bus, used to transfer data between the Source and Destination.

FB_DxDREQ[31:00]—the Data Request lines, one from each module to the Bus Controller. These lines are used to request use of the Data Bus by a Source.

FB_DxDGNT[4:0]—the Data Grant bus, which indicates in an encoded form the Source which has been granted the Data Bus by the Bus Controller.

FB_DxDRDY—Data Ready, which is driven by the Source to indicate to Destinations that the Data Bus contains write data, or that read data is expected to be driven from the Destination.

FB_DxBE[7:0]—Byte Enables, which is driven by the Source to indicate to Destinations which bytes of the Data Bus contain valid write data or read data.

FB_DxDACK—Data Acknowledge, driven by the Destination to indicate that write data has been accepted from the Data Bus.

FB_DxDISC—Disconnect, driven by either the Source or Destination to indicate that the current transfer must be interrupted but must be restarted by the Master at some later time.

FB_DxABORT—Transfer Abort, driven by either the Source or Destination during a cycle to cause he other Module to end the current transfer even if the count has not been reached.

For any particular implementation, only those signals which are required are used. For example, if the system contains only seven modules with Source capability, then only FB_AREQ[06:00], FB_IRQ[06:00], and FB_DxDREQ[06:00] will be implemented.

5. Bus Protocol 5.1 Bus Protocol Overview

The FusionBus is designed around the basic concept of point to point transfers between modules connected to the bus. A transfer is initiated by a Master module, which uses the FusionBus Address Bus to connect to another module referred to as the Slave module. The Master connects with the Slave through an Address Transaction. If the Slave responds positively during the Address Transaction, a Connection is created between the Master and Slave. The Master has indicated the direction of the transfer during the Address Transaction, and thus the Source and Destination modules of the Connection are defined. For a write transfer, the Master is the Source, and the Slave is the Destination. Conversely, the Master is the Destination of a read transfer, and the Slave is the Source.

Once a Connection is made, the Source module then manages the actual data transfer on one of the FusionBus Data Busses, through a Data Transaction. Thus for a read transfer, the Master manages the Address Transaction but the Slave (which is the Source) manages the Data Transaction. The Source attempts to transfer one piece of data on each cycle in which it is granted ownership of the Data Bus being used for the transfer. One of the key features of the FusionBus is that ownership of the Data Bus is determined independently on each cycle by the Bus Controller. This means that a number of data transfers may occur between different pairs of connected modules in an interleaved fashion. The Destination must acknowledge receipt of each piece of data, and if such acknowledgment is not received by the Source, the Source will retry the data transfer until it is acknowledged or too many attempts have been made.

Since the Bus Controller allocates bus ownership on a cycle by cycle basis, multiple transactions of the same priority can proceed in an interleaved fashion, allowing extremely high utilization of the Data Busses.

The pipelining shown in the previous section simplifies the physical interconnection, but complicates the flow of arbitration and data transfers. Fortunately, there is a relatively small number of transaction types necessary to provide the required functions. These transactions will be described, and will be illustrated in a set of standard diagrams. In these diagrams, signals designated MST_* are signals on the Master, signals designated SLV_* are the equivalent (pipelined) signal on the Slave, signals designated BUS_* are signals on the actual interconnection bus, and signals designated ARB_* are in the Bus Controller. Each rectangle indicates a single FCLK cycle, numbered at the top of each diagram for reference. For Data Transactions, SRC_* indicates the signal at the Source module, and DST_* indicates signals at the Destination.

5.2 Address Arbitration Sequence

The first operation in a transfer, shown in Table 3, is the Address Transaction. In this operation a Master who wishes to initiate the transfer asserts their FB_AREQn line in cycle 1. This cycle is referred to as the Address Request Phase. In this example Master 2 has asserted its FB_AREQ (MST_AREQ). Two cycles later (cycle 3) this is visible at the Bus Controller (ARB_AREQ). On each cycle the Bus Controller observes all of the FB_AREQn lines and determines the next grant. It communicates this by generating the selected Master's ID on the FB_AGNT Bus (ARB_AGNT), in what is known as the Address Grant Phase. All Masters will then see this Grant two cycles later, in cycle 5. Each Master compares its ID with the FB_AGNT Bus, and removes its FB_AREQn signal when it detects its ID on FB_AGNT.

transaction, an error occurs and is signaled through an interrupt by the Master. The Slave also drives its speed on FB_SSPEED, and its wait suggestion on FB_AWAIT if a retry is signaled.

TABLE 3

Basic Address Arbitration

| CYCLE | 1 | 2 | 3 | 4 | 5 | 6 | 7 | 8 | 9 | 10 | 11 | 12 | 13 | 14 | 15 | 16 | 17 | 18 | 19 | |
|---|---|---|---|---|---|---|---|---|---|---|---|---|---|---|---|---|---|---|---|---|
| MST_AREQ | 2 | 2 | 2 | 2 | | | | | | | \ | | | | | | | | | |
| BUS_AREQ | | 2 | 2 | 2 | 2 | | | | | | | | | | Address Request Phase | | | | | |
| ARB_AREQ | | | 2 | 2 | 2 | 2 | | | | | / | | | | | | | | | |
| ARB_AGNT | | | | 2 | | | | | | | \ | | | | | | | | | |
| BUS_AGNT | | | | | 2 | | | | | | | | | | Address Grant Phase | | | | | |
| MST_AGNT | | | | | | 2 | | | | | / | | | | | | | | | |
| MST_ARDY | | | | | | 2 | | | | | \ | | | | | | | | | |
| BUS_ARDY | | | | | | | 2 | | | | | | | | Address Phase | | | | | |
| SLV_ARDY | | | | | | | | 2 | | | / | | | | | | | | | |
| SLV_AACK | | | | | | | | 2 | | | \ | | | | | | | | | |
| BUS_AACK | | | | | | | | | 2 | | | | | | Address Acknowledge Phase | | | | | |
| MST_AACK | | | | | | | | | | 2 | / | | | | | | | | | |

The Master who has a request pending and detects its ID on FB_AGNT must, on the cycle it sees FB_AGNT (cycle 5), drive FB_ARDY, its ID on FB_MSTRID, its FB_ADDR and FB_COUNT fields, the cycle type (read/write/memory or I/O) on FB_READ and FB_MEMIO, and its speed on FB_MSPEED. This is referred to as the Address Phase. This information (MST_ARDY) is seen by all Slaves two cycles later (cycle 7) as SLV_ARDY. Each Slave is continuously comparing the FB_ADDR and FB_MEMIO information when FB_ARDY is asserted to see if the reference is to its address space. When it detects an address in its space, the slave then replies with either Normal (it can accept the transaction request) or Explicit Retry (it cannot accept the request). This is indicated by asserting FB_AACK along with the indicator of which Data Bus the Slave is connected to (FB_ADATA), and asserting FB_ARETRY if there must be a retry. This is known as the Address Acknowledge Phase. If no slaves assert FB_AACK, an Implicit Retry occurs. This is handled by the Masters just as if a regular Retry cycle occurred. In either retry case the Master will assert its FB_AREQn signal and begin the arbitration again. Each Master contains a Retry Counter, and if 256 retries occur on an attempted Similar eight cycle sequences can be pipelined every clock cycle, with the Bus Controller providing new FB_AGNT information every cycle. Note that a Master with a single request will hold its FB_AREQn line for four cycles even if it is granted immediately, so the Bus Controller will mask this request after granting it. A Master must remove its FB_AREQ signal for at least one cycle before reasserting it to request another transfer.

5.3 Data Bus Transfer Sequence

Each Data Bus is arbitrated completely independently from the Address Bus, with the only restriction being that the data must be sent after the corresponding address transaction. Arbitration is similar to the Address Bus. For the Data Bus cycle there will be a Source Module which is the source of the data, and a Destination Module which is the destination. The Module which requests the Data Bus is always the Source Module of the transfer, and thus is determined by the direction of the transfer. On a write, the Master requests the Data Bus, while on a read transaction the Slave will request the Data Bus when it has data available to transfer. The result of this dichotomy is that all transfers on the Data Bus are controlled by the source of the data, and there is no distinction in the Data Bus operation due to the original Master. A typical Data Bus Transfer cycle is shown in Table 4.

TABLE 4

Basic Data Transfer

| BUS CYCLE | 1 | 2 | 3 | 4 | 5 | 6 | 7 | 8 | 9 | 10 | 11 | 12 | 13 | 14 | 15 | 16 | 17 | 18 | 19 | |
|---|---|---|---|---|---|---|---|---|---|---|---|---|---|---|---|---|---|---|---|---|
| SRC_DREQ | 2 | 2 | 2 | 2 | | | | | | | \ | | | | | | | | | |
| BUS_DREQ | | 2 | 2 | 2 | 2 | | | | | | | | | | Data Request Phase | | | | | |
| ARB_DREQ | | | 2 | 2 | 2 | 2 | | | | | / | | | | | | | | | |
| ARB_DGNT | | | | 2 | 2 | 2 | 2 | | | | \ | | | | | | | | | |
| BUS_DGNT | | | | | 2 | 2 | 2 | 2 | | | | | | | Data Grant Phase | | | | | |
| SRC+DST_DGNT | | | | | | 2 | 2 | 2 | 2 | | / | | | | | | | | | |
| SRC_DRDY | | | | | | 2 | 2 | 2 | 2 | | \ | | | | | | | | | |
| BUS_DRDY | | | | | | | 2 | 2 | 2 | 2 | Data Phase | | | | | | | | | |
| DST_DRDY | | | | | | | | 2 | 2 | 2 | 2 | / | | | | | | | | |
| SRC_DATA | | | | | 2 | 2 | 2 | 2 | | | | | | | | | | | | |
| BUS_DATA | | | | | | 2 | 2 | 2 | 2 | | | | | | | | | | | |
| DST_DATA | | | | | | | 2 | 2 | 2 | 2 | | | | | | | | | | |
| DST_DACK | | | | | 2 | 2 | 2 | 2 | | | \ | | | | | | | | | |
| BUS_DACK | | | | | | 2 | 2 | 2 | 2 | | | | | | Data Acknowledge Phase | | | | | |
| SRC_DACK | | | | | | | 2 | 2 | 2 | 2 | / | | | | | | | | | |

Each Source Module is connected to all of the Data Busses, each of which have their own arbitration logic within the Bus Controller. The Source Module asserts the FB_DxDREQn line which corresponds to the Module ID of the Master. On a write, this is the Source Module's ID, since it is the Master. On a read, it is the value captured from the FB_MSTRID signals during the Address Phase, since the Source is the Slave. This cycle is referred to as the Data Request Phase. The Bus Controller can assert FB_DxDGNT as soon as it receives FB_DxREQn in cycle 3, which is called the Data Grant Phase. The Source Module will see FB_DxDGNT in cycle 5. The Destination will also see FB_DxGNT in cycle 5, and since FB_DxDGNT corresponds to the Source Module's ID, the addressed Destination Module will know that this data cycle is for its pending operation. The default value of each FB_DxDGNT Bus is to grant the bus to the Processor (Module 0).

When the Source Module detects its ID on the FB_DxDGNT Bus, it drives FB_DxDRDY along with the data to be transferred on the FB_DxDATA bus. This cycle is known as the Data Phase. At the same time, the Destination detects the Module ID of the Master on FB_DxDGNT. If it will be able to accept the data two cycles later, it drives FB_DxDACK. This is referred to as the Data Acknowledge Phase. Two cycles later, the Source sees FB_DxDACK and the Destination sees FB_DxDRDY. If both of them are asserted, the data has been transferred.

Since both the Master (in the Address Phase) and the Slave (in the Address Acknowledge Phase) have driven their respective speed values, the Bus Controller is able to determine the slower of the two speeds. It then grants the Data Bus to the Master ID which corresponds to this connection no more often than the speeds indicate. For example, if the Master Speed (on FB_MSPEED) is 1 and the Slave Speed (on FB_SSPEED) is 2, the slower speed is 2 and the Bus Controller will leave at least two clocks between every two assertions of that Connection's FB_DxDGNT. The Bus Controller will assert the various FB_DxDGNT values as a function of the pending requests, priority values, and Connection speed values. Each Source and Destination Module which is currently participating in a Connection will constantly monitor the FB_DxDGNT bus, and will respond with a FB_DxDRDY or FB_DxDACK signal whenever the Module ID of the Connection master appears. The following sections will describe different cycle types in more detail.

5.4 Burst Write Cycle

Table 5 shows a single burst write. For this type of transfer, the Master Module is the Source and the Slave Module is the Destination. The first eight cycles are a Basic Address Arbitration, followed by a Basic Data Transfer operation with the Master as the Source Module and the Slave as the Destination Module. The Master (as the Source) can asserts its FB_DxDREQ line in cycle 9 to start the Data Transfer, since it must receive FB_AACK denoting the successful creation of the Connection before initiating the Data Transfer. In order to accelerate the generation of FB_DxDREQ to improve performance, the Slave will assert FB_DxDREQ at the same time as it asserts FB_AACK (in cycle 7), indicated by 2S in the Figure. It will drive FB_DxDREQ for two cycles, and then remove it. At that point the Master has seen FB_AACK and can begin driving FB_DxDREQ. Note that since all requests are on the Master's FB_DxDREQ line, the Bus Controller does not see any difference in the two requests.

TABLE 5

| CYCLE | Write Cycle | | | | | | | | | | | | | | | | | | |
|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 |
| Address Bus | | | | | | | | | | | | | | | | | | | |
| MST_AREQ | 2 | 2 | 2 | 2 | | | | | | | | | | | | | | | |
| BUS_AREQ | | 2 | 2 | 2 | 2 | | | | | | | | | | | | | | |
| ARB_AREQ | | | 2 | 2 | 2 | 2 | | | | | | | | | | | | | |
| ARB_AGNT | | | | 2 | | | | | | | | | | | | | | | |
| BUS_AGNT | | | | | 2 | | | | | | | | | | | | | | |
| MST_AGNT | | | | | | 2 | | | | | | | | | | | | | |
| MST_ARDY | | | | | | 2 | | | | | | | | | | | | | |
| BUS_ARDY | | | | | | | 2 | | | | | | | | | | | | |
| SLV_ARDY | | | | | | | | 2 | | | | | | | | | | | |
| SLV_AACK | | | | | | | | 2 | | | | | | | | | | | |
| BUS_AACK | | | | | | | | | 2 | | | | | | | | | | |
| MST_AACK | | | | | | | | | | 2 | | | | | | | | | |
| Data Bus | | | | | | | | | | | | | | | | | | | |
| MST_DREQ | | | | | | | | 2S | 2S | 2 | 2 | | | | | | | | |
| BUS_DREQ | | | | | | | | | 2S | 2S | 2 | 2 | | | | | | | |
| ARB_DREQ | | | | | | | | | | 2S | 2S | 2 | 2 | | | | | | |
| ARB_DGNT | | | | | | | | | | 2 | 2 | 2 | 2 | | | | | | |
| BUS_DGNT | | | | | | | | | | | 2 | 2 | 2 | 2 | | | | | |
| MST+SLV_DGNT | | | | | | | | | | | | 2 | 2 | 2 | 2 | | | | |
| MST_DRDY | | | | | | | | | | | | 2 | 2 | 2 | 2 | | | | |

TABLE 5-continued

Write Cycle

| CYCLE | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|
| BUS_DRDY |  |  |  |  |  |  |  |  |  |  |  | 2 | 2 | 2 | 2 |  |  |  |  |
| SLV_DRDY |  |  |  |  |  |  |  |  |  |  |  |  | 2 | 2 | 2 | 2 |  |  |  |
| MST_DATA |  |  |  |  |  |  |  |  |  |  | 2 | 2 | 2 | 2 |  |  |  |  |  |
| BUS_DATA |  |  |  |  |  |  |  |  |  |  |  | 2 | 2 | 2 | 2 |  |  |  |  |
| SLV_DATA |  |  |  |  |  |  |  |  |  |  |  |  | 2 | 2 | 2 | 2 |  |  |  |
| SLV_DACK |  |  |  |  |  |  |  |  |  |  | 2 | 2 | 2 | 2 |  |  |  |  |  |
| BUS_DACK |  |  |  |  |  |  |  |  |  |  |  | 2 | 2 | 2 | 2 |  |  |  |  |
| MST_DACK |  |  |  |  |  |  |  |  |  |  |  |  | 2 | 2 | 2 | 2 |  |  |  |

5.5 Burst Read Cycle

This cycle, shown in Table 6, is similar to the write burst. The Basic Address Arbitration cycle is identical. The main difference is that in the Data Transfer the Slave is the Source Module and the Master is the Destination Module. The Slave detects that it has been addressed in cycle 7 when it sees ARDY and its address. If the Slave will be able to supply data by cycle 11, it can assert FB_DxDREQn (on the Master's request line) in cycle 7, at the same time it has asserted AACK. This allows the data transfer to start two cycles earlier than on a write. In general, the Slave will assert FB_DxDREQn four cycles before it will have data available for transfer.

5.6 Concurrent Transfers

The previous examples showed a single Connection transfer. Table 7 shows concurrent transfers between multiple Master/Slave pairs. The assumption is that all three Masters (2, 3 and 4) have equal priority, and thus the Bus Controller will interleave their FB_DxDGNTs. In this example, Masters 2 and 4 have initiated write transfers, but Master 3 has initiated a read transfer. Since its Slave can assert its FB_DxDREQn earlier, Connection 3 is able to perform its first data transfer before Connection 2.

TABLE 6

Burst Read Cycle

| CYCLE | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|
| Address Bus |  |  |  |  |  |  |  |  |  |  |  |  |  |  |  |  |  |  |  |
| MST_AREQ | 2 | 2 | 2 | 2 |  |  |  |  |  |  |  |  |  |  |  |  |  |  |  |
| BUS_AREQ |  | 2 | 2 | 2 | 2 |  |  |  |  |  |  |  |  |  |  |  |  |  |  |
| ARB_AREQ |  |  | 2 | 2 | 2 | 2 |  |  |  |  |  |  |  |  |  |  |  |  |  |
| ARB_AGNT |  |  |  | 2 |  |  |  |  |  |  |  |  |  |  |  |  |  |  |  |
| BUS_AGNT |  |  |  |  | 2 |  |  |  |  |  |  |  |  |  |  |  |  |  |  |
| MST_AGNT |  |  |  |  |  | 2 |  |  |  |  |  |  |  |  |  |  |  |  |  |
| MST_ARDY |  |  |  |  |  | 2 |  |  |  |  |  |  |  |  |  |  |  |  |  |
| BUS_ARDY |  |  |  |  |  |  | 2 |  |  |  |  |  |  |  |  |  |  |  |  |
| SLV_ARDY |  |  |  |  |  |  |  | 2 |  |  |  |  |  |  |  |  |  |  |  |
| SLV_AACK |  |  |  |  |  |  |  | 2 |  |  |  |  |  |  |  |  |  |  |  |
| BUS_AACK |  |  |  |  |  |  |  |  | 2 |  |  |  |  |  |  |  |  |  |  |
| MST_AACK |  |  |  |  |  |  |  |  |  | 2 |  |  |  |  |  |  |  |  |  |
| Data Bus |  |  |  |  |  |  |  |  |  |  |  |  |  |  |  |  |  |  |  |
| SLV_DREQ |  |  |  |  |  |  |  | 2 | 2 | 2 | 2 |  |  |  |  |  |  |  |  |
| BUS_DREQ |  |  |  |  |  |  |  |  | 2 | 2 | 2 | 2 |  |  |  |  |  |  |  |
| ARB_DREQ |  |  |  |  |  |  |  |  |  | 2 | 2 | 2 | 2 |  |  |  |  |  |  |
| ARB_DGNT |  |  |  |  |  |  |  |  |  | 2 | 2 | 2 | 2 |  |  |  |  |  |  |
| BUS_DGNT |  |  |  |  |  |  |  |  |  |  | 2 | 2 | 2 | 2 |  |  |  |  |
| MST+SLV_DGNT |  |  |  |  |  |  |  |  |  |  |  | 2 | 2 | 2 | 2 |  |  |  |  |
| SLV_DRDY |  |  |  |  |  |  |  |  |  |  |  | 2 | 2 | 2 | 2 |  |  |  |  |
| BUS_DRDY |  |  |  |  |  |  |  |  |  |  |  |  | 2 | 2 | 2 | 2 |  |  |  |
| MST_DRDY |  |  |  |  |  |  |  |  |  |  |  |  |  | 2 | 2 | 2 | 2 |  |  |
| SLV_DATA |  |  |  |  |  |  |  |  |  |  | 2 | 2 | 2 | 2 |  |  |  |  |  |
| BUS_DATA |  |  |  |  |  |  |  |  |  |  |  | 2 | 2 | 2 | 2 |  |  |  |  |
| MST_DATA |  |  |  |  |  |  |  |  |  |  |  |  | 2 | 2 | 2 | 2 |  |  |  |
| MST_DACK |  |  |  |  |  |  |  |  |  |  | 2 | 2 | 2 | 2 |  |  |  |  |  |
| BUS_DACK |  |  |  |  |  |  |  |  |  |  |  | 2 | 2 | 2 | 2 |  |  |  |  |
| SLV_DACK |  |  |  |  |  |  |  |  |  |  |  |  | 2 | 2 | 2 | 2 |  |  |  |

TABLE 7

Concurrent Cycles

| CYCLE | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|
| Address Bus | | | | | | | | | | | | | | | | | | | |
| MST_AREQ | 2 | 234 | 234 | 234 | 34 | 4 | | | | | | | | | | | | | |
| BUS_AREQ | | 2 | 234 | 234 | 234 | 34 | 4 | | | | | | | | | | | | |
| ARB_AREQ | | | 2 | 234 | 234 | 234 | 34 | 4 | | | | | | | | | | | |
| ARB_AGNT | | | | 2 | 3 | 4 | | | | | | | | | | | | | |
| BUS_AGNT | | | | | 2 | 3 | 4 | | | | | | | | | | | | |
| MST_AGNT | | | | | | 2 | 3 | 4 | | | | | | | | | | | |
| MST_ARDY | | | | | | 2 | 3 | 4 | | | | | | | | | | | |
| BUS_ARDY | | | | | | | 2 | 3 | 4 | | | | | | | | | | |
| SLV_ARDY | | | | | | | | 2 | 3 | 4 | | | | | | | | | |
| SLV_AACK | | | | | | | | 2 | 3 | 4 | | | | | | | | | |
| BUS_AACK | | | | | | | | | 2 | 3 | 4 | | | | | | | | |
| MST_AACK | | | | | | | | | | 2 | 3 | 4 | | | | | | | |
| Data Bus | | | | | | | | | | | | | | | | | | | |
| SRC_DREQ | | | | | | | | | 3 | 23 | 23 | 234 | 234 | 234 | 234 | 234 | 234 | 234 | 234 |
| BUS_DREQ | | | | | | | | | | 3 | 23 | 23 | 234 | 234 | 234 | 234 | 234 | 234 | 234 |
| ARB_DREQ | | | | | | | | | | | 3 | 23 | 23 | 234 | 234 | 234 | 234 | 234 | 234 |
| ARB_DGNT | | | | | | | | | | | 3 | 2 | 3 | 4 | 2 | 3 | 4 | 2 | 3 | 4 |
| BUS_DGNT | | | | | | | | | | | | 3 | 2 | 3 | 4 | 2 | 3 | 4 | 2 | 3 |
| SRC+DST_DGNT | | | | | | | | | | | | 3 | 2 | 3 | 4 | 2 | 3 | 4 | 2 | |
| SRC_DRDY | | | | | | | | | | | | 3 | 2 | 3 | 4 | 2 | 3 | 4 | 2 | |
| BUS_DRDY | | | | | | | | | | | | | 3 | 2 | 3 | 4 | 2 | 3 | 4 | |
| DST_DRDY | | | | | | | | | | | | | 3 | 2 | 3 | 4 | 2 | 3 | | |
| SRC_DATA | | | | | | | | | | | | 3 | 2 | 3 | 4 | 2 | 3 | 4 | 2 | |
| BUS_DATA | | | | | | | | | | | | | 3 | 2 | 3 | 4 | 2 | 3 | 4 | |
| DST_DATA | | | | | | | | | | | | | 3 | 2 | 3 | 4 | 2 | 3 | | |
| DST_DACK | | | | | | | | | | | | 3 | 2 | 3 | 4 | 2 | 3 | 4 | 2 | |
| BUS_DACK | | | | | | | | | | | | | 3 | 2 | 3 | 4 | 2 | 3 | 4 | |
| SRC_DACK | | | | | | | | | | | | | 3 | 2 | 3 | 4 | 2 | 3 | | |

5.7 Address Retry

In each of the previous cases, the addressed Slave was always ready to respond with FB_AACK when it detected its address on the Address Bus. Table 8 shows an example of address retry, since the addressed Slave responds with a Retry on the first address arbitration. "R" indicates a cycle with FB_AACK and FB_ARETRY, thus causing a Retry.

The Master reasserts its FB_AREQ signal in cycle 9 to start another request cycle. The second address arbitration attempt is successful, with FB_DxDRDY asserted by the Master in cycle 21 instead of 13, A read cycle proceeds similarly. Note that the Slave can supply a retry suggestion on the FB_AWAIT Bus along with FB_ARETRY, which could delay the Master's reassertion of FB_AREQ.

TABLE 8

Burst Write Cycle with Address Retry

| CYCLE | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|
| Address Bus | | | | | | | | | | | | | | | | | | | | | | | |
| MST_AREQ | 2 | 2 | 2 | 2 | | | | | | 2 | 2 | 2 | 2 | | | | | | | | | | |
| BUS_AREQ | | 2 | 2 | 2 | 2 | | | | | | 2 | 2 | 2 | 2 | | | | | | | | | |
| ARB_AREQ | | | 2 | 2 | 2 | 2 | | | | | | 2 | 2 | 2 | 2 | | | | | | | | |
| ARB_AGNT | | | | 2 | | | | | | | | | 2 | | | | | | | | | | |
| BUS_AGNT | | | | | 2 | | | | | | | | | 2 | | | | | | | | | |
| MST_AGNT | | | | | | 2 | | | | | | | | | 2 | | | | | | | | |
| MST_ARDY | | | | | | 2 | | | | | | | | | 2 | | | | | | | | |
| BUS_ARDY | | | | | | | 2 | | | | | | | | | 2 | | | | | | | |
| SLV_ARDY | | | | | | | | 2 | | | | | | | | | 2 | | | | | | |
| SLV_AACK | | | | | | | | R | | | | | | | | | 2 | | | | | | |
| BUS_AACK | | | | | | | | | R | | | | | | | | | 2 | | | | | |
| MST_AACK | | | | | | | | | | R | | | | | | | | | 2 | | | | |
| Data Bus | | | | | | | | | | | | | | | | | | | | | | | |
| MST_DREQ | | | | | | | | | | | | | | | | | | | | 2 | 2 | 2 | 2 |
| BUS_DREQ | | | | | | | | | | | | | | | | | | | | | 2 | 2 | 2 |
| ARB_DREQ | | | | | | | | | | | | | | | | | | | | | | 2 | 2 |
| ARB_DGNT | | | | | | | | | | | | | | | | | | | | | | | 2 |
| BUS_DGNT | | | | | | | | | | | | | | | | | | | | | | | |

TABLE 8-continued

Burst Write Cycle with Address Retry

| CYCLE | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|
| MST+SLV_DGNT | | | | | | | | | | | | | | | | | | | | | 2 | 2 | 2 |
| MST_DRDY | | | | | | | | | | | | | | | | | | | | | 2 | 2 | 2 |
| BUS_DRDY | | | | | | | | | | | | | | | | | | | | | | 2 | 2 |
| SLV_DRDY | | | | | | | | | | | | | | | | | | | | | | | 2 |

5.8 Data Retry

A Destination Module may not be able to respond to the data cycle. Table 9 shows such a case on a write, where the Slave is not ready to accept write data. It signals this by not asserting FB_DxDACK (indicated by "X") on the first Data Grant cycle, in cycle 13. The Source sees the lack of FB_DxDACK in cycle 15, and retransmits the first data item "2A". The Destination, if it fails to signal FB_DxDACK, must also not send FB_DxDACK in the subsequent cycle (cycle 14 in the example) even if it can accept data.

transferred, but additional FB_DxDGNT cycles occur because the Source was not able to remove its FB_DxDREQn signal quickly enough.

Since the Source cannot predict when it will receive FB_DxDGNT, it must hold FB_DxDREQn until the last data has been transferred. At this point unused Data Grant cycles may occur, particularly if the Data Transfer has been configured at speed zero (no delay between FB_DxDGNT cycles) and the Master Module is the highest priority requester. The worst case of this would be a transfer with a COUNT of one transfer and a speed of zero, potentially

TABLE 9

Burst Write Cycle with Data Retry

| CYCLE | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|
| Address Bus | | | | | | | | | | | | | | | | | | | |
| MST_AREQ | 2 | 2 | 2 | 2 | | | | | | | | | | | | | | | |
| BUS_AREQ | | 2 | 2 | 2 | 2 | | | | | | | | | | | | | | |
| ARB_AREQ | | | 2 | 2 | 2 | 2 | | | | | | | | | | | | | |
| ARB_AGNT | | | | 2 | | | | | | | | | | | | | | | |
| BUS_AGNT | | | | | 2 | | | | | | | | | | | | | | |
| MST_AGNT | | | | | | 2 | | | | | | | | | | | | | |
| MST_ARDY | | | | | | 2 | | | | | | | | | | | | | |
| BUS_ARDY | | | | | | | 2 | | | | | | | | | | | | |
| SLV_ARDY | | | | | | | | 2 | | | | | | | | | | | |
| SLV_AACK | | | | | | | | 2 | | | | | | | | | | | |
| BUS_AACK | | | | | | | | | 2 | | | | | | | | | | |
| MST_AACK | | | | | | | | | | 2 | | | | | | | | | |
| Data Bus | | | | | | | | | | | | | | | | | | | |
| MST_DREQ | | | | | | | | | 2 | 2 | 2 | 2 | 2 | 2 | 2 | | | | |
| BUS_DREQ | | | | | | | | | | 2 | 2 | 2 | 2 | 2 | 2 | 2 | | | |
| ARB_DREQ | | | | | | | | | | | 2 | 2 | 2 | 2 | 2 | 2 | 2 | | |
| ARB_DGNT | | | | | | | | | | | | 2 | 2 | 2 | 2 | 2 | 2 | | |
| BUS_DGNT | | | | | | | | | | | | 2 | 2 | 2 | 2 | 2 | 2 | 2 | |
| MST+SLV_DGNT | | | | | | | | | | | | | 2 | 2 | 2 | 2 | 2 | 2 | 2 |
| MST_DRDY | | | | | | | | | | | | | 2 | 2 | 2 | 2 | 2 | 2 | |
| BUS_DRDY | | | | | | | | | | | | | | 2 | 2 | 2 | 2 | 2 | 2 |
| SLV_DRDY | | | | | | | | | | | | | | | 2 | 2 | 2 | 2 | 2 |
| MST_DATA | | | | | | | | | | | | | 2A | 2B | 2A | 2B | 2C | 2D | |
| BUS_DATA | | | | | | | | | | | | | | 2A | 2B | 2A | 2B | 2C | 2D |
| SLV_DATA | | | | | | | | | | | | | | | 2A | 2B | 2A | 2B | 2C |
| SLV_DACK | | | | | | | | | | | | | X | X | 2 | 2 | 2 | 2 | |
| BUS_DACK | | | | | | | | | | | | | | X | X | 2 | 2 | 2 | 2 |
| MST_DACK | | | | | | | | | | | | | | | X | X | 2 | 2 | 2 |

Unused Data Grant Cycles

On any cycle, the Source of the Connection may detect its Master ID on the FB_DxDGNT Bus but be unable to transfer data. In this case, the Source simply fails to assert FB_DxDRDY during that cycle and no data transfer occurs, and a FusionBus cycle has been wasted. This condition will typically arise for one of two reasons. The first is that the Source Coprocessor has not supplied data to be transferred. This may occur because the Source speed value is too small, or simply because of unpredictable delays in the Coprocessor. The second reason is that the last data has been resulting in three wasted cycles for one data transfer. In this case, the Bus Controller detects the COUNT of one and forces the speed to be three, which will allow the Source to remove FB_DxDREQ before any unused cycles occur. For longer transfers, software can balance lost cycles with transfer rate using the speed controls for transfers. A speed of one or two ensures at most one lost cycle, while a speed greater than two guarantees no cycles will be lost for that transfer.

It is possible that a Source Module will remove FB_DxDREQn on the last data transfer, but that data transfer must be retried because the Destination failed to respond with FB_DxDACK. In this case the Source must reassert FB_DxDREQn and wait for another FB_DxDGNT cycle to complete the Data Transfer.

5.9 Processor Accesses

The FusionBus is specifically optimized for stream oriented functions, where bandwidth is the critical design parameter. However, systems will typically have at least one central processing unit interface, and the latency of access from the CPU is often of more importance than bandwidth. To handle this difference in performance characteristics, FusionBus defines a special processor request environment. In particular, the Address and Data Bus arbitrators in the Bus Controller will default to the processor owning the Address and Data Busses when there are no other requesters, and the CPU will typically be configured as the highest priority Address and Data Bus requester, although this is not required by the architecture. Table 10 shows an example of two processor single word write cycles.

FB_AACK is received (cycle 5), the processor can immediately assert FB_DxDRDY and send data since it already owns the Data Bus. Thus a processor can perform write operations with a very short latency. If the processor does not own the busses when it begins the operation, it will assert FB_AREQO or FB_DxDREQO so that the normal arbitration process occurs, but the CPU has highest priority. Note that the Slave begins asserting DxDACK in cycle 3, assuming it can receive data, and continues to assert FB_DxDACK until FB_DxDRDY is received.

Table 11 shows the processor read cycles. As with a write cycle, the Processor can immediately assert FB_ARDY if it owns the Address Bus. In this case the addressed Slave becomes the Source Module, and since it is looking for the Processor's ID on the FB_DxDGNT Bus, it can assert FB_DxDRDY in cycle 3 (assuming it has data immediately available). The processor can begin to assert FB_DxDACK in cycle 3, and continues to assert it as long as the FB_DxDGNT Bus contains the processor ID until it

TABLE 10

| | Processor Write Cycles | | | | | | | | | | | | | | | | | | |
|---|---|---|---|---|---|---|---|---|---|---|---|---|---|---|---|---|---|---|---|
| CYCLE | 1 | 2 | 3 | 4 | 5 | 6 | 7 | 8 | 9 | 10 | 11 | 12 | 13 | 14 | 15 | 16 | 17 | 18 | 19 |
| Address Bus | | | | | | | | | | | | | | | | | | | |
| MST_AREQ | | | | | | | | | | | | | | | | | | | |
| BUS_AREQ | | | | | | | | | | | | | | | | | | | |
| ARB_AREQ | | | | | | | | | | | | | | | | | | | |
| ARB_AGNT | P | P | P | P | P | P | P | P | P | P | P | P | P | P | P | P | P | P | P |
| BUS_AGNT | P | P | P | P | P | P | P | P | P | P | P | P | P | P | P | P | P | P | P |
| MST_AGNT | P | P | P | P | P | P | P | P | P | P | P | P | P | P | P | P | P | P | P |
| MST_ARDY | P1 | | | | P2 | | | | | | | | | | | | | | |
| BUS_ARDY | | P1 | | | | | P2 | | | | | | | | | | | | |
| SLV_ARDY | | | P1 | | | | | P2 | | | | | | | | | | | |
| SLV_AACK | | | P1 | | | | | P2 | | | | | | | | | | | |
| BUS_AACK | | | | P1 | | | | | P2 | | | | | | | | | | |
| MST_AACK | | | | | P1 | | | | | P2 | | | | | | | | | |
| Data Bus | | | | | | | | | | | | | | | | | | | |
| MST_DREQ | | | | | | | | | | | | | | | | | | | |
| BUS_DREQ | | | | | | | | | | | | | | | | | | | |
| ARB_DREQ | | | | | | | | | | | | | | | | | | | |
| ARB_DGNT | P | P | P | P | P | P | P | P | P | P | P | P | P | P | P | P | P | P | P |
| BUS_DGNT | P | P | P | P | P | P | P | P | P | P | P | P | P | P | P | P | P | P | P |
| MST+SLV_DGNT | P | P | P | P | P | P | P | P | P | P | P | P | P | P | P | P | P | P | P |
| MST_DRDY | | | | | P1 | | | | | | P2 | | | | | | | | |
| BUS_DRDY | | | | | | P1 | | | | | | P2 | | | | | | | |
| SLV_DRDY | | | | | | | P1 | | | | | | P2 | | | | | | |
| MST_DATA | | | | | P1 | | | | | | P2 | | | | | | | | |
| BUS_DATA | | | | | | P1 | | | | | | P2 | | | | | | | |
| SLV_DATA | | | | | | | P1 | | | | | | P2 | | | | | | |
| SLV_DACK | | | | P1 | P1 | P1 | P1 | | | | | P2 | | | | | | | |
| BUS_DACK | | | | | P1 | P1 | P1 | P1 | | | | | P2 | | | | | | |
| MST_DACK | | | | | | P1 | P1 | P1 | P1 | | | | P2 | | | | | | |

Since the processor in this example already owns the Address Bus, it can generate FB_ARDY immediately without going through an Address Bus arbitration. As soon as receives FB_DxDRDY. Thus it is possible on the FusionBus to supply new read data from different addresses to the processor every four cycles.

TABLE 11

| | Processor Read Cycles | | | | | | | | | | | | | | | | | | |
|---|---|---|---|---|---|---|---|---|---|---|---|---|---|---|---|---|---|---|---|
| Address Bus | | | | | | | | | | | | | | | | | | | |
| CYCLE | 1 | 2 | 3 | 4 | 5 | 6 | 7 | 8 | 9 | 10 | 11 | 12 | 13 | 14 | 15 | 16 | 17 | 18 | 19 |
| MST_AREQ | | | | | | | | | | | | | | | | | | | |
| BUS_AREQ | | | | | | | | | | | | | | | | | | | |
| ARB_AREQ | | | | | | | | | | | | | | | | | | | |

TABLE 11-continued

Processor Read Cycles

| Address Bus CYCLE | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|
| ARB_AGNT | P | P | P | P | P | P | P | P | P | P | P | P | P | P | P | P | P | P | P |
| BUS_AGNT | P | P | P | P | P | P | P | P | P | P | P | P | P | P | P | P | P | P | P |
| MST_AGNT | P | P | P | P | P | P | P | P | P | P | P | P | P | P | P | P | P | P | P |
| MST_ARDY | P1 | | | | P2 | | | | | | | | | | | | | | |
| BUS_ARDY | | P1 | | | | P2 | | | | | | | | | | | | | |
| SLV_ARDY | | | P1 | | | | P2 | | | | | | | | | | | | |
| SLV_AACK | | | P1 | | | | P2 | | | | | | | | | | | | |
| BUS_AACK | | | | P1 | | | | P2 | | | | | | | | | | | |
| MST_AACK | | | | | P1 | | | | P2 | | | | | | | | | | |
| Data Bus | | | | | | | | | | | | | | | | | | | |
| SLV_DREQ | | | | | | | | | | | | | | | | | | | |
| BUS_DREQ | | | | | | | | | | | | | | | | | | | |
| ARB_DREQ | | | | | | | | | | | | | | | | | | | |
| ARB_DGNT | P | P | P | P | P | P | P | P | P | P | P | P | P | P | P | P | P | P | P |
| BUS_DGNT | P | P | P | P | P | P | P | P | P | P | P | P | P | P | P | P | P | P | P |
| MST + SLV_DGNT | P | P | P | P | P | P | P | P | P | P | P | P | P | P | P | P | P | P | P |
| SLV_DRDY | | | P1 | | | | P2 | | | | | | | | | | | | |
| BUS_DRDY | | | | P1 | | | | P2 | | | | | | | | | | | |
| MST_DRDY | | | | | P1 | | | | P2 | | | | | | | | | | |
| SLV_DATA | | | P1 | | | P2 | | | | | | | | | | | | | |
| BUS_DATA | | | | P1 | | | P2 | | | | | | | | | | | | |
| MST_DATA | | | | | P1 | | | P2 | | | | | | | | | | | |
| MST_DACK | | | | P1 | P1 | | | P2 | | | | | | | | | | | |
| BUS_DACK | | | | | P1 | P1 | | | P2 | | | | | | | | | | |
| SLV_DACK | | | | | | P1 | P1 | | P2 | | | | | | | | | | |

5.10 Subtractive Decoding and Retrying

There are two different types of retry cycles which may occur on the FusionBus. An Explicit Retry occurs when a Slave recognizes its address but is unable to currently accept the address arbitration request, and it signaled by the assertion of both FB_AACK and FB_ARETRY. Slaves are required to implement Explicit Retry for their entire address spaces. It is possible that the Slave has become hung, so the Master will Retry 256 times and then signal an error. In this case software will attempt to determine the problem and clean up the Slave. It is also possible for the Master to simply never happen to provide an address to the Slave when it is not busy, and the error can be cleaned up merely by restarting the Master.

An Implicit Retry occurs when no Slave responds with FB_AACK. This means that the address of the request is not in any Slave's address space, and thus may be the result of a software error in setting up a request. In this case the Master will retry the erroneous address 256 times, and then signal an error. However, the Implicit Retry may be caused by an access to a Subtractive Decoding address space. Normally the FusionBus is positively decoded, in that every module decodes its address space directly. However, since a PCI/ISA combination will be a common peripheral connection in FusionBus based systems due to its popularity, subtractive decoding must be supported.

In this case, the PCI Host Interface will be constantly monitoring the FusionBus looking for Implicit Retry cycles. When one is detected, the PCI controller moves that address space temporarily into its own address space, and provides a Normal response to the next reference to that space. On that reference the PCI Host Interface then passes the reference to the PCI Bus, and waits for a response. If no device responds but there is an ISA Southbridge controller connected to PCI, it will respond and pass the reference to the ISA Bus. In the no response case, the PCI Host Interface will respond to Data Bus arbitration and provide random data.

If the ISA Southbridge responds, it will pass the data it gets to PCI. In the case where there is no ISA device at the selected address, random data will also be provided. Thus an address to a non-existent address will not cause an error, but simply erroneous data transfers as occurs in a standard PCI/ISA environment.

This structure allows the construction of PC compatible systems. In particular it allows the Memory Controllers to include logic which can map address spaces in and out of the memory space. A particular example is the shadow space for the BIOS PROM. Initially the Memory Controller does not respond to this address space, and thus references to it will be passed through the subtractive decoding structure to the ISA Bus where the physical ROM resides. The data from this ROM will be read out and written to a portion of the actual memory space of the Memory Controller. The ROM address space will then be mapped in the Memory Controller to physical RAM memory, and future references to the ROM space will cause the Memory Controller to respond with Normal or Explicit Retry cycles, thus inhibiting the subtractive decoding logic from passing these addresses to ISA.

5.11 Abort and Disconnect

The FusionBus(TM) concept includes two mechanisms for the early termination of a FusionBus transfer. These two mechanisms are Abort, which terminates a transfer unconditionally, and Disconnect, which terminates the current transfer but allows it to be restarted. These mechanisms may be used to terminate any FusionBus Data Transfer after the Connection between Master and Slave Modules has been established.

Abort is typically used when a Module cannot determine how long a transfer should be when it starts, or when an event occurs during a transfer which requires termination. A good example of the first case is the Host Interface, which may detect sequential CPU accesses and thus initiate a burst transfer with an indeterminate burst length. The Host Interface can only detect the end of the burst when the CPU addresses cease to be sequential, and thus at that point it would Abort the transfer. An example of the second case is the PCI Bridge's detection of a Master Abort on the PCI Bus, which would require the termination of the FusionBus transfer.

Disconnect is typically used when a module must terminate its involvement with a transaction without terminating the entire transaction. One example would be in the case where there are multiple Memory Controllers, and a burst transfer reaches the end of the address range of one Memory Controller. That Memory Slave would then Disconnect, and the Master would restart the transfer at a new address which would then be detected by the other Memory Controller and the transfer would continue to that memory range. Another example is when a PCI Bridge receives an reference, but must first flush its internal buffers. In that case the Bridge would Disconnect the original transfer (typically without having transferred any data), perform the Flush as a FusionBus Master, and then accept the original transfer when it was restarted by the original Master.

Either type of termination may be used by either the Source or Destination of a Connection, and for a Disconnection the results are also different depending on whether the terminating Module is the Master or Slave, so there are six distinct cases to be considered. Each case will be described from a functional standpoint, and then the physical implementation using FusionBus Physical Layer signals will be described in detail.

5.11.1 Source Abort

In this case, the Source Module determines that it can send no more data, stops sending data, and Aborts the transaction. The Destination Module stops accepting data as soon as it receives the Abort, and both Modules return to the Normal Idle states and wait for another Link Layer request or Address Access over the FusionBus. This termination is Precise, in that no data has been transmitted from the Source Link Layer which has not been accepted by the Destination Link Layer. This allows the transfer to be restarted at a later time.

5.11.2 Destination Abort

In this case, the Destination Module determines that it can receive no more data, and Aborts the transaction. The Source stops sending data as soon as it receives the Abort, but it may have transmitted additional data in the interim. This data is simply discarded by the Destination, and both Modules return to the Normal Idle states and wait for another Link Layer request or Address Access over the FusionBus.

5.11.3 Master Source Disconnect

In this case, the Source Module which was the Master of the original Address Transaction determines that it must stop sending data, but that it wants to restart this transaction at a later time. The Source stops sending data and Disconnects the transaction. The Slave returns to an Idle state where it can accept the next Address Transaction, and it must only acknowledge an Address Transaction with the same Module ID as the original transaction Master.

The Master will restart the transfer at the next address in the address range, supplying the next piece of data in sequence. Thus the transfer has been interrupted, allowing other transfers by the Master to occur, and then restarted.

5.11.4 Slave Source Disconnect

In this case, the Source Module which was the Slave of the original Address Transaction determines that it must stop sending data, but that the data transfer must be restarted at a later time. This may be because the Slave needs to perform another operation, or because the data is now out of the Slave's address range. In either case, the Slave stops sending data and Disconnects the transaction. The Master will detect the termination, and initiate a new Address Transaction with the address of the next word in the transfer. If the address range is now for a new Slave, that Slave will respond and a new Connection will be established. In this case the original Slave will have returned to the Idle state. Alternatively, the original Slave may accept the Address transaction at a later time and continue the original transfer. If the original Slave can accept the restarted transaction, it must not acknowledge any Address Transactions with a Module ID different from the original Master prior to receiving the restarted Address Transaction.

5.11.5 Master Destination Disconnect

In this case, the Destination Module which was the Master of the original Address Transaction determines that it can no longer accept data, but that the data transfer must be restarted at a later time. The Destination Module stops acknowledging data, and Disconnects the transfer. The Source Module goes into an Idle state waiting for an Address Transaction, but it can only acknowledge an Address Transaction with the same Module ID as the original transaction Master. The Slave must also maintain any data in the transfer pipeline and send that data when the transaction is restarted.

5.11.6 Slave Destination Disconnect

In this case, the Destination Module which was the Slave in the original Address Transaction determines that it can no longer accept data, but that the data transfer must be restarted at a later time. The Destination Module stops acknowledging data, and Disconnects the transfer. The Source Module initiates another Address Transaction with the next address of the transfer. If the address range is now for a new Slave, that Slave will respond and a new Connection will be established. In this case the original Slave will have returned to the Idle state. Alternatively, the original Slave may accept the Address transaction at a later time and continue the original transfer. If the original Slave can accept the restarted transaction, it must not acknowledge any Address Transactions with a Module ID different from the original Master prior to receiving the restarted Address Transaction.

5.12 Lower Speed Transfers

Some modules may not be able to transfer data at the nominal data rate of FusionBus (133 MHz). A particular example is the PCI Host Interface, which because of the nature of the PCI Bus itself is limited to 33 MHz. Another example would be a module whose core component was previously designed to run at a lower frequency. Finally, a module designer may choose to interface to the FusionBus at a lower speed to better match the module's requirements and reduce buffering.

To alleviate this problem, FusionBus includes the concept of speed select. The Master sends its speed value on the FB_MSPEED bus during the Address Phase, and the Slave sends its speed value on the FB_SSPEED Bus during the Address Acknowledge Phase. In each case the speed is a four bit value which defines the minimum number of cycles between allowable transfers. A value of zero is the fastest speed, meaning the Module is able to transfer data on every cycle. The Bus Controller captures these two speed values, and uses the slower of the two values to manage the Data Grant allocation. The Bus Controller will then ensure that this connection is granted cycles no more often than the speed value indicates.

Table 12 contains an example of a burst read transfer for which the slower speed value is 2. Note that no cycles are wasted in this case.

TABLE 12

Burst Read Cycle with Speed 2

| CYCLE | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|
| Address Bus | | | | | | | | | | | | | | | | | | | |
| MST_AREQ | 2 | 2 | 2 | 2 | | | | | | | | | | | | | | | |
| BUS_AREQ | | 2 | 2 | 2 | 2 | | | | | | | | | | | | | | |
| ARB_AREQ | | | 2 | 2 | 2 | 2 | | | | | | | | | | | | | |
| ARB_AGNT | | | 2 | | | | | | | | | | | | | | | | |
| BUS_AGNT | | | | | 2 | | | | | | | | | | | | | | |
| MST_AGNT | | | | | | | 2 | | | | | | | | | | | | |
| MST_ARDY | | | | | | | 2 | | | | | | | | | | | | |
| BUS_ARDY | | | | | | | | 2 | | | | | | | | | | | |
| SLV_ARDY | | | | | | | | | 2 | | | | | | | | | | |
| SLV_AACK | | | | | | | | | 2 | | | | | | | | | | |
| BUS_AACK | | | | | | | | | | 2 | | | | | | | | | |
| MST_AACK | | | | | | | | | | | 2 | | | | | | | | |
| Data Bus | | | | | | | | | | | | | | | | | | | |
| MST_DREQ | | | | | | | 2 | 2 | 2 | 2 | 2 | 2 | 2 | 2 | 2 | 2 | 2 | 2 | 2 |
| BUS_DREQ | | | | | | | | 2 | 2 | 2 | 2 | 2 | 2 | 2 | 2 | 2 | 2 | 2 | 2 |
| ARB_DREQ | | | | | | | | | 2 | 2 | 2 | 2 | 2 | 2 | 2 | 2 | 2 | 2 | 2 |
| ARB_DGNT | | | | | | | | | | 2 | | 2 | | 2 | | | | | |
| BUS_DGNT | | | | | | | | | 2 | | 2 | | 2 | | | | | | |
| MST+SLV_DGNT | | | | | | | | | | 2 | | 2 | | 2 | | | | | |
| MST_DRDY | | | | | | | | | | 2 | | 2 | | 2 | | | | | |
| BUS_DRDY | | | | | | | | | | | 2 | | 2 | | 2 | | | | |
| SLV_DRDY | | | | | | | | | | | | 2 | | 2 | | 2 | | | |
| MST_DATA | | | | | | | | | | 2 | | 2 | | 2 | | | | | |
| BUS_DATA | | | | | | | | | | | 2 | | 2 | | 2 | | | | |
| SLV_DATA | | | | | | | | | | | | 2 | | 2 | | 2 | | | |
| SLV_DACK | | | | | | | | | 2 | | 2 | | 2 | | | | | | |
| BUS_DACK | | | | | | | | | | 2 | | 2 | | 2 | | | | | |
| MST_DACK | | | | | | | | | | | 2 | | 2 | | 2 | | | | |

5.13 Locking a Slave

Many CPUs include the function of locking the memory to allow atomic read-modify-write operations. FusionBus supports this feature through the bus signal FB_LOCK. The Host Interface (or any Master) will assert FB_LOCK along with its FB_ARDY signal, indicating a request for a locked Slave. If the Slave responds with FB_AACK and not FB_ARETRY, it is then locked and will transact data only with the locking Master, by accepting Address Transactions only if the FB_MSTRID field matches the locking Master's Module ID and the address is within the Slave's address range. The Master can perform any number of cycles with the Slave, and the Slave will remain locked as long as FB_LOCK is asserted. When the Locked transaction is complete, the Locking Master simply removes FB_LOCK. All addresses are then decoded normally.

In order to avoid deadlock conditions, only one Connection can be Locked at any one time. To accomplish this, all Masters will monitor the FB_LOCK signal, and a Master will not attempt a locked Address Transaction if FB_LOCK is asserted. Because of the FusionBus pipelining, however, it is possible for one Master to request a Locked transaction on one cycle and a second Master to request a Locked transaction on the next cycle, before it has seen FB_LOCK from the first Master. To prevent the second Connection from completing, thus creating two simultaneous Locked Connections, all Slaves will respond with FB_ARETRY if they detect their address range and FB_LOCK is asserted on the current cycle and the previous one, but not on the cycle before that.

Note that if a Save Module cannot be locked, it does not need to connect to FB_LOCK nor contain any of the checking logic described above. Similarly, a Master Module which cannot request Locked transactions need not connect to FB_LOCK, for contain any of the above logic.

5.14 Retry Wait Suggestion

In FusionBus systems performance can be negatively impacted by retry attempts which consume bus bandwidth. In order to improve this situation, FusionBus includes he concept of suggested retry wait. This facility provides a Slave which signals a retry on the Address with a mechanism to suggest how long the Master should wait before attempting to gain access to the Slave. The suggestion is made on the FB_AWAIT signals. The meaning of the suggestion is given in the following table.

| FB_AWAIT[2:0] | FCLK cycles to wait |
|---|---|
| 000 | 8 |
| 001 | 16 |
| 010 | 32 |
| 011 | 64 |
| 100 | 128 |
| 101 | 256 |
| 110 | 512 |
| 111 | No suggestion |

A Master is not required to use the suggestion, but Masters which take advantage of this function will typically introduce less system overhead, especially in cases where Slaves are often in the middle of long operations and this cause fairly long wait times.

5.15 Cache Snooping

In many FusionBus based systems there will be a Write Back Cache subsystem. In this case there may be a need for mechanism to allow the Cache Controller to snoop address operations on the FusionBus and to halt memory operations until a dirty cache line can be written to memory. The Cache Controller, which is typically part of the Host Interface, will monitor all Address Cycles, and if the address block of the transfer contains a cacheable memory address the Controller will assert the FB_ARETRY signal on the FusionBus and capture the address information. This signal will be driven on the bus in the cycle the Cache Controller sees FB_ARDY, and thus will be seen by the Master at the same time as FB_AACK from the Memory Controller, and thus will cause the Master to initiated an Address Retry.

Every Slave on the FusionBus which can include cacheable memory (such as the Memory Controller) must monitor the FB_ARETRY line. If such a Module detects the assertion of FB_ARETRY two cycles after it has driven FB_AACK without driving FB_ARETRY, it has accepted a connection which has been broken by the assertion of FB_ARETRY. Thus the Module must abort any operation which has been initiated by this connection. The Module does not need to remember anything about this operation since the Master will retry the connection later.

Once the Cache Controller has detected a cacheable address range to snoop, it then performs any operations required by the Processor or the Cache subsystem in order to determine if the addressed area is actually in the cache. If the addressed range includes clean lines in the cache, they are invalidated. If the range contains dirty lines, those lines must be written to physical memory before the Data operation can be allowed to proceed. The Cache Controller simply performs a normal FusionBus write operation to write these lines back. If none of the address range is currently in the cache, the Cache Controller terminates the snoop. During such a snooping operation, all cacheable references (including the address range being snooped) are retried with FB_ARETRY.

Once the snoop operation is complete, including any necessary writebacks, the Cache Controller then inhibits the assertion of FB_ARETRY for references to this address until it sees such an operation occur with FB_AACK asserted and FB_ARETRY not asserted two cycles later. At that point the Slave Module has accepted the connection, and that address is then reenabled for snooping again.

Note that the above method never inhibits references to non-cacheable memory, so there is no performance impact on operations such as Frame Buffer transfers to the Display Controller.

5.16 Byte Enable Indicator

In many cases it is advantageous for a snooping cache controller to be able to determine that a particular write operation consists of whole cache lines, so that it can be easily determined that any cache hits need only to be invalidated. The Address and Byte Count values can be used to determine that the transfer spans whole cache lines, but in order to be able to only invalidate lines the snooping controller must also be assured that no byte enables are deasserted during the transfer. The FusionBus signal FB_NOBE is asserted by the transferring Master if it cannot guarantee that all byte enables during the transfer will be asserted (other than those for partial words at the beginning or end of the transfer). Many Modules will not have any mechanism for creating missing byte enables, and thus do not need to connect to FB_NOBE at all, since this is a Wired-OR signal which will be deasserted by default if not driven.

A particular use of this function would be by the PCI Module, which buffers transfers and can thus inspect all byte enables of a transfer before the Address Transaction is initiated. The PCI Module could also use this function to pass a Write Invalidate command from the PCI to the FusionBus.

5.17 Test Mode

Many Modules connected to the FusionBus may contain special purpose components such as memory blocks or analog circuitry which are difficult to test with normal scan technology. In order to facilitate the testing of such components in a general purpose fashion, the FusionBus includes a special Test Mode function which provides direct access to such components.

Test Mode is enabled by the assertion of the FB_TESTMODE signal on the FusionBus. When this signal is asserted, each Module compares its Module ID to the upper 5 bits of the FB_ADDR Bus. If the bits match, the Module is then directly controlled by the FusionBus, and indicates this by asserting the FB_DxDACK signal on one of the Data Busses to which it is connected. The lower 27 bits of the FB_ADDR Bus may he used to address any special components in the Module, and the FB_READ signal is used to control the direction of data flow. If FB_READ is asserted, the FB_DxDATA Bus drivers from the Module are enabled, otherwise data flows into the Module from the FusionBus. The signal FB_ARDY may be used as a strobe if data is to be written into registers inside the Module. This allows significant flexibility in testing a wide variety of components.

The Host Interface will typically have a special Test Mode which causes it to use the FusionBus Test Mode. It enters this mode by asserting FB_TESTMODE, and also asserts FB_CFGREQ, which causes the Bus Controller grant all busses to the Host Interface. The Host Interface will then drive an address onto the FB_ADDR Bus, and if there are multiple Data Busses the Host Interface checks for the proper FB_DxDACK assertion and connects to the selected Data Bus. At that point reads occur when FB_READ is asserted, and writes occur when FB_READ is not asserted and FB_ARDY is pulsed as a write pulse. The timing of data and the control signals for each Module will be defined by the individual Module designer.

5.18 Signals by Phase

TABLE 13 describes the signals which are sent in each phase of each transaction:

| Phase | Driver | Receiver | Signals |
|---|---|---|---|
| ADDRESS CYCLE | | | |
| Address Request | Master | Bus Controller | FB_AREQ, FB_CFGREQ |
| Address Grant | Bus Controller | Master | FB_AGNT |
| Address | Master | All Slaves | FB_ARDY, FB_ADDR, FB_MSPEED, FB_READ, FB_MEMIO, FB_COUNT, FB_MSTRID, FB_LOCK, FB_CONFIG, FB_INTACK, FB_NOBE |
| Address Acknowledge | Slave | Master | FB_AACK, FB_ARETRY, FB_SSPEED, FB_AWAIT, FB_ADATA, FB_SRETRY |
| DATA CYCLE | | | |
| Data Request | Source | Bus Controller | FB_DxDREQ |
| Data Grant | Bus Controller | Source | FB_DxDGNT |

TABLE 13-continued describes the signals which are sent in each phase of each transaction:

| Phase | Driver | Receiver | Signals |
|---|---|---|---|
| Data | Source | Destination | FB_DxDRDY, FB_DxDATA, FB_DxBE, |
| Data Acknowledge | Destination | Source | FB_DxDACK, FB_DxDISC, FB_DxABORT |

6. Configuration Mode Operations

One of the key functions required in the FusionBus™ environment is configuration of the system. This includes identifying Modules in the system and assigning address spaces and other parameters to the module. The identical function is required on a PCI Bus, and since in many cases a chip designed around the FusionBus platform will include connections to PCI Busses, the configuration function of FusionBus is designed to be compatible with the PCI mechanism. There are several reasons why this is desirable.

Figure 11:
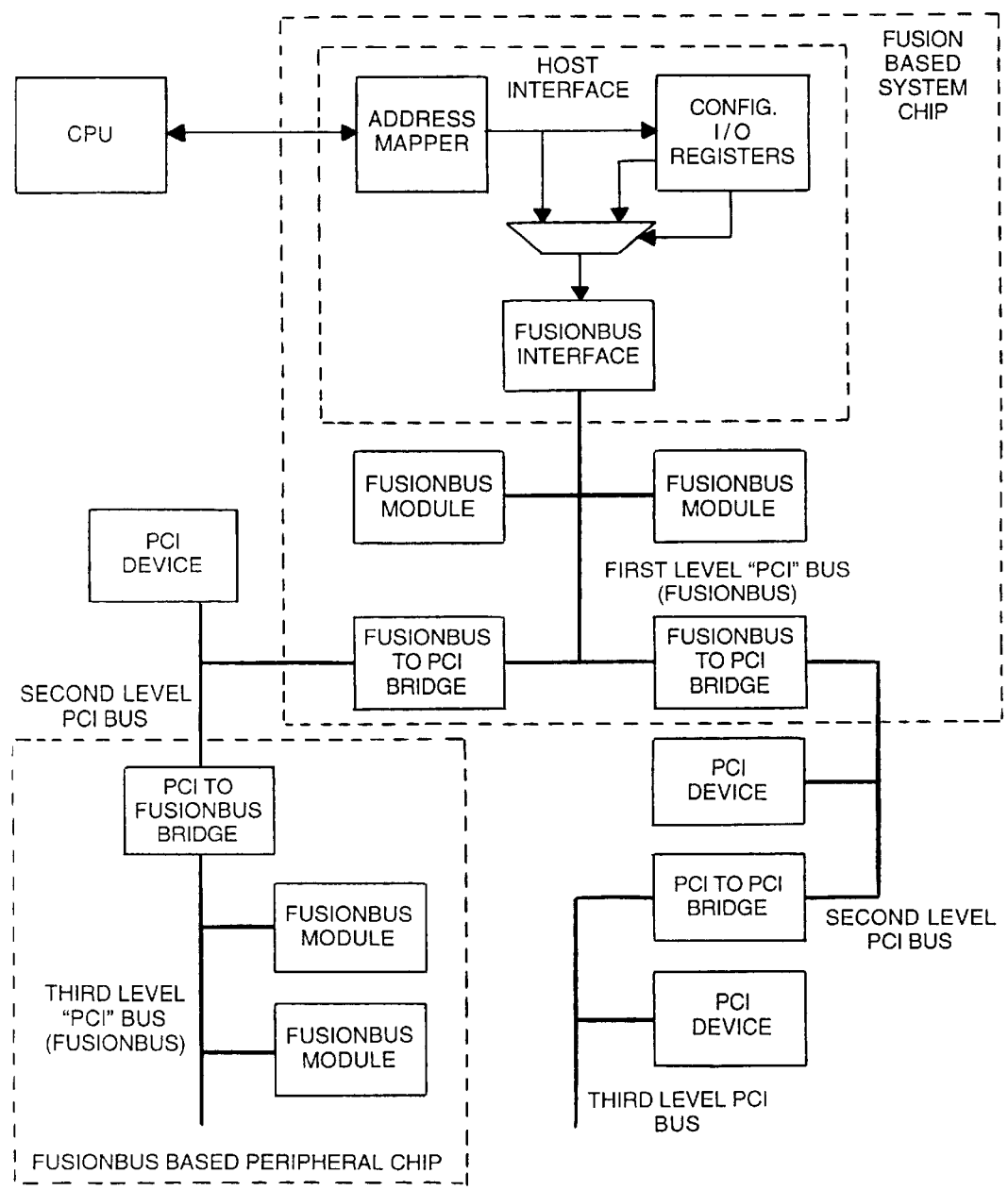
FIG. 11 is a block diagram illustrating a complex system configuration which is manufactured in accordance with the present invention and is shown here to illustrate certain configuration and bussing issues.

First, the FusionBus system is intended to be plug-and-play which means that it needs to be able to auto-configure FusionBus Modules on-chip as well as off-chip devices (on the PCI bus), Second, it will be common for existing PCI functions to be integrated into FusionBus based systems, and it is desirable to maintain software compatibility in their configuration. Finally, since the PCI Bus is expected to be the dominant method for connecting peripherals to a Fusion-Bus based system chip, the FusionBus mechanism must allow devices on such an external PCI Bus to be configured exactly as they are in systems without a FusionBus chip. FIG. 11 shows a complex system configuration which demonstrates many of the configuration and bussing issues.

The FusionBus Based System Chip (such as Chip 1R or Chip 1X) connects to the main host CPU. In the Host Interface Module of this chip, there is typically an Address Mapper which translates the address space of the CPU into the FusionBus/PCI Address Space (note that the Mapper is not required in the X86 CPU case since in that case the CPU address space is equivalent to the PCI address space). The Host Interface Module detects the standard PCI Configuration addresses, modifies the FusionBus address appropriately, and executes Configuration References. The format of Configuration References on the FusionBus is identical to those on PCI, which will be described in more detail in the following sections. The Configuration mechanism on the FusionBus is a normal access with the special signal CONFIG asserted. The operation works very much like a PCI configuration.

The FusionBus within the chip connected to the CPU appears logically like the main First Level PCI Bus in a typical system, and devices connected to the internal Fusion-Bus are configured and addressed as if they were connected to a PCI Bus. The PCI Interface within this FusionBus chip is actually a FusionBus to PCI Bridge, which operates like a PCI to PCI Bridge. Thus a PCI Bus driven by the FusionBus chip is a Second Level PCI Bus, and there can be multiple PCI Bridges within a chip as shown.

The Second Level PCI Bus on the right side of FIG. 1 is shown connected to a normal PCI Device, and also to a PCI to PCI Bridge component which produces a Third Level PCI Bus. The other Second Level PCI Bus is connected to a normal PCI Device, and is also connected to a FusionBus Based Peripheral Chip such as the Conmmunications I/O Chip. This chip contains a PCI to FusionBus Bridge, which is very similar to the FusionBus to PCI Bridge. The Fusion-Bus inside this chip appears as a Third Level Bus, and modules connected to it are configured exactly like the devices on the Third Level PCI Bus.

The result of this architecture is that devices are configured identically independently of their location in the hierarchy. Thus a device which currently exists as a PCI Device, such as a 1394 Interface, can be connected to the FusionBus and moved inside a FusionBus based chip without modification of the configuration software. The inherent hierarchical architecture of PCI makes this straightforward.

1.1 PCI Configuration Mechanism 1

The FusionBus configuration implements PCI configuration mechanism #1. In this mechanism, there are two 32-bit I/O mapped registers located at 0CF8h and 0CFCh. These I/O registers are called Configuration Address Port and Configuration Data Port respectively. Only 32-bit accesses to these I/O address locations will activate their corresponding registers. 16-bit or 8-bit accesses will behave like regular I/O accesses. The FusionBus Host Interface will contain these registers, and will convert accesses to them into FusionBus configuration cycles.

1.1.1 Configuration Address Register

I/O Address: 0CF8h (32-bit access only)

Default Value: 00000000h

Access: R/W

This register responds only when accessed as a 32-bit word register. It contains the configuration information: bus number, device number, function number, and register number.

| Bit | Descriptions |
|---|---|
| 31 | Configuration Enable - 1=Enable, 0=Disable |
| 30:24 | Reserved |
| 23:16 | Bus Number - This field determines the level of the bus for configuration. In a FusionBus design, Bus Number 00h indicates the FusionBus. |
| 15:11 | Device Number - This field identifies the device targeted for configuration |
| 10:8 | Function Number - This field identifies the function within the device which is being configured. |
| 7:2 | Register Number - This field identifies the register within the specified bus, device and function selected by the other fields. |
| 1:0 | Reserved |

1.1.2 Configuration Data Register

I/O Address: 0CFCh

Default Value: 00000000h

Access: R/W

This register is a 32-bit window into the configuration space selected by the Configuration Address Reg.

| Bit | Descriptions |
|---|---|
| 31:0 | Configuration Data Window; If bit 31 of CONFADD is 1, any I/O reference to the CONFDATA I/O address will read or write to the configuration register selected by the Configuration Address Register. |

To access any configuration register in the entire system, the configuration address is first written into the Configuration Address Register as a 32-bit word. Bit 31 of the Configuration Address Register determines whether or not configuration access is enabled (1=enabled). Once enabled, the Configuration Data Register is activated, and any reads or writes to this register will be read from or written to the configuration register indicated by the Configuration Address Register.

1.1.3 Configuration Address

To uniquely identify any configuration register in the entire system, it is necessary to provide it's configuration address. This address contains the following information: Bus Number, Device Number, Function Number, and Register Number. The bus number identifies on which bus in the multiplicity of buses in the system that the device being configured resides. In a FusionBus Based System Chip, which is connected to the main CPU, the FusionBus is accessed as Bus 00h. The device number identifies which device on the given bus is to be configured. The function number indicates which function of the device, and the register number selects the actual register to be configured. In this way, every configuration register in the system can be located.

1.1.4 Configuration Address Assignment

Any PCI device can only specify the function number and register numbers for its configuration registers' addresses. The device and bus numbers cannot be known because no PCI device knows on which bus it will reside in the system and in which slot it will be inserted on the bus. The device and bus number parts of the configuration addresses are determined by the plug-and-play automatic device detection process at the time the system is configured. Because PCI devices do not have any prior knowledge or uniqueness built into their decoders for bus number or device number, these parts of the configuration address must be transparent to any PCI device. In fact, it is only known to the auto-detection plug-and-play software and device drivers which simply find the device and remember how to get to it. So if during the plug-and-play process, a device was physically located somewhere else in the system, the auto-detect program re-finds the device in its new location and records this information so that it can address the device when it is ready to configure it.

1.2 Fusion Configuration

The Configuration Address and Configuration Data Registers are located in the Host Interface Unit. The Address Mapper maps certain CPU addresses to the two registers. In an X86 Host Interface, the registers exist at their normal addresses and no mapping is required. In a StrongARM or other system without I/O capability, the registers will be mapped in the memory space. For StrongARM, the Configuration Address Register is located at memory address FFFF0CF8h while the Configuration Data Register is located at memory address FFFF0CFCh. When configuration mode is activated, the Host Interface Configuration Logic generates configuration transactions on the FusionBus whenever the Configuration Data Register at FFFF0CFCh is accessed while configuration is enabled (read or write).

The Fusion configuration transaction is identical to standard Fusion I/O or memory transactions except that the CONFIG signal is asserted during the address transaction and the address is derived from the contents of the Configuration Address Register as follows. Note that the Fusion Type 0 Configuration Address is different from a normal PCI Type 0 Configuration Address in that the Device Number is provided instead of a decoded field of individual selects, and the devices must compare this field to their Module IDs. Since the IDs are fixed at design time, this works well and allows up to 32 devices instead of the 21 allowed in PCI due to physical limitations.

| 1.2.1 Fusion Type 0 Configuration Address | | | | | |
|---|---|---|---|---|---|
| A[31:24] | A[23:16] | A[15:11] | A[10:8] | A[7:2] | A[1:0] |
| 0's | 0's | Device Number | Function Number | Register | 00b (type 0) |

| 1.2.2 Fusion Type 1 Configuration Address | | | | | |
|---|---|---|---|---|---|
| A[31:24] | A[23:16] | A[15:11] | A[10:8] | A[7:2] | A[1:0] |
| 0's | Bus Number | Device Number | Function Number | Register | 01b (type 1) |

1.2.3 Bus 00—FusionBus

In the configuration space, the FusionBus is designated PCI Compatible Bus #0. All Fusion modules by virtue of being attached to the FusionBus are by definition Bus #0 PCI devices (for configuration purposes only). All these modules must compare their Module IDs to the Device Number field whenever A[1:0] are 00 and the CONFIG signal is asserted for configuration decoding purposes, and if selected will then load the appropriate internal configuration register selected by the Function Number and Register fields.

1.2.4 Bus 01—Primary PCI Bus

Figure 12:
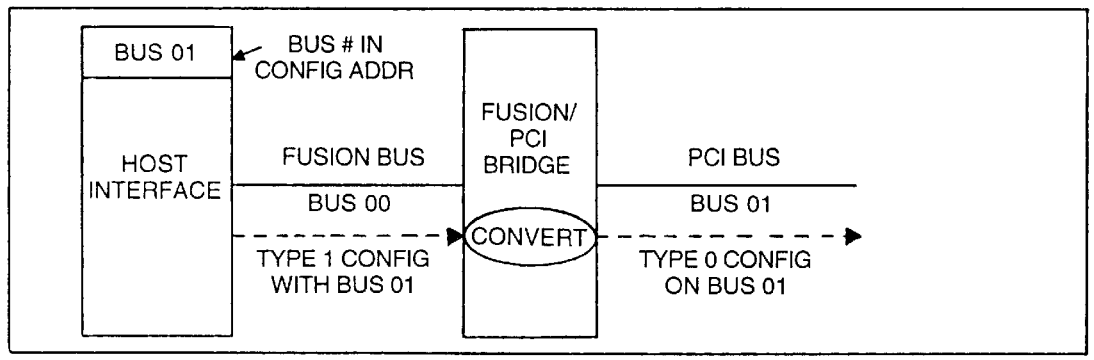
FIG. 12 is a block diagram illustrating the way in which a FusionBus to PCI Bus Bridge bridges the FusionBus to an external PCI bus.

The FusionBus to PCI Bridge bridges the FusionBus to an external PCI bus as shown in FIG. 12. The Bridge has a Module ID which it uses to detect configuration cycles for it on the FusionBus. The Plug and Play software will configure the outboard PCI Bus with a bus number, which will be Bus 01h for the PCI Bus connected to the first Bridge (the one with the lowest Module ID if there are multiple FusionBus to PCI Bridge Modules on a single FusionBus chip.) All devices located on this bus are addressed using a bus number =01. Whenever the bus number is non-zero, a Fusion type 1 configuration transaction is conducted on the FusionBus which results in the Fusion configuration transaction being forwarded across the FusionBus to PCI Bridge (the one which identifies the bus number as falling between the values in it's secondary and subordinate bus registers inclusively) to the PCI bus on the other side as a PCI Type 0 Configuration Cycle. Note that this is not the same as the Fusion Type 0 Configuration Cycle described above, but has the following format of the address.

| 1.2.5 PCI Type 0 Configuration Address | | | |
|---|---|---|---|
| A[31:11] | A[10:8] | A[7:2] | A[1:0] |
| Decoded Device Number | Function Number | Register | 00b (type 0) |

The FusionBus to PCI Bridge acts exactly like a PCI/PCI bridge from the configuration point of view and includes the primary, secondary and subordinate bus registers needed for the auto-detect process to locate buses and devices on the buses. The primary bus is always bus 00h, but the subordinate bus can be any number depending on how many FusionBus to PCI Bridges there are on the chip.

1.2.6 Secondary and Subordinate Buses

Figure 13:
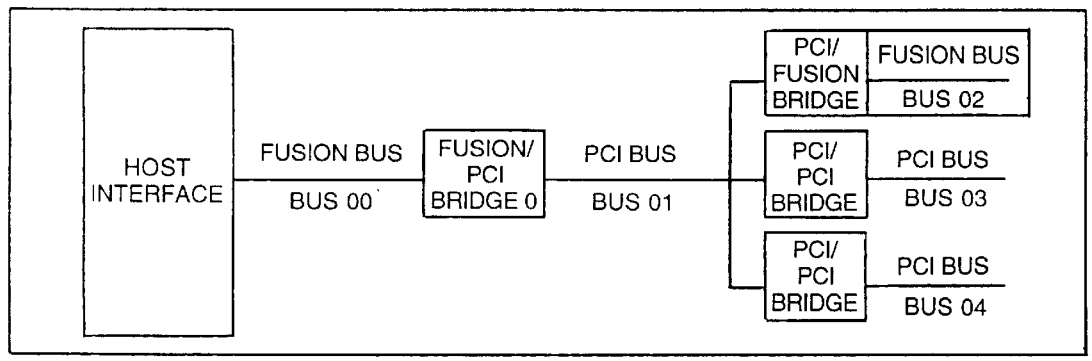
FIG. 13 is a block diagram illustrating the way in which multiple PCI/PCI bridges can be attached to the primary PCI bus to create secondary busses and subordinate buses.

Multiple PCI/PCI bridges can be attached to the primary PCI bus to create secondary busses and subordinate busess. In cases where peripheral chips built on FusionBus are attached to a PCI bus, the FusionBus inside the peripheral chip is also identified as a PCI configured bus through the PCI to FusionBus Bridge Module. From a configuration standpoint, FusionBusses look identical to PCI busses and are identified as part of the bus enumeration process and are allocated resources along with the rest of the system. This is illustrated in FIG. 13.

1.3 Multiple Fusion/PCI Bridges

Figure 14:
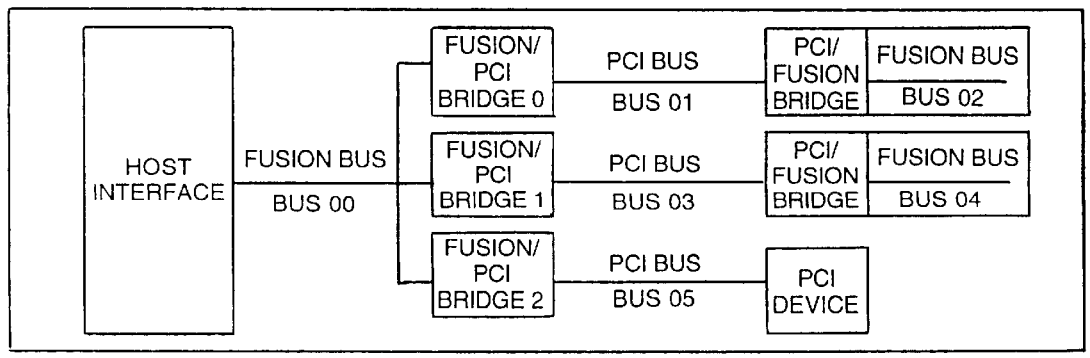
FIG. 14 is a block diagram illustrating further features of a multiple PCI Bridge to FusionBus topology.

The FusionBus to PCI Bridge is designed to co-exist with multiple other FusionBus to PCI Bridges. This is similar to PCI buses with multiple PCI/PCI bridges. For this reason, the FusionBus to PCI Bridge has the same configuration header type as a PCI/PCI Bridge; from a configuration point of view, the FusionBus to PCI Bridge is a PCI/PCI bridge. Such a multiple FusionBus to PCI Bridge topology is shown in FIG. 14.

The first FusionBus to PCI Bridge of the chip has a device number which is its Module ID. Additional FusionBus to PCI Bridges on the chip would each have different Module IDs corresponding to other Device Numbers.

1.4 Overall Summary

The primary advantage of the above approach is that devices connected to a FusionBus, whether in the main system chip connected to the CPU or in a peripheral chip, are configured identically. In addition, if a module exists as a PCI connected chip, it can be moved into a FusionBus chip with the same configuration structure. This is particularly important for "known" devices such as a 1394 interface, which have defined configuration setups which are known to the Operating System and cannot be easily modified.

Another significant advantage is that by copying the PCI structure as closely as possible, FusionBus can take advantage of all the research and analysis that went into the PCI Specification, and also avoid the many pitfalls which existed in early PCI versions. This allows FusionBus configuration mechanisms to be much more stable and functionally complete than a unique, untested approach would be.

1.5 Configuration Bus Cycles

Each FusionBus Module is configured using the mechanism described above. The Physical Layer is constantly monitoring the Address Bus for the following combination during an Address Cycle:

A. The FB_CONFIG signal is asserted

B. The Device Number on FB_ADDR[15:11] matches the Module ID

C. FB_ADDR[1:0]=00

When this combination occurs, a Configuration Cycle for this module is occurring. There are two types of Configuration cycle (Read and Write), and three possible responses from the FusionBus. Each case will be described below.

1.5.1 Write with Normal Acknowledge

A Configuration Write Cycle with Normal Acknowledge is shown in Table 14. The Host Interface initiates a Configuration Operation by asserting the FB_CFGREQ signal to the Bus Controller in cycle 1. The Bus Controller will respond to this signal by driving the Host Interface Module ID (00000) on both the FB_AGNT Bus and the FB_DGNT Bus in cycle 3, and will hold those values as long as FB_CFGREQ is asserted. The Host Interface must wait four cycles, at which point (cycle 5) the Bus Controller is guaranteed to have granted all busses to the Host Interface. The Host Interface can then begin executing Configuration Cycles.

The Host Interface initiates a Configuration Write Cycle in cycle 5 by driving the FB_ADDR Bus with the appropriate address, driving the FB_READ signal low, and driving the data to be written on bits [31:00] of all Data Busses. It must wait for two cycles until cycle 7, and then assert FB_CONFIG. It will hold FB_CONFIG for 6 cycles, allowing ample time for the addressed Module to latch the data, and then remove it. The Host Interface will hold the address and data for two more cycles, at which time it can begin a new Configuration Cycle.

When the Module detects its Configuration address with FB_CONFIG asserted, it will assert FB_DxDACK on the Data Bus to which it is connected (in cycle 9). This is the Normal Acknowledge case, and indicates that the Module was able to accept the write data.

TABLE 14

Configuration Write Cycle with Normal Acknowledge

| CYCLE | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|
| Address Bus | | | | | | | | | | | | | | | | | | | |
| HST_CFGREQ | H | H | H | H | H | H | H | H | H | H | H | H | H | H | H | H | H | H | H |
| BUS_CFGREQ | | H | H | H | H | H | H | H | H | H | H | H | H | H | H | H | H | H | H |
| ARB_CFGREQ | | | H | H | H | H | H | H | H | H | H | H | H | H | H | H | H | H | H |
| ARB_AGNT | | | H | H | H | H | H | H | H | H | H | H | H | H | H | H | H | H | H |
| BUS_AGNT | | | | H | H | H | H | H | H | H | H | H | H | H | H | H | H | H | H |
| HST_AGNT | | | | | H | H | H | H | H | H | H | H | H | H | H | H | H | H | H |
| MST_ADDR | | | | | A | A | A | A | A | A | A | A | A | | | | | | |
| BUS_ADDR | | | | | | A | A | A | A | A | A | A | A | A | | | | | |
| MOD_ADDR | | | | | | | A | A | A | A | A | A | A | A | A | | | | |
| HST_CONFIG | | | | | | | C | C | C | C | C | C | | | | | | | |

TABLE 14-continued

Configuration Write Cycle with Normal Acknowledge

| CYCLE | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|
| BUS_CONFIG |  |  |  |  |  |  |  | C | C | C | C | C | C |  |  |  |  |  |  |
| MOD_CONFIG |  |  |  |  |  |  |  |  | C | C | C | C | C | C |  |  |  |  |  |
| Data Bus |  |  |  |  |  |  |  |  |  |  |  |  |  |  |  |  |  |  |  |
| ARB_DGNT |  |  | H | H | H | H | H | H | H | H | H | H | H | H | H | H | H | H |  |
| BUS_DGNT |  |  |  | H | H | H | H | H | H | H | H | H | H | H | H | H | H | H | H |
| HST_DGNT |  |  |  |  | H | H | H | H | H | H | H | H | H | H | H | H | H | H | H |
| HST_DATA |  |  |  |  | D | D | D | D | D | D | D | D | D | D |  |  |  |  |  |
| BUS_DATA |  |  |  |  |  | D | D | D | D | D | D | D | D | D | D |  |  |  |  |
| MOD_DATA |  |  |  |  |  |  | D | D | D | D | D | D | D | D | D | D |  |  |  |

1.5.2 Write with No Acknowledge

If no Module detects its Configuration address, the FB_DxDACK signal will not be asserted. The Host Interface will determine which Data Bus contains data by the assertion of FB_DxDACK. The Module stops driving the Data Bus when FB_CONFIG goes away.

Host Interface may perform a special operation when this occurs, such as generating an interrupt or providing readable status that no response occurred, but typically it will simply continue in the same fashion whether FB_DxDACK was received or not.

1.5.3 Read with Normal Acknowledge

Table 15 shows a Configuration Read Cycle with a Normal Acknowledge. The Host Interface in this case drives FB_ADDR with the address, drives FB_READ high, and asserts FB_CONFIG from the beginning of the cycle (starting in cycle 5). The Module asserts FB_DxDACK when it sees FB_CONFIG (DA in cycle 7), and must drive its data onto FB_+DATA[31:00] within four cycles (D, valid in cycle 11 at the latest). The Host Interface holds FB_ADDR four a total of 10 cycles just as for a write, and holds FB_CONFIG throughout that time. The Host Interface latches the read data in cycle 14 when it removes FB_CONFIG. For systems with multiple Data Busses, the Host Interface will determine which Data Bus contains data by the assertion of FB_DxDACK.

TABLE 15

Configuration Read Cycle with Normal Acknowledge

| CYCLE | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|
| Address Bus |  |  |  |  |  |  |  |  |  |  |  |  |  |  |  |  |  |  |  |
| HST_CFGREQ | H | H | H | H | H | H | H | H | H | H | H | H | H | H | H | H | H | H | H |
| BUS_CFGREQ |  | H | H | H | H | H | H | H | H | H | H | H | H | H | H | H | H | H | H |
| ARB_CFGREQ |  |  | H | H | H | H | H | H | H | H | H | H | H | H | H | H | H | H | H |
| ARB_AGNT |  |  | H | H | H | H | H | H | H | H | H | H | H | H | H | H | H | H | H |
| BUS_AGNT |  |  |  | H | H | H | H | H | H | H | H | H | H | H | H | H | H | H | H |
| HST_AGNT |  |  |  |  | H | H | H | H | H | H | H | H | H | H | H | H | H | H | H |
| MST_ADDR |  |  |  |  | A | A | A | A | A | A | A | A | A | A |  |  |  |  |  |
| BUS_ADDR |  |  |  |  |  | A | A | A | A | A | A | A | A | A | A |  |  |  |  |
| MOD_ADDR |  |  |  |  |  |  | A | A | A | A | A | A | A | A | A | A |  |  |  |
| HST_CONFIG |  |  |  |  |  | C | C | C | C | C | C | C | C | C | C |  |  |  |  |
| BUS_CONFIG |  |  |  |  |  |  | C | C | C | C | C | C | C | C | C | C |  |  |  |
| MOD_CONFIG |  |  |  |  |  |  |  | C | C | C | C | C | C | C | C | C | C |  |  |
| Data Bus |  |  |  |  |  |  |  |  |  |  |  |  |  |  |  |  |  |  |  |
| ARB_DGNT |  |  | H | H | H | H | H | H | H | H | H | H | H | H | H | H | H | H |  |
| BUS_DGNT |  |  |  | H | H | H | H | H | H | H | H | H | H | H | H | H | H | H | H |
| HST_DGNT |  |  |  |  | H | H | H | H | H | H | H | H | H | H | H | H | H | H | H |
| MOD_DATA |  |  |  |  |  |  |  | D? | D? | D? | D? | D | D | D | D | D |  |  |  |
| BUS_DATA |  |  |  |  |  |  |  |  | D? | D? | D? | D? | D? | D | D | D | D | D |  |
| MOD_DATA |  |  |  |  |  |  |  |  |  | D? | D? | D? | D? | D | D | D | D | D | D |
| MOD_DACK |  |  |  |  |  |  | DA | DA | DA | DA | DA | DA | DA | DA | DA | DA |  |  |  |
| BUS_DACK |  |  |  |  |  |  |  | DA | DA | DA | DA | DA | DA | DA | DA | DA | DA |  |  |
| MOD_DACK |  |  |  |  |  |  |  |  | DA | DA | DA | DA | DA | DA | DA | DA | DA | DA |  |

1.5.4 Read with No Acknowledge

If no Module detects its Configuration address, the FB_DxDACK signal will not be asserted. The Host Interface must provide a value of all ones (0xFFFF) if no FB_DxDACK is received, and may also perform a special operation when this occurs, such as generating an interrupt or providing readable status that no response occurred.

1.5.5 Read or Write with Retry Acknowledge

In some cases a Module may be required to complete an operation in progress before it can accept the Configuration Operation. The FusionBus to PCI Bridge in particular must complete any pending operations before passing Configuration references to the PCI Bus. In this case the Module will respond to FB_CONFIG by asserting FB_ARETRY instead of FB_DxDACK. When the Host Interface sees FB_ARETRY, it must terminate the Configuration Cycle, remove FB_CFGREQ so that the Bus Controller can accept other requests, wait for some amount of time, and then initiate a new Configuration Operation to the same address.

This retry mechanism can also be used if the Configuration access is not guaranteed to complete within the time required by the above fixed length cycles. Configuration references to PCI Busses beyond the FusionBus to PCI Bridge will always fall into this category. In this case the Module will trap the read or write operation and begin the PCI Configuration Cycle, but will assert FB_ARETRY on the FusionBus so that the Host Interface will terminate the operation and come back at a later time. After some number of retries the PCI Operation will be complete and the Bridge will then allow the FusionBus Configuration Cycle to complete.

The Host Interface may implement a retry counter so that it can determine if a Module is locked up in configuration Retry operations, but this is not required.

6.6 Configuration Registers

The Configuration Registers are shown in Table 16 and described below. When the data cycle occurs, the Configuration Register selected by the Register Number in FB_ADDR[[7:2] will be accessed. It is possible for a FusionBus Module to contain multiple Functions, which are selected by the Function Number in FB_ADDR[10:8]. However, it is expected that most Modules will include only Function Number 000. The fields are identical to those in PCI Configuration Registers, although some fields will be defined to not exist in FusionBus Modules. Register Number from 10 to 3F may be used for additional Module specific configuration information.

Bits 2 (Master Enable), 3 (Special Cycle Recognition), 4 (Memory Write and Invalidate Enable), 6 (Parity Error Response), 7 (Wait Cycle Enable), and 8 (System Error Enable) must always return zero for FusionBus Modules. Other bits may be used if necessary.

Status Register (Read Only)—This register provides status from Modules, and is described in detail in the PCI Specification. Bits 4:0 (RESERVED), 5 (66 MHz Capable), 8 (Data Parity Reported), 10:9 (Device Select Timing), 11 (Signaled Target Abort), 14 (Signaled System Error) and 15 (Detected Parity Error) must always return zero. Other bits may be used if necessary.

Revision ID (Read Only)—This 8 bit value indicates the revision number of the Module.

Class Code Register (Read Only)—This 24 bit value identifies the basic function of the Module. Details of the various Class Code values are provided in the PCI Specification.

Cache Line Size—This register is defined in the PCI Specification. It may be used by Memory Controller Modules.

Latency Timer—This register is not used in FusionBus Modules and always reads back all zeroes.

Header Type (Read Only)—This 8 bit value is defined in the PCI Specification. Bits 6:0 must read as zero in FusionBus Modules, and bit 7 is set to one if the Module contains multiple functions.

BIST Register—This register is used to control Built In Self Test (BIST) if it is included in a Module. Otherwise all bits should always return zero.

TABLE 16

| Register Number | Byte 3 | Byte 2 | Byte 1 | Byte 0 |
|---|---|---|---|---|
| 00 | *Device ID* | | *Vendor ID* | |
| 01 | *Status Register* | | *Command Register* | |
| 02 | *Class Code* | | | *Revision ID* |
| 03 | BIST | Header Type | *Latency Timer* | Cache Line Size |
| 04 | Base Address 0 | | | |
| 05 | Base Address 1 | | | |
| 06 | Base Address 2 | | | |
| 07 | Base Address 3 | | | |
| 08 | Base Address 4 | | | |
| 09 | Base Address 5 | | | |
| 0A | *CardBus CIS Pointer* | | | |
| 0B | *Subsystem ID* | | *Subsystem Vendor ID* | |
| 0C | Expansion ROM Base Address | | | |
| 0D | *RESERVED* | | | |
| 0E | *RESERVED* | | | |
| 0F | *Maximum Lat* | *Minimum Grant* | Interrupt Pin | Interrupt Line |

 - Required Field
 - Not Used - Reads as zeroes

Vendor ID (Read Only)—This 16 bit value identifies the "Manufacturer" of the Module, and is obtained from the PCI Special Interest Group (SIG). Fusion will have our own unique Vendor ID. Customers who design their own Modules may use their Vendor ID if it exists, or may apply to use the Fusion ID.

Device ID (Read Only)—This 16 bit value uniquely identifies the type of Module. If a customer desires to use the Fusion Vendor ID, Fusion will assign a unique Device ID to each customer Module.

Command Register—This register provides control over devices, and is described in detail in the PCI Specification.

Base Address Registers 0–5—These register define up to six address spaces to which the Module will respond and are described in detail in the PCI Specification. Address Spaces are either in Memory Space (register bit 0=zero) or in I/O Space (register bit 0=one). The Module only contains as many Base Address Registers as it requires different Address Spaces, and all other registers read as all zeroes. Base Address Registers must be assigned from Register 0 up to Register 5, so if there are only two Address Spaces to be configured they must use Base Address Registers 0 and 1.

The Base Address Registers are defined to read back zeroes in bits which are not decoded in the particular address space. For example, if an Address Space is 4 KB in size, bits from 11 to 4 would read back zeroes. The Configuration software will write all ones to this register, and then read it back to determine the size. In almost every case, FusionBus Modules will implement only Memory Spaces which can be located anywhere in a 32 bit memory space, so bits 2:0 will read back as zeroes. Bit 3 will be a one if the Address Space is prefetchable and zero otherwise.

CardBus CIS Pointer—This register is not used by FusionBus Modules and always reads back all zeroes.

Subsystem Vendor ID—This register i s not used by FusionBus Module s and always reads back all zeroes.

Subsystem ID—This register is not used by FusionBus Modules and always reads back all zeroes.

Expansion ROM Base Address—This register is defined in the PCI Specification, and is used in the unlikely case that a FusionBus Module includes or accesses an Expansion ROM.

Interrupt Pin (Read Only)—This register indicates which interrupt pin the Module is connected to. This concept will probably not be implemented for FusionBus Modules, and thus this register will read back as all zeroes.

Interrupt Line Register—This register define s t he routing of an interrupt in a PC environment. It will typically read back as all ones.

Minimum Grant Register (Read Only)—This register is not used by FusionBus Modules and always reads back all zeroes.

Maximum Latency Register (Read Only)—This register is not used by FusionBus Modules and always reads back all zeroes.

7. Interrupts

Each FusionBus Module has the capability to generate an interrupt, which is asserted on the FB_IRQx signal of the FusionBus. The FB_IRQx signals from each Module are typically routed in two ways in the system. All of the IRQ lines may be connected to the Host Interface, which can include interrupt prioritization and masking logic as desired. In systems which contain a FusionBus to PCI Bridge, each interrupt may also be routed to one of the four INT lines on the PCI. In this way the internal interrupts can be merged with all other interrupts in the system through the Southbridge Interrupt Controller. See the FusionBus to PCI Bridge Specification for the details of this operation.

7.1 Interrupt Acknowledge Cycles

For compatibility with PCI systems, the FusionBus includes the concept of an Interrupt Acknowledge Cycle. The Host Interface Module creates an Interrupt Acknowledge Cycle by asserting the FB_INTACK signal during the Address Cycle of a transfer instead of FB_ARDY. The FusionBus to PCI Bridge which is configured to respond to FB_INTACK uses this signal to initiate a cycle on the PCI, and will respond with FB_AACK to the Host Interface. Since FB_ARDY is not asserted, other Modules do not need to connect to FB_INTACK.

8. Implementation

The critical implementation element of the FusionBus described above is the Physical Layer. The Link Layer, Coprocessor and Bus Controller will be specifically designed for a particular implementation, but the Physical Layer is the underlying hardware which creates the Bus defined above. This and the following section describe an implementation of the Physical Layer which accomplishes the objectives of the FusionBus.

8.1 Block Diagram

Figure 15:
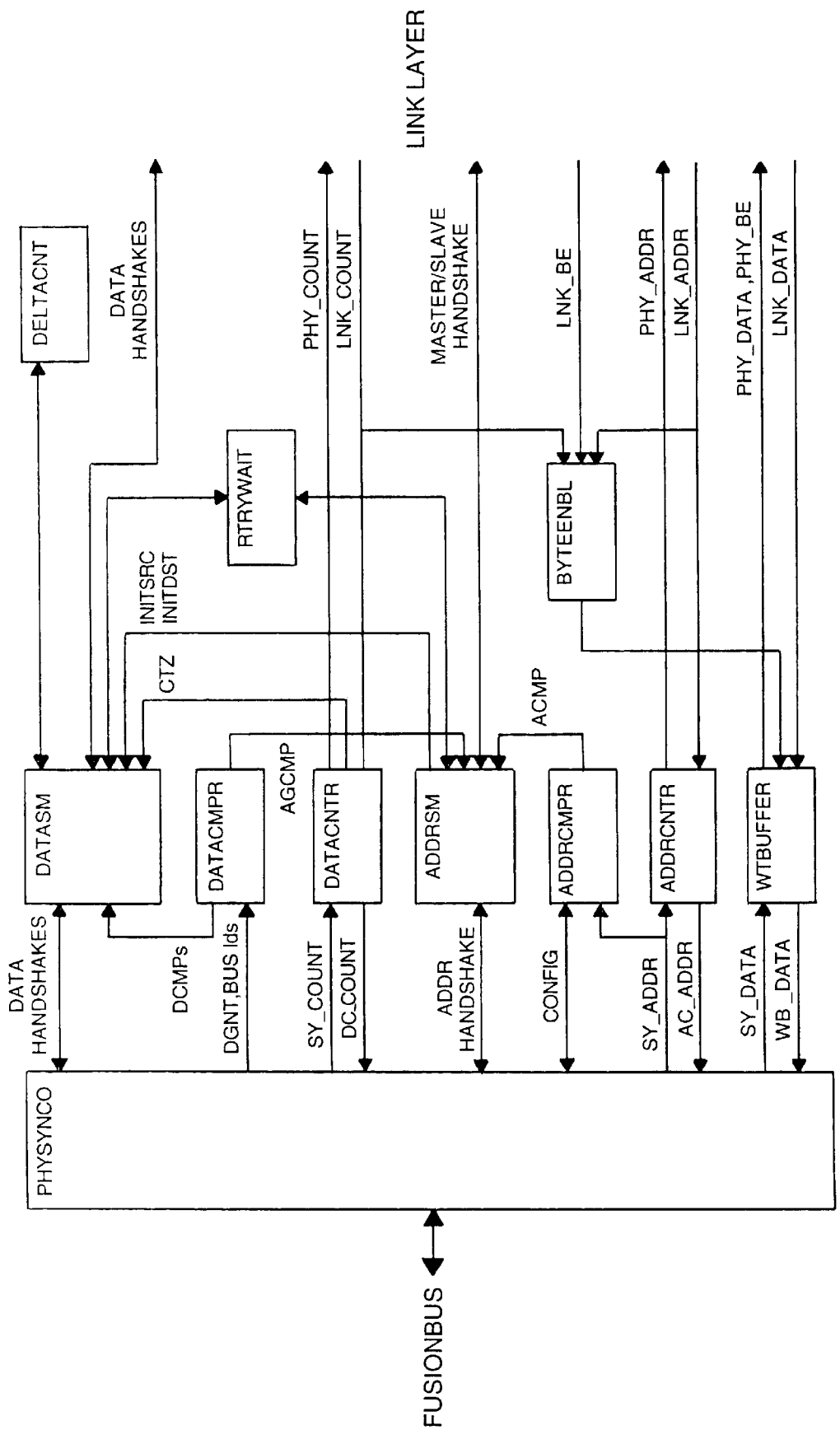
FIG. 15 is a block diagram illustrating a generalized physical layer for interconnecting the link layer of a module with the bus arrangement of the present invention.

FIG. 15 contains the Physical Layer Block Diagram. It is made up of the following blocks.

PHYSYNCO—This block contains all of the special hardware necessary to physically connect to the FusionBus. This is primarily the synchronizing flip flops and tri-state buffers for each signal. This block will also contain any special local timing circuitry necessary to ensure there is no bus fighting.

DATASM—This block contains the Data State Machine (DSM), which controls all of the Data Phase handshaking on the FusionBus.

DELTACNT—This module contains several small counters used by the DSM.

DATACMPR—This block contains the logic which determines when this Module owns the Address or Data Bus. It looks for the correct Module ID on the DGNT Bus or AGNT Bus.

DATACNTR—This module hold s the data transfer counter.

ADDRSM—This block contains the Address State Machine (ASM), which controls all Address Phase operations on the FusionBus a nd the Master Mode handshaking with the Link Layer.

RTRYWAIT—This block holds the Retry Counter and the Wait Counter, which are used by ASM and DSM.

ADDRCMPR—This block hold s all of the address comparison logic, including all of the Configuration Register logic. This block is typically outside the actual Physical Layer, since its configuration is typically different for different Modules.

ADDRCNTR—This block holds the address counter which counts transfer addresses.

WTBUFFER—This is a block of up to three 72 bit registers, which are used in both Source and Destination Modes to buffer data and byte enables for retries on the FusionBus. Three registers are required if the Module can utilize the FusionBus at full speed, otherwise fewer than three registers may be implemented.

BYTEENBL—This block determines the actual count of FusionBus Word64 transfers based on the starting address and byte count values, and also computes the proper byte enable values for the first and last Word64s of a transfer.

8.2 RTRYWAIT

This block contains two counters which are used by the state machines, the Retry Counter and the Wait Counter. The Address Machine uses both counters. The Retry Counter is initialized to 255 when the ASM is in its IDLE state, and is decremented whenever an Address Bus retry occurs. If the counter reaches zero, an Address Retry error is signaled to the Llink Layer and the address operation is aborted. The Wait Counter is used to count wait cycles after an Address retry before the next address operation is attempted. It is loaded with a value determined by the FB_AWAIT value received with the Address Retry, and counts FCLK cycles until it is zero, in which case the ASM then proceeds.

The Retry Counter is also used by the DSM, when the Module is the Source. The Retry Counter is initialized to 255 when the DSM is in its IDLE state, and is decremented whenever the Source attempts to send data on the FusionBus but FB_DACK is not received. If the counter reaches zero, a Data Retry error is signaled to the Link Layer and the data operation is aborted.

8.3 DELTACNT

This block contains two two bit counters, DELTA and TDLT. These counters are used by DSM to keep track of data words as they flow through the Physical Layer. These are used for both Source and Destination transfers, but are controlled somewhat differently in each case. In the Source case, the DELTA Counter is cleared to zero when DSM is in its idle state, is incremented whenever PHY_RDREQ and LNK_DRDY are both asserted (meaning a word has been transferred from the Link Layer to the Physical Layer), and is decremented whenever FB_DACK is received two cycles after this Module has asserted FB_DRDY (a word has been transferred from this Physical Layer to the connected Module across the FusionBus). As a result, the DELTA Counter contains the number of data words which have been received from the Link Layer but not yet accepted by the Destination. The TDLT Counter is loaded from the DELTA Counter when the signal LDTDLT is asserted, is incremented whenever PHY_RDREQ and LNK_DRDY are asserted, and is decremented whenever the Module asserts FB_DRDY (an attempt has been made to transfer a word across the FusionBus, although the Destination has not yet accepted it). Thus the TDLT Counter contains the number of words received from the Link Layer which have not yet been transmitted over the FusionBus.

In the Destination case, only the TDLT Counter is used. It is cleared to zero when DSM is in the IDLE state, is decremented whenever PHY_WTREQ and LNK_DRDY are both asserted (meaning a word has been transferred from the Physical Layer to the Link Layer), and is incremented when FB_DRDY is asseted and the Module generated FB_DACK two cycles earlier (meaning the Physical Layer has received a word from the Source across the FusionBus). Thus the TDLT Counter contains the number of words received over the FusionBus which have not yet been transmitted to the Link Layer.

In each case, the TDLT Counter is used as the index into the Transfer Buffer which selects which data to provide on output. If TDLT is zero, the direct data path is selected, i.e. in Source Mode the data from the Link Layer is driven directly onto the FusionBus, and in Destination Mode the reverse is true. If TDLT is greater than zero, the Transfer Buffer register selected by TDLT is used as the data in either direction.

8.4 WTBUFFER

This block contains the Transfer Buffer, a set of registers which hold data required within the Physical Layer. For example, if data is received from the Link Layer but has not been transferred over the FusionBus, it is held in the Transfer Buffer. This occurs due to the pipelined nature of the FusionBus, because the Source may transfer two data words onto the FusionBus in consecutive cycles, and then discover, through the lack of FB_DACK, that neither word was accepted Thus those two words must be held in the Transfer Buffer so they can be sent with a Data Retry.

The registers in the Transfer Buffer operate as a shift register, with input data coming either from the Link Layer (in the Source case) or the FusionBus (in the Destination case). Data is shifted in whenever TDLT is incremented, and the value of TDLT is used to select which register is selected for output. 64 bits of data plus the eight byte enable bits are held for each word.

8.5 DATACMPR

This block provides several comparison functions. It contains the MSTRID register, which captures the FB_MSTRID value during a Slave Address Transaction. In Slave Mode, MSTRID is compared to the FB_DGNT Bus to determine when this connection owns the Data Bus. In Master Mode, FB_DGNT is compared to the Module ID to determine this. The result is the signal DCMP used by DSM. The Connection Master value is also used to select which FB_DREQ line the Source. The FB_AGNT Bus is also compared to the Module ID to generate the AGCMP signal used by the ASM.

8.6 BYTEENBL

This block analyzes the lower three bits of the starting address and byte count of a transfer, and determines three values: the byte enable values for the first Word64 of the transfer, the byte enable values for the last Word64 of the transfer, and the amount by which bits 10:3 of the count need to be adjusted to produce the actual count of Word64 transfers. If the module is the Source, all of the above functions are used, with the calculated byte enable values ANDed with the byte enables supplied by the Link layer and sent to the FusionBus. In the Destination case the calculated byte enables are not used.

8.7 DATACNTR

This block contains the Data Counter which keeps track of words transferred between the Physical Layer and the Link Layer. This eight bit counter is loaded with the number of Word64s to be transferred minus one, using the byte count value which comes from the Link Layer on a Master operation and from the FusionBus on a Slave operation. The counter is decremented each time a Word64 is transferred to or from the Link Layer. This occurs when PHY_WTREQ and LNK_DRDY are both asserted during a Destination operation, or when PHY_RDREQ and LNK_DRDY are both asserted during a Source operation. When the counter reaches zero, the signal CTZ is asserted to DSM indicating that the next transfer with the Link Layer will be the last one.

The actual transfer count may not be equal to the upper eight bits of the input byte count due to address alignment, so DATACNTR includes a mechanism for adjusting the count. If the lower three bits of the byte count and the lower three bits of the starting address are all zero, the Data Counter is decremented by one before the operation begins since the upper eight bits of the byte count contain the actual number of Word64s to be transferred. If the sum of the lower three bits of the byte count and the lower three bits of the starting address is greater than 7, the Data Counter is incremented by one since there will be two more transfers than the value in the upper eight bits of the byte count. Otherwise, the upper eight bits of the byte count are loaded directly into the Data Counter. The determination of whether an increment or decrement is required is accomplished in the BYTEENBL block.

8.8 ADDRCNTR

This block contains the Address Counter which holds the incrementing address value. This is necessary in the Master case in order to handle the address for the address retry after a Disconnect operation, and in the Slave case to provide the correct addresses to the Link Layer if required. The Address Counter is a 29 bit counter loaded with the upper 29 bits of the starting address from the Link Layer on a Master operation and the address from the FusionBus on a Slave operation. In Master Mode, If the Module is the Source, the Address Counter is incremented when FB_DACK is asserted and FB_DRDY was driven by the Module two cycles earlier, indicating that data was successfully transferred across the FusionBus. If the Module is the Destination, the Address Counter is incremented when FB_DRDY is asserted and FB_DACK was driven by the Module two cycles earlier. Note that this means that in the Master case the PHY_ADDR Bus driven to the Link Layer does not contain the correct address for each transfer, but at the end of the operation it will correctly contain the starting address plus the byte count.

In Slave Mode, the Address Counter is incremented when data is transferred between the Link Layer and the Physical Layer. This occurs when PHY_WTREQ and LNK_DRDY are both asserted during a Destination operation, or when PHY_RDREQ and LNK_DRDY are both asserted during a Source operation. Thus in this case the PHY_ADDR Bus does contain the address of the current data Word64 being transferred.

8.9 ADDRCMPR

8.9.1 Basic Address Compare Function

This block primarily provides the Slave Mode address comparison function, which compares the current FB_ADDR value from the FusionBus to a set of Base Address Registers. If FB_ADDR falls within one of the address ranges specified for the Module, the signal ACMP is asserted to inform the ASM that a Slave operation has been requested. The Link Layer is informed through the PHY_GRPx signals which Base Address Register compared to FB_ADDR.

8.9.2 Configuration Registers

ADDRCMPR contains all of the Configuration Logic for the Module, including any Configuration Registers which are specific to the Module in addition to the standard Registers and the Base Address Registers. The standard Configuration Registers are listed in Table 17. In most cases only the Base Address Registers are writable, while other Registers are read only.

Status Register (Read Only)—This register provides status from Modules, and is de scribed in detail in the PCI Specification. Bits 4:0 (RESERVED), 5 (66 MHz Capable), 8 (Data Parity Reported), 10:9 (Device Select Timing), 11 (Signaled Target Abort), 14 (Signaled System Error) and 15 (Detected Parity Error) must always return zero. Other bits may be used if necessary.

Revision ID (Read Only)—This 8 bit value indicates the revision number of the Module.

Class Code Register (Read Only)—This 24 bit value identifies the basic function of the Module. Details of the various Class Code values are provided in the PCI Specification.

Cache Line Size—This register is defined in the PCI Specification. It may be used by Memory Controller Modules.

Latency Timer—This register is not used in FusionBus Modules and always reads back all zeroes.

Header Type (Read Only)—This 8 bit value is defined in the PCI Specification. Bits 6:0 must read as zero in FusionBus Modules, and bit 7 is set to one if the Module contains multiple functions.

BIST Register—This register is used to control Built In Self Test (BIST) if it is included in a Module. Otherwise all bits should always return zero.

TABLE 17

| Register Number | Byte 3 | Byte 2 | Byte 1 | Byte 0 |
|---|---|---|---|---|
| 00 | Device ID | | Vendor ID | |
| 01 | Status Register | | Command Register | |
| 02 | Class Code | | | Revision ID |
| 03 | BIST | Header Type | Latency Timer | Cache Line Size |
| 04 | Base Address 0 | | | |
| 05 | Base Address 1 | | | |
| 06 | Base Address 2 | | | |
| 07 | Base Address 3 | | | |
| 08 | Base Address 4 | | | |
| 09 | Base Address 5 | | | |
| 0A | CardBus CIS Pointer | | | |
| 0B | Subsystem ID | | Subsystem Vendor ID | |
| 0C | Expansion ROM Base Address | | | |
| 0D | RESERVED | | | |
| 0E | RESERVED | | | |
| 0F | Maximum Lat | Minimum Grant | Interrupt Pin | Interrupt Line |

 - Required Field
 - Not Used - Reads as zeroes

Vendor ID (Read Only)—This 16 bit value identifies the "Manufacturer" of the Module, and is obtained from the PCI Special Interest Group (SIG). Fusion will have our own unique Vendor ID. Customers who design their own Modules may use their Vendor ID if it exists, or may apply to use the Fusion ID.

Device ID (Read Only)—This 16 bit value uniquely identifies the type of Module. If a customer desires to use the Fusion Vendor ID, Fusion will assign a unique Device ID to each customer Module.

Command Register—This register provides control over devices, and is described in detail in the PCI Specification. Bits 2 (Master Enable), 3 (Special Cycle Recognition), 4 (Memory Write and Invalidate Enable), 6 (Parity Error Response), 7 (Wait Cycle Enable), and 8 (System Error Enable) must always return zero for FusionBus Modules. Other bits may be used if necessary.

Base Address Registers 0–5—These register define up t o six address spaces to which th e Module will respond, and are described in detail in the PCI Specification. Address Spaces are either in Memory Space (register bit 0=zero) or in I/O Space (register bit 0=one). The Module only contains as many Base Address Registers as requires different Address Spaces, and all other registers read as all zeroes. Base Address Registers must be assigned from Register 0 up to Register 5, so if there are only two Address Spaces to be configured they must use Base Address Registers 0 and 1.

The Base Address Registers are defined to read back zeroes in bits which are not decoded in the particular address space. For example, if an Address Space is 4 KB in size, bits from 11 to 4 would read back zeroes. The Configuration software will write all ones to this register, and the n read it back to determine the size. In almost every case, FusionBus Modules will implement only Memory Spaces which can be located anywhere in a 32 bit memory space, so bits 2:0 will read back as zeroes. Bit 3 will be a one if the Address Space is prefetchable and zero otherwise.

CardBus CIS Pointer—This register is not used by FusionBus Modules and always reads back all zeroes.

Subsystem Vendor ID—This register is not used by FusionBus Modules and always reads back all zeroes.

Subsystem ID—This register is not used by FusionBus Modules and always reads back all zeroes.

Expansion ROM Base Address—This register is defined in the PCI Specification, and is used in the unlikely case that a FusionBus Module includes or accesses an Expansion ROM.

Interrupt Pin (Read Only)—This register indicates which interrupt pin the Module is connected to. This concept will probably not be implemented for FusionBus Modules, and thus this register will read back as all zeroes.

Interrupt Line Register—This register defines the routing of an interrupt in a PC environment. It will typically read back as all ones.

Minimum Grant Register (Read Only)—This register is not used by FusionBus Modules and always reads back all zeroes.

Maximum Latency Register (Read Only)—This register is not used by FusionBus Modules and always reads back all zeroes.

8.9.3 Power Control Logic

ADDRCMPR includes the standard Power Control Logic, which allows clocks to be stopped for much of each Module when they are not required. This function is controlled by the INT_PWRDN signal and the ACMP signal. The assertion of ACMP, meaning that the Module is being addressed as a Slave from the FusionBus, always removes the Module from Power Down Mode. On a rising edge of INT_PWRDN, the Module goes into Power Down Mode, and on a falling edge of INT_PWRDN the Module goes out of Power Down Mode. The Link Layer and Coprocessor should use PHY_SLVREQ to take LNK_PWRDN away, and then assert it again when all activity is complete. LNK_PWRDN can be the AND of any number of power down requests. The Physical Layer also ANDs several internal signals with LNK_PWRDN to produce INT_PWRDN. Each Module must include a DIS_PWRDN Configuration bit which prevents the Module from entering Power Down Mode.

When the Module is in Power Down Mode, the gated clock signal GFCLK is stopped in the low state. This clock may be used by the Link Layer and Coprocessor to clock any stoppable logic, while FCLK may be used for any logic which must run continuously. Within the Physical Layer, GFCLK is used by most logic, including all blocks except ASM, and clocks most of the flip flops in PHYSYNCO except for those required in the Address and Address Acknowledge Phases.

8.10 ADDRSM

Figure 16:
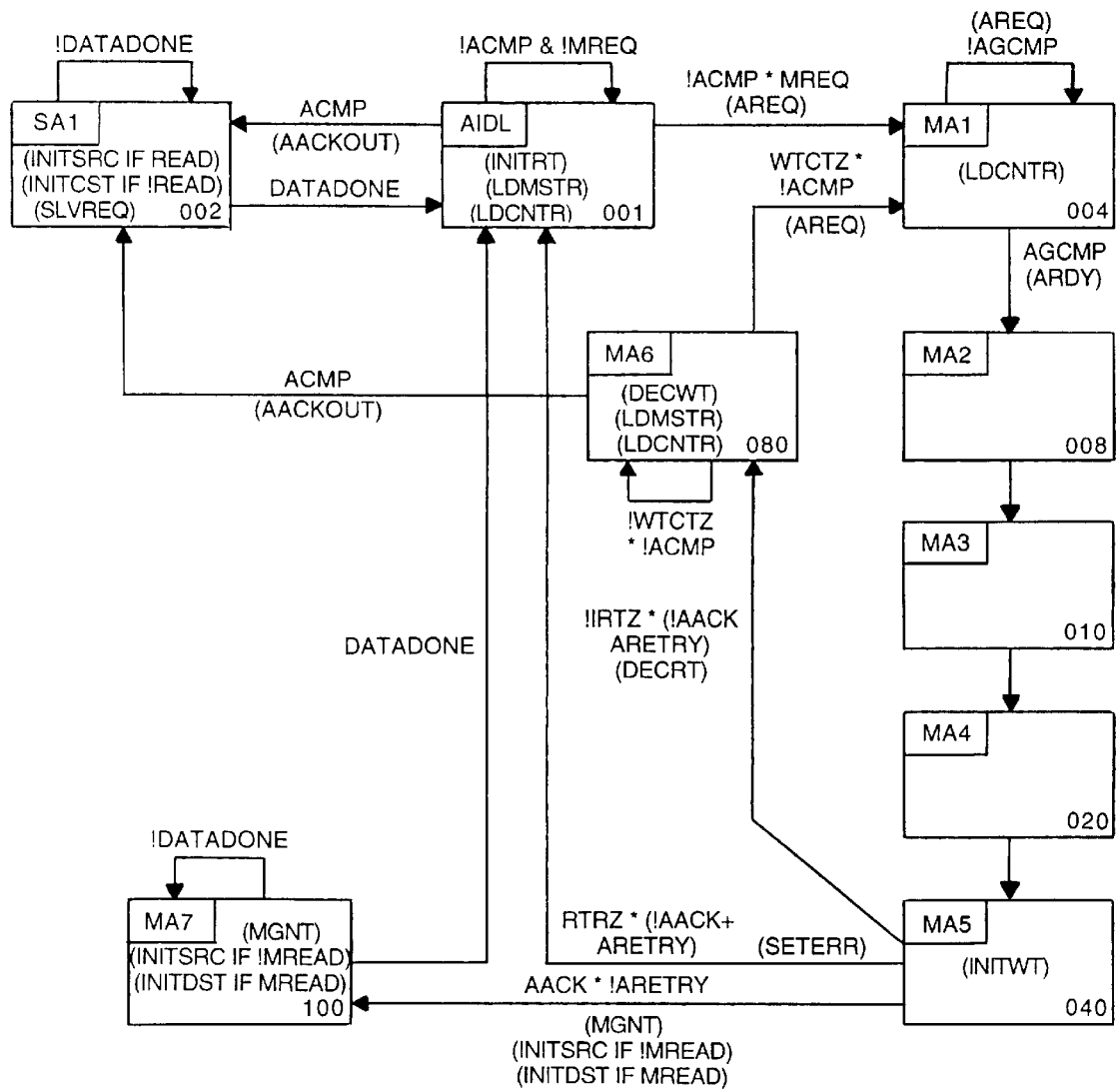
FIG. 16 is a diagrammatic representation of an address state machine which controls Address Phases in FusionBus operations.

This block contains the Address State Machine (ASM), which controls the Address Phases of FusionBus operations. The Basic State Diagram of ASM is shown in FIG. 16. Note that when a signal such as FB_ARDY is referred to, the actual signal generated or received by the ASM is not the actual signal on the FusionBus, but the signal before the flip flop on an output to the FusionBus or after the flip flop on a signal received from the FusionBus.

ASM is normally in state AIDL, with no operations under way. In this state the Address Counter and Data Counter are being continuously loaded from the FusionBus with LDCNTR, several internal registers such as MSTRID are being constantly loaded by LDMSTR, and the Retry Counter is continuously initialized to 255 by INITRT. There are two types of requests which will activate this machine: a Slave Request or a Master Request.

A Slave Request occurs if FB_ARDY is asserted and the FusionBus is addressing a space contained within this Module. The signal ACMP will be asserted from the Address Comparator, and the ASM will move to state SA1 and assert FB_AACK and FB_DREQ. In state SA1 one of INITSRC or INITDST is asserted, depending on the direction of the transfer, and PHY_SLVREQ is asserted to the Link Layer to prepare it for a Slave Mode transfer. The ASM waits in state SA1 until DATADONE is received from the DSM, indicating that the transfer is complete. At that point the ASM returns to state AIDL and waits for another request.

A Master Request occurs when LNK_MREQ is asserted from the Link Layer. If a Slave Request is not also asserted, the ASM moves to state MA1, asserting FB_AREQ. The machine stays in state MA1 asserting FB_AREQ until it receives AGCMP indicating that the FB_AGNT Bus matches the Module ID. At this point the machine moves to state MA2 and asserts FB_ARDY and drives the address, count and other transfer information received from the Link Layer. The machine then cycles through states MA3 and MA4 to MA5. At this point FB_AACK should be received. If FB_AACK is not received (an implicit retry), or if FB_ARETRY or FB_SRETRY is also asserted (an explicit retry), the Retry Counter is checked. If it is zero (RTRZ is asserted), there has been a retry timeout and the ASM goes back to the idle state AIDL and generates SETERR to the Link Layer indicating the timeout. If the Retry Counter has not gotten to zero, it is decremented and the Wait Counter is initialized based on the FB_AWAIT value by INITWT, and the ASM moves to state MA6 to count down the Wait Counter with DECWT.

In state MA6, a Slave Request can be received just as in state AIDL. If this occurs, the ASM moves to state SA1 and the Slave Mode access is serviced. Note that since PHY_MGNT has not been asserted, the Link Layer is still ready to accept a Slave Mode operation even though it has a Master Mode request pending. If a Slave Request is not received before the Wait Counter reaches zero and WTCTZ is asserted, the ASM goes to state MA2 and makes another Address Request with FB_AREQ.

If FB_AACK is received in state MA5 without FB_ARETRY, the Connection with the addressed Slave has been completed and the ASM goes to state MA7 for the actual data transfer. PHY_MGNT is asserted to inform the Link Layer that the Master Operation is under way, and INITSRC or INITDST is asserted to initiate the DSM. All of these signals are held until DATADONE is received from the DSM indicating completion of the transfer. At that point the State Machine returns to state AIDL and waits for another request.

8.11 DATASM

This block contains the Data State Machine (DSM), which controls all data transfers across the FusionBus. Although there is a single state machine, it has two discrete sections for handling Source and Destination operations, and these will be described separately. In addition, basic transfer functionality will be described first and then additional functions will added later. Note that when a signal such as FB_DRDY is referred to, the actual signal generated or received by the DSM is not the actual signal on the FusionBus, but the signal before the flip flop on an output to the FusionBus or after the flip flop on a signal received from the FusionBus.

8.11.1 Source State Machine

Figure 17:
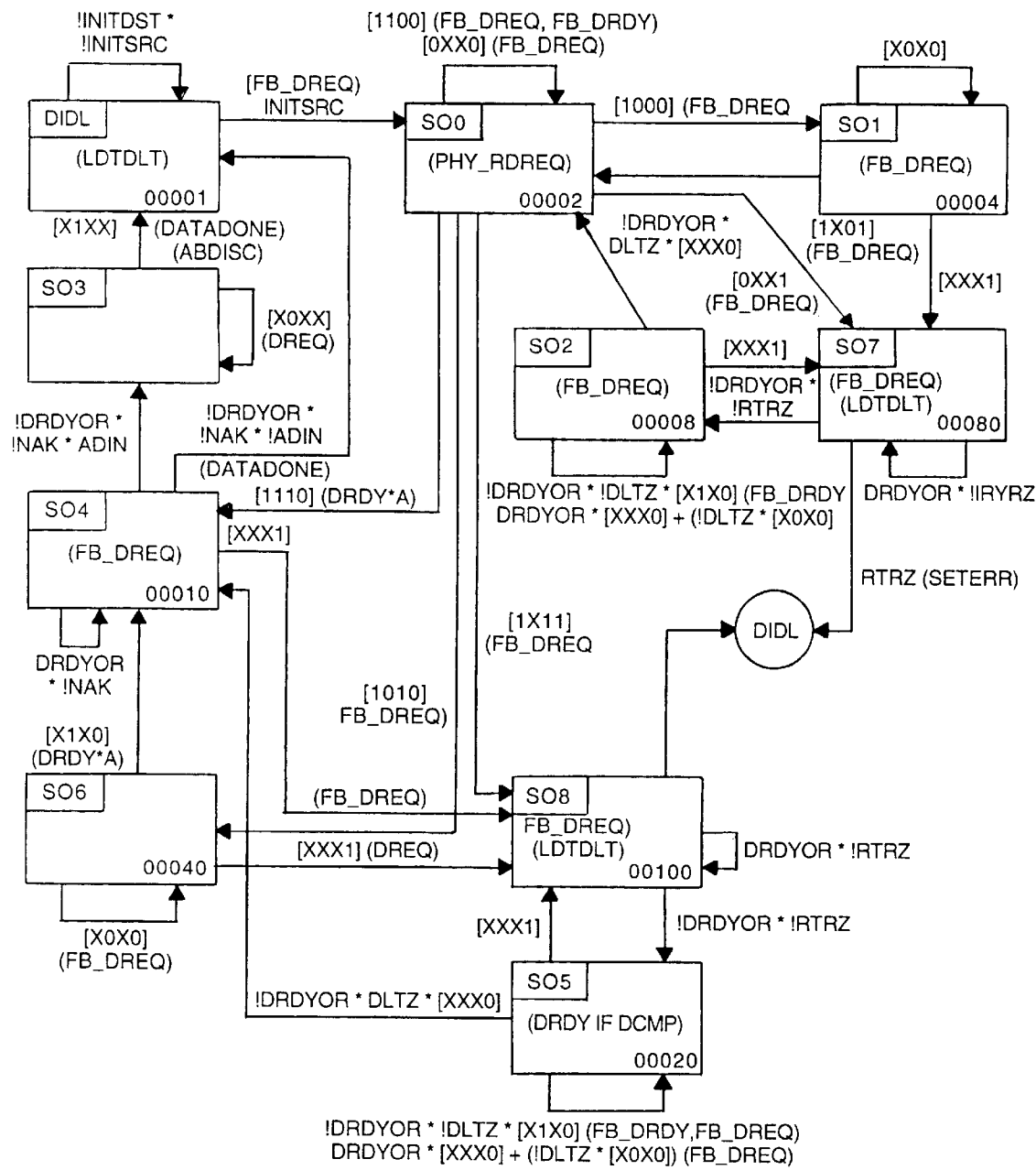
FIG. 17 is a diagrammatic representation of a Data State Machine (DSM), which controls all data transfers across the FusionBus. Specifically, that portion of the DSM is shown which is used for a Source Data Transfer operation.

FIG. 17 shows the part of the DSM used for a Source Data Transfer operation. The DSM is in the idle state DIDL when no operation is under way. When a Source operation is detected by the ASM, it asserts INITSRC. This causes DSM to move to state SO0, initiating the Source Data Transfer.

In each of the states, there are four important input signals, noted as [ABCD]. A is LNK_DRDY, indicating data is available from the Link Layer. B is DCMP, asserted when the FB_DGNT Bus matches the Module ID of this Module's Connection. C is CTZ+ADIN, indicating the Data Counter is at zero or an Abort or Disconnect has been requested. D is NAK, which is asserted when FB_DACK is not received two cycles after this Module asserts FB_DRDY. NAK indicates that a data word was transmitted by the Source but not acknowledged by the Destination, and thus must be resent.

The DSM is normally in state SO0, asserting PHY_RDREQ. Initially, assume neither NAK nor ADIN is asserted. As long as LNK_DRDY is not received, the machine stays in state SO0. If LNK_DRDY is detected, indicating that the Link Layer is presenting a word to be transmitted, there are several possibilities. If DCMP is asserted without CTZ, the data word received is sent to the Destination with FB_DRDY, and the machine remains in state SO0. If DCMP is received with CTZ, the last data word has been transferred from the Link layer and sent over the FusionBus with FB_DRDY, so the machine goes to state SO4 to wait until this word is acknowledged by the Destination. This exit is controlled by DRDYOR, which is asserted if FB_DRDY has been asserted in the current cycle or either of the two previous cycles, meaning a transfer is outstanding which has not yet been acknowledged. When DRDYOR goes away, the last data has been accepted by the Destination and the DSM asserts DATADONE and returns to DIDL.

If LNK_DRDY is received without DCMP or CTZ, a word has been received from the Link Layer but not transmitted over the FusionBus yet. In this case, the machine moves to state SO1, stops asserting PHY_RDREQ, and waits for DCMP. When DCMP is detected the data word is transferred with FB_DRDY and the machine moves back to state SO0. If LNK_DRDY is asserted with CTZ but not DCMP in state SO0, the machine goes to state SO6 to wait for DCMP, and then transfers the data with FB_DRDY and goes to SO4 to wait for its acknowledgment.

Much of the complexity in this State Machine arises because of the possibility that the Destination will fail to assert FB_DACK when it sees FB_DGNT match the Connection ID, and the Source DSM must be able to resend any unacknowledged data. The signal NAK indicates the lack of acknowledgment. If it occurs in state SO0 or SO1 before CTZ is reached, or in state SO0 when CTZ is asserted by LNK_DRDY has not occurred to transfer the last word, the machine goes to state SO7. In this state, the machine waits for DRDYOR to go away, and then goes to state SO2. If the Destination fails to assert FB_DACK when it sees FB_DGNT, it cannot assert FB_DACK on the next cycle either. Thus state SO7 is required to flush out any FB_DRDYs occurring after the one which caused the NAK. LDTDLT is asserted to load the TDLT Counter from the DELTA Counter, since DELTA holds the number of unacknowledged transfers and TDLT holds the number received from the Link Layer but not sent over the FusionBus.

In state SO2, data held in the data buffer is resent with FB_DRDY when DCMP is detected. The machine stays in this state until DLTZ is asserted, indicating that the DELTA Counter is zero, and DRDYOR is not asserted. If another NAK is detected in this state, the DSM goes back to SO7 to clear out any transfers and try again. Once SO7 has exited to SO0, all data held in the Physical layer has been transferred, and the machine returns to normal processing.

If NAK is detected in state SO0 when CTZ is asserted and LNK_DRDY is asserted indicating that the last data word has already been transferred from the Link layer, the machine goes to state SO8 which is very much like SO7, and waits for DRDYOR to go away. Once it does, the machine goes to SO5 which is just like state SO2, and flushes all data held in the Physical Layer. Once all of this data is transferred, the machine moves to state SO4. If NAK is detected here or in state SO6, the machine goes back to state SO8 and continues to resend data. Otherwise, when DRDYOR goes away in state SO4 all data has been transferred and the operation is complete, so DATADONE is asserted and the machine returns to the idle state DIDL.

The Retry Counter is initialized to 255 in the DIDL state, and counts assertions of NAK. If it reaches zero (RTRZ asserted) in states SO8 or SO7, SETFRR is generated to indicate the retry timeout and the machine goes back to DIDL.

8.11.2 Destination State Machine

Figure 18:
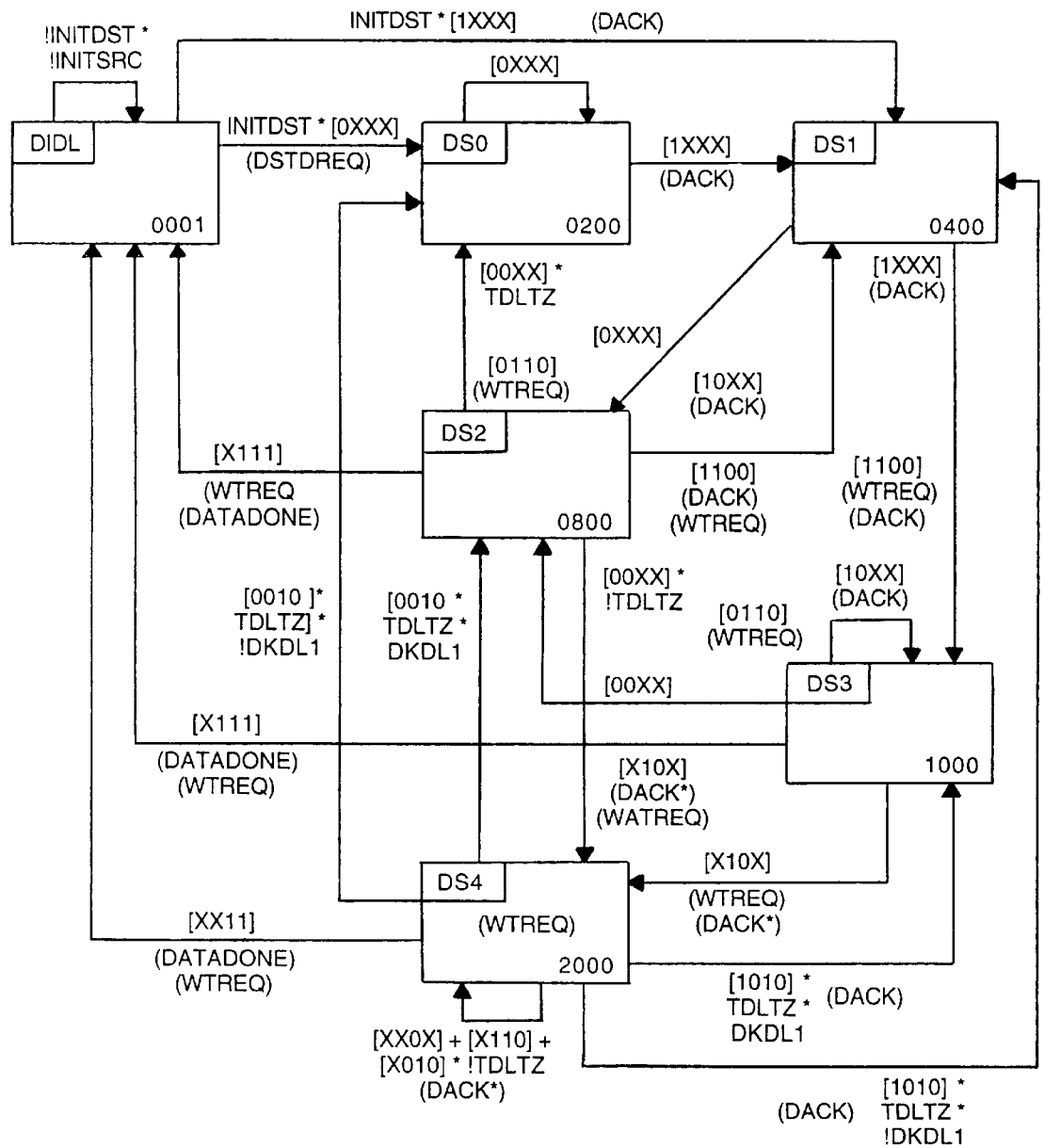
FIG. 18 is a diagrammatic representation of another portion of the DSM which is used for a Destination Data Transfer operation.

FIG. 18 shows the part of the DSM used for a Destination Data Transfer operation. In each of the states, there are four important input signals, noted as [ABCD]. A is DCMP, asserted when the FB_DGNT Bus matches the Module ID of this Module's Connection. B is DRDYIN, asserted when data is available from the FusionBus (FB_DRDY is asserted and FB_DACK was asserted by this Module two cycles earlier). C is LNK_DRDY, indicating data can be accepted by the Link Layer. D is CTZ, indicating the Data Counter is at zero.

The critical signal generated by the DSM in Destination Mode is FB_DACK. The assertion of FB_DACK indicates that the Module can accept data two cycles later, so it can only be asserted if there is enough space to put data even if the Link Layer stops accepting. Thus FB_DACK is asserted when all of the following conditions are true:

1) INITDST is asserted, meaning the DSM is in Destination Mode
2) DCMP is asserted, meaning the Connection Module ID is on the FB_DGNT Bus
3) FB_DACK was not inhibited in the previous cycle, since it is required that if the Destination rejects a transfer by not asserting FB_DACK, it cannot accept data in the following cycle or data would be transferred out of order
4) Either one of two conditions is true:
   A. FB_DACK was not inhibited two cycles previously
   B. FB_DRDY is asserted in this cycle
5) Either one of three conditions is true:
   A. LNK_DRDY is asserted, meaning if a data word is being presented to the Link Layer it is being transferred thus guaranteeing there is room for a word two cycles later
   B. There will be at least one register in the Transfer Buffer available two cycles from now even if data is received for every FB_DACK already issued
   C. A word is not being received from the FusionBus in this cycle FB_DACK is inhibited in a cycle if it could have been generated (INITDST and DCMP are asserted) but was not because there might not have been a register for the data when it arrived. Thus FB_DACK is not controlled by the DSM but is generated whenever data can be accepted. In FIG. 2.4, DACK is indicated as an output whenever it is guaranteed to be asserted, and DACK* when it may be asserted or inhibited depending on the signal described above.

The Destination section of the DSM is initiated when INITDST is asserted by the ASM. The DSM is innitially in the idle state DIDL. If DCMP is asserted when INITDST is first asserted, the DSM goes to state DS1, otherwise it goes to state DS0. In state DS0, the DSM waits for DCMP and transitions to state DS1.

In state DS1, FB_DACK has been asserted on entry. If DCMP is not asserted, the DSM goes to state DS2, otherwise it goes to state DS3. In DS2, FB_DACK was asserted two cycles earlier but not one cycle earlier, so DRDYIN should be asserted if a data transfer occurred. If no transfer occurred on the FusionBus, the DSM goes to DS0 if DCMP is not asserted (in this initial case TDLTZ will be true indicating the TDLT Counter is at zero) and back to DS1 if DCMP is asserted. If both DRDYIN and LNK_DRDY are asserted, data is received from the FusionBus and sent directly to the Link Layer through the assertion of PHY_WTREQ. If CTZ is asserted, this is the last transfer and thus the DSM asserts DATADONE and goes back to the idle state DIDL. If CTZ is not true, the transition is again to either DS0 or DS1 depending on the state of DCMP.

In state DS3, FB_DACK was asserted for both of the previous cycles. If DRDYIN is not asserted the earlier of the two FB_DACKs did not result in a data transfer, and the DSM goes to either DS2 or stays in DS3 depending on the state of DCMP. If DRDYIN and LNK_DRDY are both asserted, data is received from the FusionBus and sent directly to the Link Layer through the assertion of PHY_WTREQ. If CTZ is asserted, this is the last transfer and thus the DSM asserts DATADONE and goes back to the idle state DIDL. If CTZ is not true, the transition is again to either DS2 or DS3 depending on the state of DCMP.

In all of the cases described so far any data received by the Physical Layer from the FusionBus has been transferred to the Link Layer. However, if in state DS2 or DS3 DRDYIN was received but LNK_DRDY was not asserted, data has been shifted into the Transfer Buffer and the DSM goes to state DS4 and asserts PHY_WTREQ so that this data will be transferred to the Link Layer as soon as LNK_DRDY is asserted. While the machine is in state DS4, FB_DACK is generated as described above, and the transfer of data into and out of the Transfer Buffer is managed automatically. If CTZ is detected when LNK_DRDY is asserted, the DSM asserts DATADONE and returns to the idle state DIDL. The DSM stays in state DS4 until there is a cycle in which LNK_DRDY is asserted, DRDYIN is not asserted, and the TDLT Counter is at zero (TDLTZ asserted). In this case the next state is a function of DCMP and DKDL1, which is true if this Module asserted FB_DACK in the previous cycle. The transfer is to DS0, DS1, DS2 or DS3 as a function of these two conditions.

9. Hardware Integration 9.1 Module Interfaces

The Physical Layer has two interfaces, to the FusionBus and to the Link Layer/Coprocessor. There are two parts of the FusionBus interface, the Address Bus and the Data Bus.

9.1.1 FusionBus Address Bus Interface

Table 18 lists all of the signals in the FusionBus Address Bus, Type Indicates the signal's connection, with All meaning that the signal connects to all modules, Ind. meaning that each signal in the group connects one module to a central module such as the Bus Controller or Host Interface, and Sgl meaning that the signal connects from a single module to all other modules. Connections describes the modules to which the signal connects, and the direction of the signal. Level indicates the physical signal type, with T/S meaning a tristate signal, Std. Being a standard CMOS driver, WOR meaning a signal driven low by the source and pulled high otherwise, and CBuf indicating a clock buffer driver.

TABLE 18

| Signal | Type | Connections | Level | Description |
|---|---|---|---|---|
| FB_ADDR[31:00] | All | Master ->Slave | T/S | Address Bus |
| FB_CFGREQ | Ind. | Host -> Ctrl. | Std | Configuration Request |
| FB_AREQ | Ind. | Master -> Ctrl. | Std | Address Request |
| FB_AGNT[4:0] | Sgl | Ctrl. -> Master | Std | Address Grant |
| FB_ARDY | All | Master -> Slave | WOR | Address Ready Strobe |
| FB_AACK | All | Slave -> Master | WOR | Address Acknowledge |
| FB_ARETRY | All | Slave -> Master | WOR | Address Retry |
| FB_SRETRY | All | Snoop -> Master | Std | Snoop Address Retry |
| FB_SSPEED[4:0] | All | Slave -> Master | T/S | Slave Mode Speed |
| FB_MSPEED[4:0] | All | Master -> Slave | T/S | Master Mode Speed |
| FB_ADATA[2:0] | All | Slave -> Master | T/S | Data Bus Selector |
| FB_READ | All | Master -> Slave | T/S | Read/not Write |
| FB_MEMIO | All | Master -> Slave | T/S | Memory/not I/O |
| FB_COUNT[9:0] | All | Master -> Slave | T/S | Byte Count |
| FB_IRQ | Ind. | Module -> Host | Std | Interrupt Request |
| FB_MSTRID[4:0] | All | Master -> Slave | T/S | Master ID |
| FB_AWAIT[2:0] | All | Slave -> Master | T/S | Address Wait Value |
| FB_LOCK | All | Master -> Slave | T/S | Resource Lock Request |
| FB_CONFIG | Sgl | Host -> All | Std | Initialization Selection |
| FB_INTACK | Sgl | Host -> PCI | Std | Interrupt Acknowledge Cycle |
| FB_NOBE | All | Master -> Cache | WOR | Not all byte enables asserted |
| FB_TESTMODE | Sgl | Host -> All | Std | FusionBus Test Mode |
| FRST | Sgl | Host -> All | Std | Module RESET |
| FCLK | Sgl | Host -> All | CBuf | Main System Clock |

Signal Definitions

FB_ADDR[31:00]—the Address Bus, which carries the starting address of a burst from the Master to the Slave. Note that this is a Byte Address even though the Data Bus will transfer Word64 values (64 bits). The byte addressing is necessary to allow a Cache Controller to correctly snoop the address range of a data transfer.

FB_AREQ—the Address Request line used to request use of the Address Bus.

FB_CFGREQ—Configuration Request, from the Host Interface to the Bus Controller. This indicates that the Host Interface is requesting a Configuration operation, and the Bus Controller will immediately grant the Address Bus and all Data Busses to the Host Interface and continue to do so until FB_CFGREQ is removed.

FB_AGNT[4:0]—the Address Grant bus, which indicates in an encoded form the Master which has been granted the Address Bus by the Bus Controller.

FB_ARDY—Address Ready, which is driven by the Master to indicate to slaves that the Address Bus contains an address to be decoded, and that the FB_COUNT, FB_MSTRID, FB_MSPEED, FB_MEMIO and FB_READ signals are also valid.

FB_AACK—Address Acknowledge, driven by the addressed Slave to indicate that the address request has been accepted. This indicates that the FB_SSPEED, FB_ARETRY, FB_SRETRY, FB_AWAIT and FB_ADATA signals are valid.

FB_ARETRY—Address Retry, driven by an addressed Slave (along with FB_AACK) to indicate that the address was decoded but not accepted by the Slave.

FB_SRETRY—Snoop Address Retry, driven by the Snooping Cache Controller to indicate that the address was decoded as being cacheable and a cache snoop operation must occur. If there is not a Snoop Controller in the system, this signal need not be implemented by any Modules.

FB_SSPEED[4:0]—The Slave speed indicator. This is a five bit value which informs the Bus Controller of the minimum number of cycles to be inserted between grants in a transfer.

FB_MSPEED[4:0]—The Master speed indicator. This is a four bit value which informs the Bus Controller of the minimum number of cycles to be inserted between grants in a transfer.

FB_ADATA[2:0]—The Data Bus indicator, which the addressed Slave drives with the ID of the Data Bus to which it is connected. For systems with a single Data Bus, these signals are not used.

FB_READ—The Read/Write signal, which indicates whether the burst is a read (if 1) or a write (if 0).

FB_MEMIO—The Memory I/O signal, which indicates whether the reference is to memory (if 1) or I/O (if 0) space.

FB_COUNT[ 10:0]—Byte Count, indicating the length of the requested burst in bytes.

FB_IRQ—the Interrupt Request line, asserted by a module when its internal interrupt function is activated.

FB_MSTRID[4:0]—Master ID, which indicates which Master has initiated the address transfer. The addressed Slave captures this data for comparison with the DGNT Bus during a write data transfer cycle.

FB_AWAIT[2:0]—The wait period suggested when an address retry is signaled, with the time defined in the following table.

| FB_AWAIT[2:0] | FCLK cycles to wait |
|---|---|
| 000 | 8 |
| 001 | 16 |
| 010 | 32 |
| 011 | 64 |
| 100 | 128 |
| 101 | 256 |

-continued

| FB_AWAIT[2:0] | FCLK cycles to wait |
|---|---|
| 110 | 512 |
| 111 | No suggestion |

FB_LOCK—Lock, which is driven by a Master along with ARDY to indicate that the Slave should not accept accesses from any other Master.

FB_CONFIG—Configuration Selection, which indicates that Modules must decode the Configuration Address during Plug and Play system initialization. Configuration references are used for reading the Module's System ID, loading its address space registers, and loading other static parameters.

FB_INTACK—Interrupt Acknowledge Cycle, which indicates to the FusionBus to PCI Bridge that the Host Interface is requesting an Interrupt Acknowledge Cycle to be performed on the PCI Bus.

FB_NOBE—Not all Byte Enables, which is asserted if the Master cannot guarantee that all byte enable signals will be asserted for all words in the current transfer. Modules which always drive all byte enables do not need to connect to this signal.

FB_TESTMODE—Test Mode, which indicates that the Host Interface is executing a special test access. Test Mode is only used for chip testing and this signal should never be asserted during normal operation.

FRST—Initialize the module. This signal forces all modules into a known state.

FCLK—Main Clock, the system clock for all modules.

9.1.2 FusionBus Data Bus Interface

Table 19 lists all of the signals in a FusionBus Data Bus. Type Indicates the signal's connection, with All meaning that the signal connects to all modules. Connections describes the modules to which the signal connects, and the direction of the signal. Level indicates the physical signal type, with T/S meaning a tristate signal, Std. Being a standard CMOS driver, and Wire-OR meaning a signal driven low by the source and pulled high otherwise. If there are multiple Data Busses, there is one such signal group for each of them, and each group is proceeded by Dx, where x is the bus number. If there is only a single Data Bus, the Dx prefix is not used.

TABLE 19

| Signal | Type | Connections | Level | Description |
|---|---|---|---|---|
| FB_DATA[63:00] | All | Source <-> Dest. | T/S | Data Bus |
| FB_DREQ[31:00] | All. | Source -> Ctrl. | WOR | Data Request |
| FB_DGNT[4:0] | All | Ctrl. -> Source | Std | Data Grant |
| FB_DRDY | All | Source -> Dest. | WOR | Data Ready Strobe |
| FB_BE[7:0] | All | Source -> Dest. | T/S | Byte Enables |
| FB_DACK | All | Dest. -> Source | WOR | Data Acknowledge |
| FB_DISC | All | Any -> Any | WOR | Disconnect |
| FB_ABORT | All | Any -> Any | WOR | Transfer Abort |

Signal Definitions

FB_DATA[63:00]—the Data Bus, used to transfer data between the Source and Destination.

FB_DDREQ[31:00]—the Data Request lines, one from each module to the Bus Controller. These lines are used to request use of the Data Bus by a Source.

FB_DGNT[4:0]—the Data Grant bus, which indicates in an encoded form the Source which has been granted the Data Bus by the Bus Controller.

FB_DRDY—Data Ready, which is driven by the Source to indicate to Destinations that the Data Bus contains write data, or that read data is expected to be driven from the Destination.

FB_BE[7:0]—Byte Enables, which is driven by the Source to indicate to Destinations which bytes of the Data Bus contain valid write data or read data.

FB_DACK—Data Acknowledge, driven by the Destination to indicate that write data has been accepted from the Data Bus.

FB_DISC—Disconnect, driven by either the Source or Destination to indicate that the current transfer must be interrupted but must be restarted by the Master at some later time.

FB_ABORT—Transfer Abort, driven by either the Source or Destination during a cycle to cause he other Module to end the current transfer even if the count has not been reached.

9.1.3 Link Layer/Coprocessor Interface

Table 20 partitions the link layer interface with the physical layer into logical categories and provide a brief description of each signal. The signal names follow the standard Fusion convention, with signals sourced from the Physical Layer beginning with PHY_ and signals received from the Link Layer beginning with LNK_.

LNK_MREQ—Master Request, indicating that the Link Layer wishes to perform a Master Mode operation.

PHY_MGNT—Master Grant, indicating that the Physical Layer is in Master Mode and that all data transfers are due to the Master Mode. Even if LNK_MREQ is asserted, data transfers are in Slave Mode unless PHY_MGNT is asserted.

LNK_READ—Master Read, which is asserted with LNK_MREQ if the Master Mode Transfer requested is a read. Otherwise, the Master Mode Transfer requested is a write.

LNK_MEMIO—Master Memory I/O signal, which indicates whether the reference being requested is to memory (if 1) or I/O (if 0) space.

LNK_ADDR[31:00]—the address from the Link Layer to the Physical Layer, which is the starting address for a Master Mode Transfer request.

LNK_COUNT[10:00]—the Byte Count of a Master Mode request.

LNK_MSPEED[4:0]—This field indicates the number of cycles between transfers that the Link Layer requires when in Master Mode.

PHY_SLVREQ—Slave Request, indicating that the Physical Layer has detected a valid Slave address.

PHY_SLVREAD—Slave Read, which is asserted with PHY_SLVREQ if the Slave Mode request is a read. Otherwise, the Slave Mode transfer request is a write.

TABLE 20

| Name | Direction | Description |
|---|---|---|
| Physical Layer Interface - Global Signals | | |
| PHY_GFCLK | Out | Gated version of FCLK. |
| LNK_IRQ | In | Interrupt Request |
| LNK_PWRDN | In | Power Down Request |
| Physical Layer Interface - Master Request | | |
| LNK_MREQ | In | Master Request. (LNK→PHY) |
| PHY_MGNT | Out | Master Grant. (LNK←PHY) |
| LNK_READ | In | Master Read (=1)/Write (=0) indicator. |
| LNK_MEMIO | In | Memory (=1)/IO (=0) operation request indicator. |
| LNK_ADDR[31:00] | In | Address for master operations. |
| LNK_COUNT[10:00] | In | Master Byte Count. |
| LNK_MSPEED[4:0] | In | Master Speed. |
| Physical Layer Interface - Slave Request | | |
| PHY_SLVREQ | Out | Slave Request. |
| PHY_SLVREAD | Out | Slave Read (=1)/Write (=0) indicator. |
| PHY_GRP[5:0] | Out | Group Decodes. Predecoded from FusionBus address. |
| PHY_MEMIO | Out | Slave Memory (=1)/IO (=0) operation request indicator. |
| PHY_ADDR[31:00] | Out | Address from FusionBus. |
| PHY_COUNT[10:00] | Out | Byte Count from FusionBus |
| LNK_SSPEED[4:0] | In | Slave Speed. |
| LNK_AWAIT[2:0] | In | Address Bus Wait Suggestion. |
| Physical Layer Interface - Data Transfer | | |
| PHY_WTREQ | Out | Write Request. |
| PHY_RDREQ | Out | Read Request. |
| LNK_DRDY | In | Data Ready. |
| PHY_BE[7:0] | Out | Byte Enables from FusionBus. |
| LNK_BE[7:0] | In | Byte Enables for master source transfers. |
| PHY_DATA[63:00] | Out | Data from FusionBus. |
| LNK_DATA[63:00] | In | Data for source transfers. |

GFCLK—A gated version of the main system clock, which is stopped when the Physical Layer is in Power Down Mode.

LNK_IRQ—Interrupt request, which is passed directly to the FB_IRQxx signal on the FusionBus.

LNK_PWRDN—Power Down request. On the rising edge of this signal, the Physical Layer goes into Power Down Mode. On the falling edge of this signal, the Physical Layer exits Power Down Mode.

PHY_GRP[5:0]—Slave Group, indicating which of the (up to) six Base Address Registers compared to the address.

PHY_MEMIO—Slave Memory 1,0 signal, which indicates whether the reference being requested is to memory (if 1) or I/O (if 0) space.

PHY_ADDR[31:00]—the address bus from the Physical Layer to the Link Layer. It contains the address on a Slave Mode reference, and at the completion of a Master Mode transfer it contains the address which is the last word address of the transfer plus 4.

PHY_COUNT[10:00]—the Byte Count of a Slave Mode request.

LNK_SSPEED[4:0]—This field indicates the number of cycles between transfers that the Link Layer requires when in Slave Mode.

LNK_AWAIT[2:0]—The wait period for the Physical Layer to suggest when an address retry is signaled, with the time defined in the following table.

| LNK_AWAIT[2:0] | FCLK cycles to wait |
|---|---|
| 000 | 8 |
| 001 | 16 |
| 010 | 32 |
| 011 | 64 |
| 100 | 128 |
| 101 | 256 |
| 110 | 512 |
| 111 | No suggestion |

PHY_WTREQ—Write request indicating that the Physical Layer is supplying write data on the PHY_DATA Bus. This is the next data word in the stream if a Master Mode Write Transfer is underway, or the addressed data on a Slave Mode write access.

PHY_RDREQ—Read request indicating that the Physical Layer wants the next word when a Master Mode Read Transfer is underway, or the addressed word if PHY_MGNT is not asserted and thus the Link Layer is in Slave Mode.

LNK_DRDY—Data transfer ready, asserted by the Link Layer whenever it is able to transfer data. On a read transfer, one word of data is transferred whenever LNK_DRDY and PHY_RDREQ are both asserted. Similarly, on a write transfer one word of data is transferred whenever LNK_DRDY and PHY_WTREQ are both asserted.

PHY_BE[7:0]—Byte enables indicating which bytes of the PHY_DATA Bus are valid.

LNK_BE[7:0]—Byte enables indicating which bytes of the LNK_DATA Bus are valid. The Link Layer may always assert these eight lines, and the Physical Layer will calculate the byte enable values at the beginning and end of a burst transfer based on the starting address and byte count.

PHY_DATA[63:00]—the data bus from the Physical Layer to the Link Layer.

LNK_DATA[63:00]—the data bus from the Link Layer to the Physical Layer.

PHY_STATUS[1:0]—This field is valid when MGNT is deasserted, and indicates the termination status of the Master Mode Transfer as defined in the table below.

| PHY_STATUS[1:0] | Termination Status |
|---|---|
| 00 | Normal termination |
| 01 | Error - not able to make the address connection |
| 10 | Error - 256 data retries without completion. |
| 11 | RESERVED |

One skilled in the art may devise many alternative configurations for the systems and method disclosed herein. Therefore, it should be understood that the present invention may be embodied in many other specific forms without departing from the spirit or scope of the invention and that the present examples and methods are to be considered as illustrative and not restrictive, and the invention is not to be limited to the details given herein, but may be modified within the scope of the appended claims.

What is claimed is:

1. A digital system comprising:
 a) at least one processing module;
 b) at least two separate independently controllable memory arrangements for storing digital information;
 c) at least two memory controllers each of which controls a respective one of said memory arrangements;
 d) a bus arrangement including
  i) an address bus interconnecting said processing module and each said memory controller,
  ii) at least two, separate data busses each of which is connected with both of said memory controllers and both of which are connected with said processing module, and
  iii) a bus controller connected with each memory controller and with said processing module for controlling the interaction of said processing module and said memory arrangements such that a data transaction using either one of the memory arrangements may be performed using either of the data busses.

2. In a digital system including a bus arrangement having at least one address bus and at least first and second data busses for interconnecting a plurality of components including first, second, third and fourth components in a predetermined way, a method comprising the steps of:
 a) performing on said bus arrangement at least a first address transaction between said first and second components and at least a second address transaction between said third and fourth components, said first and second address transactions defming respective first and second data transfers; and
 b) simultaneously executing at least for a duration of time said first data transfer between said first and second components on said first data bus and said second data transfer between said third and fourth components on said second data bus.

3. In a digital system including an address bus and at least two data busses which interconnect a plurality of components in a predetermined way such that each data bus is arranged independently of the other so as to interconnect a common group of at least three of the components, a method comprising the steps of:
 a) performing on said address bus an address transaction in which a first one of said components addresses a second one of said components, said address transaction defining an associated data transfer;
 b) selecting one of said data busses on which to perform said associated data transfer based on certain criteria; and
 c) thereafter, executing said data transfer on said selected data bus between said first and second components.

4. The method of claim 3 wherein said selecting step further comprises the step of dynamically selecting said one of the data busses.

5. A digital system comprising:
 a) at least one processing module;
 b) memory means including first and second separate, independently controllable memory storage arrangements for storing digital information; and
 c) a bus arrangement interconnecting said processing module and said memory storage arrangements in a predetermined way, said bus arrangement including an address bus and at least two separate data buses each of which is arranged independently of the other so as to interconnect said processing module with each of said memory means such that a data transaction using either one of the memory arrangements may be performed using either of the data buses.

6. A digital system, comprising:

a) a plurality of components;

(b) a bus arrangement interconnecting said components in a predetermined way, said bus arrangement including an address bus on which address transactions are performed and at least two data buses on which data transactions are performed between the components with at least one of the data buses connected to each component and such that each data bus is arranged independently of the other so as to interconnect a common group of at least three of the components; and (c) a control arrangement for controlling a series of address transactions which are performed between said components on said bus arrangement, each address transaction defining an associated data transaction, said control arrangement being configured for controlling the execution of said data transactions on said bus arrangement such that each data transaction is completed on one of the data buses and the data transactions are completed in a sequence which is different than the order in which said series of address transactions were performed and such that one data transaction being executed on a first one of the data busses is simultaneously executed for a duration of time with at least one other one of the data transactions that is being executed on a second one of the data busses.

7. The system of claim 6 wherein said control arrangement includes selection means for selecting a particular data bus on which to execute each data transaction.

8. The system of claim 7 wherein said selection means is configured for dynamically selecting a particular one of said data busses on which to execute each data transaction based on certain criteria.

* * * * *